(12) United States Patent
Ly et al.

(10) Patent No.: US 12,484,005 B2
(45) Date of Patent: Nov. 25, 2025

(54) APPARATUS, SYSTEM, METHOD, AND COMPUTER-READABLE MEDIUM FOR CELLULAR SYSTEM ENHANCEMENTS FOR THE SUPPORT OF MULTI-SIM USER EQUIPMENTS

(71) Applicant: InterDigital Patent Holdings, Inc., Wilmington, DE (US)

(72) Inventors: Quang Ly, North Wales, PA (US); Michael Starsinic, Newtown, PA (US); Hongkun Li, Malvern, PA (US); Jinan Ninglekhu, Royersford, PA (US); Catalina Mihaela Mladin, Hatboro, PA (US); Joseph Murray, Schwenksville, PA (US); Pascal Adjakple, Great Neck, NY (US); Zhuo Chen, Claymont, DE (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 320 days.

(21) Appl. No.: 17/617,033

(22) PCT Filed: Mar. 24, 2020

(86) PCT No.: PCT/US2020/024442
§ 371 (c)(1),
(2) Date: Dec. 7, 2021

(87) PCT Pub. No.: WO2020/247043
PCT Pub. Date: Dec. 10, 2020

(65) Prior Publication Data
US 2022/0240213 A1 Jul. 28, 2022

Related U.S. Application Data

(60) Provisional application No. 62/928,379, filed on Oct. 31, 2019, provisional application No. 62/899,322, (Continued)

(51) Int. Cl.
*H04W 60/04* (2009.01)
*H04W 4/14* (2009.01)
(Continued)

(52) U.S. Cl.
CPC ............. *H04W 60/04* (2013.01); *H04W 4/14* (2013.01); *H04W 4/90* (2018.02); *H04W 60/02* (2013.01); *H04W 60/06* (2013.01); *H04W 68/005* (2013.01)

(58) Field of Classification Search
CPC ......... H04W 60/04; H04W 4/14; H04W 4/90; H04W 60/02; H04W 60/06;
(Continued)

(56) References Cited

U.S. PATENT DOCUMENTS

| 7,693,506 B1 | 4/2010 | Baeck et al. | |
| 2012/0178500 A1* | 7/2012 | Hwang | H04W 8/183 455/558 |

(Continued)

FOREIGN PATENT DOCUMENTS

| CN | 104969589 A | 10/2015 |
| CN | 105323822 A | 2/2016 |

(Continued)

OTHER PUBLICATIONS

CT1 "Reply LS on PTI handling in UE policy delivery service", 3GPP Draft; C3-191045, 3rd Generation Partnership Project (3GPP), Mobile Competence Centre ; 650, Route Des Lucioles ; F-06921 Sophia-Antipolis Cedex ; France vol. CT WG3, No. Xi An, China; Apr. 8, 2019-Apr. 12, 2019 Apr. 7, 2019 (Apr. 7, 2019), XP051698985.

(Continued)

*Primary Examiner* — Michael Y Mapa
(74) *Attorney, Agent, or Firm* — Jamie T. Nguyen

(57) ABSTRACT

An electronic device including a receiver configured to receive a first Subscriber Identity Module (SIM); a receiver configured to receive a second SIM; and circuitry configured to receive data from the first SIM; and send a request, to a first public land mobile network (PLMN), to register the electronic device to the first PLMN, wherein the request
(Continued)

indicates that the electronic device is a multi-SIM device and the request includes multi-SIM assistance information, and wherein the multi-SIM assistance information informs the first PLMN of the electronic device's preference for multi-SIM operations.

23 Claims, 48 Drawing Sheets

Related U.S. Application Data filed on Sep. 12, 2019, provisional application No. 62/858,747, filed on Jun. 7, 2019.

(51) Int. Cl.
*H04W 4/90* (2018.01)
*H04W 60/02* (2009.01)
*H04W 60/06* (2009.01)
*H04W 68/00* (2009.01)

(58) Field of Classification Search
CPC ... H04W 68/005; H04W 12/45; H04W 8/183; H04W 48/18; H04W 48/14; H04W 88/06; H04W 60/00; H04W 68/02
USPC ...... 370/329; 455/426.1, 458–459, 461, 515, 455/550.1–553.1, 558
See application file for complete search history.

(56) References Cited

U.S. PATENT DOCUMENTS

| | | | |
|---|---|---|---|
| 2015/0126187 A1 | 5/2015 | Ponukumati et al. | |
| 2015/0296364 A1 | 10/2015 | Peruru et al. | |
| 2016/0345244 A1 | 11/2016 | Chuttani et al. | |
| 2019/0029065 A1 | 1/2019 | Park et al. | |
| 2019/0159116 A1 | 5/2019 | Guan et al. | |
| 2019/0174449 A1 | 6/2019 | Shan et al. | |
| 2019/0174466 A1 | 6/2019 | Zhang et al. | |
| 2020/0196375 A1* | 6/2020 | Ryu | H04W 76/34 |
| 2021/0352619 A1* | 11/2021 | Ryu | H04W 68/02 |
| 2022/0159616 A1* | 5/2022 | Stojanovski | H04W 68/025 |
| 2022/0191778 A1* | 6/2022 | Kumar | H04W 36/142 |

FOREIGN PATENT DOCUMENTS

| | | |
|---|---|---|
| CN | 106688280 A | 5/2017 |
| WO | 2019/032972 A1 | 2/2019 |

OTHER PUBLICATIONS

NTT Docomo et al: "Clarification on user preference and URSP", 3GPP Draft; 23503 CR0164R11 5GS PH1 (REL-15) S2-181339 0 WAS13318_WAS13113-WAS13006_WAS12163 WAS1 1569 E-Mail Revision 10 OF 1811552, 3rd Generation Partnership Project (3GPP), Mobile Competence Centre vol. SA WG2, No. West Palm Beach, USA; Nov. 26, 2018-Nov. 30, 2018 Dec. 4, 2018 (Dec. 4, 2018), XP051568095.

SA WG2: "New SID: Study on enhancement of 5G UE Policy", 3GPP Draft; SP-190449 S2-1906716 SID FS EUEPO, 3rd Generation Partnership Project (3GPP), Mobile Competence Centre ; 650, Route Des Lucioles ; F-06921 Sophia-Antipolis Cedex; France vol. TSG SA, No. Newport Beach, USA; Jun. 5, 2019-Jun. 7, 2019 May 29, 2019 (May 29, 2019), XP051749084.

Third Generation Partnership Project, "Technical Specification Group Radio Access Network; New Generation Radio Access Network; User Equipment (UE) procedures in Idle mode and RRC Inactive state (Release 15)," 3GPP TS 38.304 V15.2.0 (Dec. 2018), 97 pages.

Introduction of Slice-Specific Authentication and Authorisation, 3GPP TSG-SA WG2 Meeting #132, S2-1904722, TS23.501, V16.0.2, Apr. 8-12, 2019, 8 pages.

Third Generation Partnership Project, "Technical Specification Group Services and System Aspects; General Packet Radio Service (GPRS) enhancements for Evolved Universal Terrestrial Radio Access Network (E-UTRAN) access (Release 16)," 3GPP TS 23.401 V16.3.0 (Jun. 2019), 423 pages.

3rd Generation Partnership Project; Technical Specification Group Services and System Aspects; Policy and Charging Control Framework for the 5G System (5GS); Stage 2 (Release 16); 3GPP TS 23.503 V16.0.0 (Mar. 2019), 84 pages.

Anonymous, "Procedures for the 5G System", 3rd Generation Partnership Project (3GPP), Technical Specification Group Services and System Aspects, Document: 3GPP TS 23.502 V16.0.0, Stage 2, Release 16, Mar. 2019, 420 pages.

Third Generation Partnership Project, "3rd Generation Partnership Project; Technical Specification Group Services and System Aspects; Study on Support for Multi-USIM Devices (Release 17)," 3GPP TS 22.834 V0. 1.0 (May 2019), 19 pages.

Introduction of Slice-Specific Authentication and Authorisation, 3GPP TSG-SA WG2 Meeting #132, S2-1904723, TS23.502, V16.0.2, Apr. 8-12, 2019, 23 pages.

Third Generation Partnership Project, "Technical Specification Group Radio Access Network; NR; NR and NG-RAN Overall Description; Stage 2 (Release 15)," 3GPP TS 38.300 V15.4.0 (Dec. 2018), 28 pages.

Anonymous, "System Architecture for the 5G System", 3rd Generation Partnership Project (3GPP), Technical Specification Group Services and System Aspects, Document: 3GPP TS 23.501 V16.0.0, Stage 2, Release 16, Mar. 2019, 318 pages.

3GPP tsg_ct\WG1_mm-cc-sm_ex-CN1, Issue TSGC1_111_Osaka, MediaTek / JJ,C1-183349, "Forbidden PLMN operation for cause value amp; quot; Requested service option not authorized in this PLMN amp; quot;", 3GPP TSG-CT WG1 Meeting #111 C1-183349 -Osaka (Japan), May 21-25, 2018, 4 pages.

"Presentation of TR 22.834 v.1.0.0 on Study on Support for Multi-USIM Devices (FS_MUSIM)", 3GPP Tdoc SP-1903183, 3GPP GPP TSG-SA Meeting #84, Newport Beach, CA, USA, Jun. 5-7, 2019, 1 page.

Solution for supporting Non-standalone NPN, S2-1810275, SA WG2 Meeting No. 129, Oct. 15-19, 2018, Dongguan, China, 6 pages.

3rd Generation Partnership Project; Technical Specification Group Services and System Aspects; Study on Support for Multi-USIM Devices, Releases 17, 3GPP TR 22.834 v1.0.0, May 2019, 20 pages.

Support for paging reception for UE with Multiple SIMs, 8.9 Musim, LG Electronics, CV-R03297, S1-191073 3GPP TSG-SA WG Meeting No. 86, Suzhou, China, May 6-10, 2019, 5 pages.

\* cited by examiner

Non-Roaming 5G System Architecture in reference point representation

5GS Roaming Architecture – Local Breakout Scenario in Service-based Representation 5GS Roaming Architecture – Local Breakout Scenario in Reference Point Representation Registration Management State Model in UE Connection Management State Transition in UE

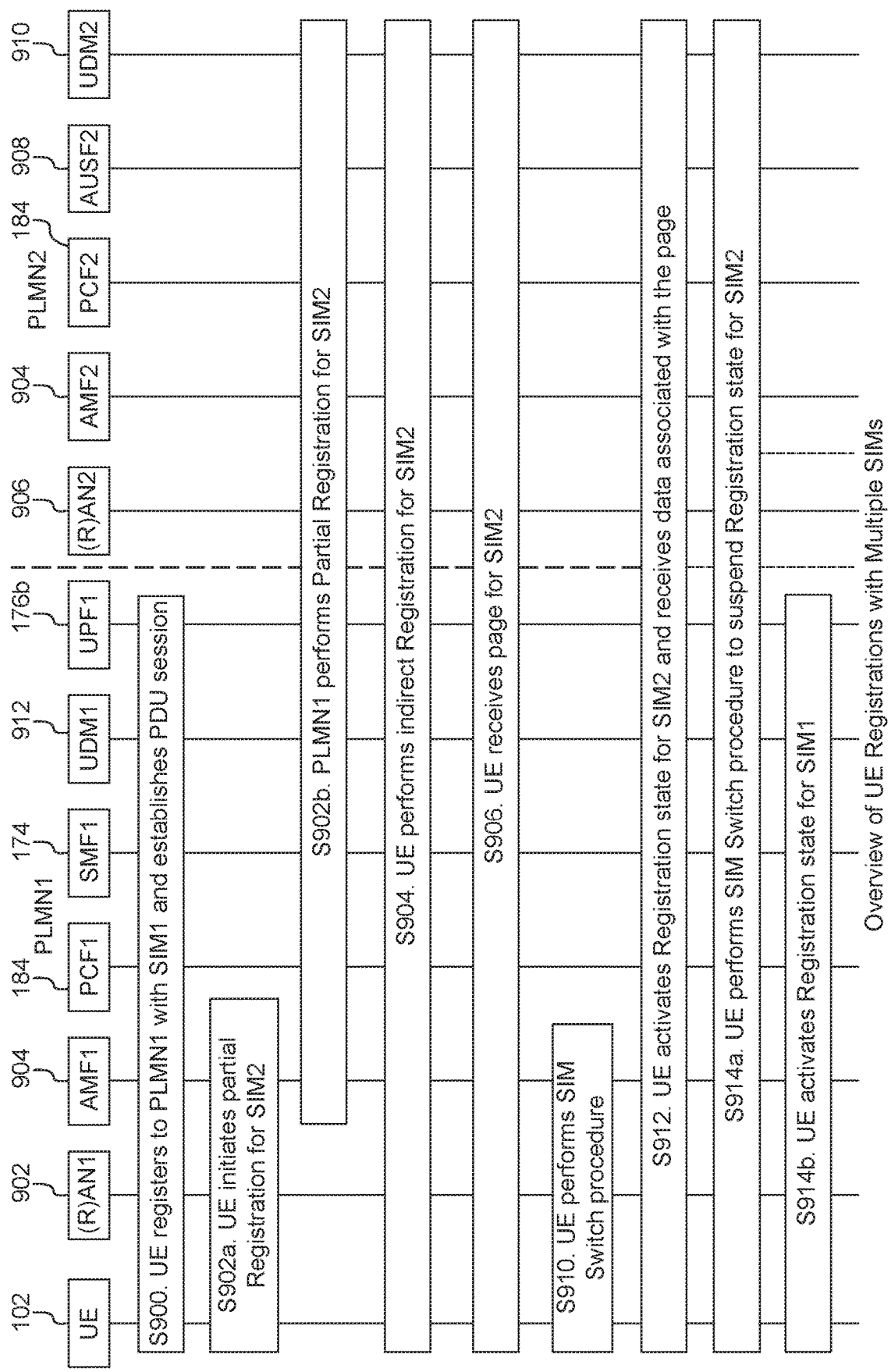

Paging Procedure for Multi-SIM Operations

Multi-SIM Configurations

| SIM #1 ID: xxxxxxxxxxxxxxx | Operator ID: ID001 Status: Active [Switch] | Priority: 1 |
|---|---|---|
| SIM #2 ID: yyyyyyyyyyyyyy | Operator ID: ID002 Status: Inactive [Switch] | 2 |
| SIM #3 ID: zzzzzzzzzzzzzz | Operator ID: ID003 Status: Inactive [Switch] | 3 |

Multi-SIM Configuration GUI

FIG. 17

SIM #1 Configurations

- SIM ID: [ ]
- Temporary Network IDs: [ ]
- PLMN ID: [ ]
- Registration Timer: [ ]
- Service Prioritized List: [ ]
- Maximum # of SIMS: [ ]
- Dual RM-REGISTERED?: [ ]
- PLMN List: [ ]

Individual SIM Configuration GUI

FIG. 18

APPARATUS, SYSTEM, METHOD, AND COMPUTER-READABLE MEDIUM FOR CELLULAR SYSTEM ENHANCEMENTS FOR THE SUPPORT OF MULTI-SIM USER EQUIPMENTS

CROSS-REFERENCE TO RELATED APPLICATIONS

This application is the National Stage Application of International Patent Application No. PCT/US2020/024442, filed Mar. 24, 2020 which claims the benefit of U.S. Provisional Application No. 62/928,379, filed on Oct. 31, 2019, U.S. Provisional Application No. 62/899,322, filed on Sep. 12, 2019, and U.S. Provisional Application No. 62/858,747, filed on Jun. 7, 2019, the entire contents of which are incorporated by reference herein.

FIELD

The present disclosure relates generally to wireless communications, and more particularly to wireless communications systems, devices, methods, and computer readable medium with computer-executable instructions for enhancing cellular systems to support the use of 4G and 5G multi-Subscriber Identity Module (SIM) User Equipments (UEs).

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Multiple SIM UEs to date have been proprietary solutions implemented by device manufacturers without knowledge of the core networks and are outside the scope of the 3GPP standard. Operations of the cellular network were designed where behaviors of the various entities (UE, RAN, and CN) are well defined and are known among the various entities. With the varied implementations of existing multiple SIM UEs, the different behaviors of the different implementations negatively impact the operations of the network and may even degrade its performance.

SUMMARY

An exemplary embodiment of the present disclosure provides an electronic device including a receiver configured to receive a first Subscriber Identity Module (SIM); a receiver configured to receive a second SIM; and circuitry configured to receive data from the first SIM; and send a request, to a first public land mobile network (PLMN), to register the electronic device to the first PLMN, wherein the request indicates that the electronic device is a multi-SIM device and the request includes multi-SIM assistance information, and wherein the multi-SIM assistance information informs the first PLMN of the electronic device's preference for multi-SIM operations.

An exemplary embodiment of the present disclosure provides a method performed by an electronic device, the method including: receiving data from a first Subscriber Identity Module (SIM); and sending a request, to a first public land mobile network (PLMN), to register the electronic device to the first PLMN, wherein the request indicates that the electronic device is a multi-SIM device and the request includes multi-SIM assistance information, and wherein the multi-SIM assistance information informs the first PLMN of the device's preference for multi-SIM operations.

An exemplary embodiment of the present disclosure provides a non-transitory computer-readable medium including computer-executable instructions, which when executed by an electronic device, cause the electronic device to: receive data from a first Subscriber Identity Module (SIM); and send a request, to a first public land mobile network (PLMN), to register the electronic device to the first PLMN, wherein the request indicates that the electronic device is a multi-SIM device and the request includes multi-SIM assistance information, and wherein the multi-SIM assistance information informs the first PLMN of the device's preference for multi-SIM operations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The scope of the present disclosure is best understood from the following detailed description of exemplary embodiments when read in conjunction with the accompanying drawings, wherein:

FIG. 9 shows a method of UE registrations with multiple SIMs in accordance with an exemplary embodiment;

FIG. 17 shows a multi-SIM configuration GUI in accordance with an exemplary embodiment;

FIG. 18 shows an individual SIM configuration GUI in accordance with an exemplary embodiment;

Figure 1A:
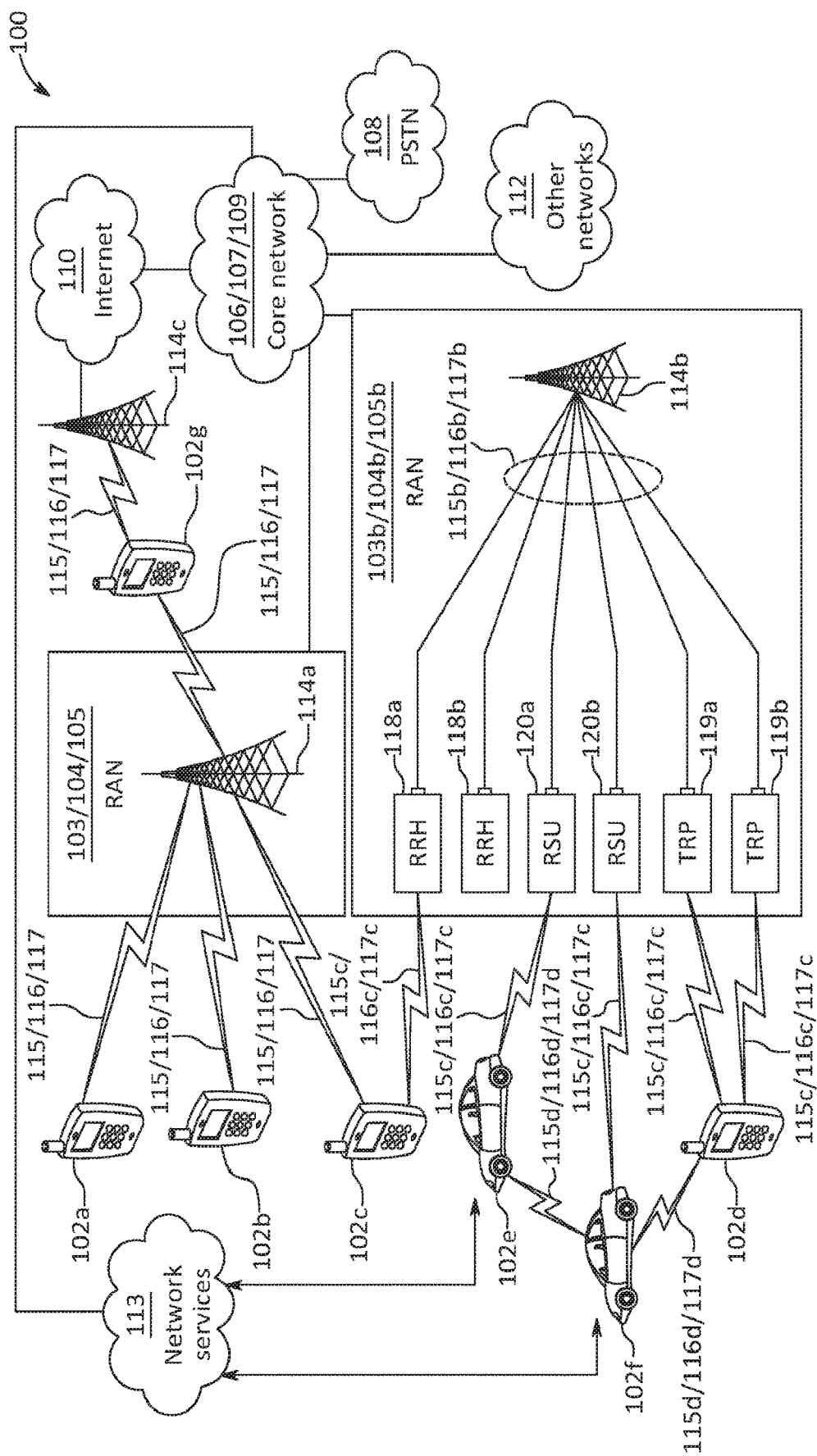
FIG. 1A is a system diagram that shows an example 3GPP architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multiperson video calls, autonomous driving, augmented reality, tactile internet, virtual reality, home automation, robotics, and aerial drones to name a few. All of these use cases and others are contemplated herein.

The following is a list of acronyms relating to service level and core network technologies that may appear in the below description. Unless otherwise specified, the acronyms used herein refer to the corresponding term listed below.

Abbreviations

| | |
|---|---|
| 5G-GUTI | 5G Globally Unique Temporary Identifier |
| 5G-S-TMSI | 5G S-Temporary Mobile Subscription Identifier |
| 5GS | 5G System |
| AF | Application Function |
| AMF | Access and Mobility Management Function |
| ANDSP | Access Network Discovery and Selection Policy |
| API | Application Programming Interface |
| CN | Core Network |
| DL | Downlink |
| DRX | Discontinuous Reception |
| ECM | EPS Connection Management |
| EMM | EPS Mobility Management |
| EPS | Evolved Packet System |
| E-UTRAN | Evolved Universal Terrestrial Radio Access Network |
| GUI | Graphical User Interface |
| HSS | Home Subscriber Server |
| ICCID | Integrated Circuit Card Identifier |
| IE | Information Element |
| IMS | IP Multimedia Subsystem |
| IMSI | International Mobile Subscriber Identity |
| IP | Internet Protocol |
| IRTU | Inactive Registration Timer Update |
| MM | Mobility Management |
| MME | Mobility Management Entity |
| MNO | Mobile Network Operator |
| NAS | Non Access Stratum |
| NF | Network Function |
| P-GW | PDN Gateway |
| PCF | Policy Control Function |
| PCRF | Policy and Charging Rules Function |
| PDN | Packet Data Network |
| PDU | Protocol Data Unit |
| PEI | Permanent Equipment Identifier |
| PLMN | Public Land Mobile Network |
| PO | Paging Occasion |
| PSM | Power Saving Mode |
| RAN | Radio Access Network |
| RRC | Radio Resource Control |
| S-GW | Serving Gateway |
| SEPP | Security Edge Protection Proxy |
| SIM | Subscriber Identity Module |
| SMF | Session Management Function |
| SMS | Short Message Service |
| SUCI | Subscription Concealed Identifier |
| SUPI | Subscription Permanent Identifier |
| TAI | Tracking Area Identity |
| TAU | Tracking Area Update |
| TMSI | Temporary Mobile Subscription Identifier |
| UDM | Unified Data Management |
| UE | User Equipment |
| UL | Uplink |
| UPF | User Plane Function |
| URSP | User Route Selection Policy |
| USIM | Universal Subscriber Identity Module |

Terms and Definitions

| | |
|---|---|
| Multi-SIM UE | A UE that supports operations with two or more SIMs or with multiple SIMs. |
| Primary SIM | The SIM in a multi-SIM UE that is considered the main SIM in which the UE will be actively registered for the majority of the time. The UE will actively monitor for paging occasions associated with the PLMN of the primary SIM. |
| Secondary SIM | The SIM in a multi-SIM UE that is considered the alternative SIM in which the UE is also receiving service for but for a minority of the time. The UE does not actively monitor for paging occasions associated with the PLMN of secondary SIMs but can still receive paging requests for secondary SIMs through the paging request forwarding feature introduced in this disclosure. |
| Active PLMN | The PLMN in which a multi-SIM UE is currently actively registered to, i.e. the UE has RM-REGISTERED or EMM-REGISTERED state for the associated SIM. |
| Inactive PLMN | The PLMN in which a multi-SIM UE has an inactive registration with, i.e. the UE has RM-INACTIVE or EMM-INACTIVE state for the associated SIM. |
| RM-INACTIVE or EMM-INACTIVE | A new registration state where the UE is considered registered but can only be reached via the UE's association with a different SIM. An alternative to specifying a new registration state is to specify a new sub-state of RM-REGISTERED/EMM-REGISTERED state or as a new mode of operation within the RM-REGISTERED/EMM-REGISTERED state termed the "Inactive Registration" mode of RM-REGISTERED/EMM-REGISTERED. It should be appreciated that, when a UE is in the RM-INACTIVE or EMM-INACTIVE state and may not be reached with the associated SIM, the UE's registrations state may be considered paused. |
| Partial Registration or Partial Attach | A registration procedure in which a UE registers a secondary SIM to an inactive PLMN that results in limited UE context stored in the core network compared to the general registration or attachment procedure that is specified in TS 23.502 [2] or TS 23.401 [9] respectively. The registration configures the inactive PLMN to forward certain paging related requests originating from a UDM or HSS in the inactive PLMN to an active PLMN whenever the secondary SIM is in an inactive registration state with the inactive PLMN. After the partial registration or partial attach, only some UE IDs are assigned and no AMF or MME in the inactive PLMN is serving the UE. |

| | |
|---|---|
| Indirect Registration or Indirect Attach | A registration procedure in which a UE registers a secondary SIM to an inactive PLMN through an active PLMN. This registration is a full registration similar to the General Registration or Attach procedure described in TS 23.502 [2] and TS 23.401 [9] respectively, but made through another PLMN and also configures the inactive PLMN to forward all paging related requests to the active PLMN include paging requests originating from session management PDUs and network slices in 5G or PDN connections in LTE. After the indirect registration or indirect attach, an AMF or MME in the inactive PLMN is serving the UE. |
| MUSIM Registration or Attach | A Registration or Attach procedure in which a UE registers two or more SIMs with the active PLMN in the same request. When the SIMs are from the same operators, the core network registers the SIMs individually within the same PLMN. When the SIMs are from different operators, the PLMN registers the SIM associated with its network and also performs either partial or indirect registration or attach procedures for SIMs associated with other PLMNs. |
| Paging Request Forwarding | A procedure in which a first PLMN forwards the contents of a NAS notification intended for a first SIM to a second PLMN to forward to a multi-SIM UE. The multi-SIM UE has an active registration with the second PLMN and an inactive registration with the first PLMN. |
| SIM Switch | A procedure initiated by a multi-SIM UE to notify an active PLMN that the UE wants to transition to the RM-INACTIVE or EMM-INACTIVE state on the active PLMN before switching to connect to an inactive PLMN. It should be appreciated that when a UE executes a SIM switch procedure, it may have the effect of pausing its registration in one PLMN. |

Example Communication System and Networks

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wired and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC) 2302, a Radio Network Controller (RNC), relay nodes, etc. Similarly, the base station 114*b* may be part of the RAN 103*b*/104*b*/105*b*, which may also include other base stations and/or network elements (not shown), such as a BSC, a RNC, relay nodes, etc. The base station 114*a* may be configured to transmit and/or receive wireless signals within a particular geographic region, which may be referred to as a cell (not shown). Similarly, the base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, for example, the base station 114*a* may include three transceivers, e.g., one for each sector of the cell. The base station 114*a* may employ Multiple-Input Multiple Output (MIMO) technology and, therefore, may utilize multiple transceivers for each sector of the cell, for instance.

The base station 114*a* may communicate with one or more of the WTRUs 102*a*, 102*b*, 102*c*, and 102*g* over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114*b* may communicate with one or more of the RRHs 118*a* and 118*b*, TRPs 119*a* and 119*b*, and/or RSUs 120*a* and 120*b*, over a wired or air interface 115*b*/116*b*/117*b*, which may be any suitable wired (e.g., cable, optical fiber, etc.) or wireless communication link (e.g., RF, microwave, IR, UV, visible light, cmWave, mmWave, etc.). The air interface 115*b*/116*b*/117*b* may be established using any suitable RAT.

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., RF, microwave, IR, ultraviolet UV, visible light, cmWave, mmWave, etc.) The air interface 115*c*/116*c*/117*c* may be established using any suitable RAT.

The WTRUs 102 may communicate with one another over a direct air interface 115*d*/116*d*/117*d*, such as Sidelink communication which may be any suitable wireless communication link (e.g., RF, microwave, IR, ultraviolet UV, visible light, cmWave, mmWave, etc.) The air interface 115*d*/116*d*/117*d* may be established using any suitable RAT.

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and/or RSUs 120*a* and 120*b* in the RAN 103*b*/104*b*/105*b* and the WTRUs 102*c*, 102*d*, 102*e*, and 102*f*, may implement a radio technology such as Universal Mobile Telecommunications System (UMTS) Terrestrial Radio Access (UTRA), which may establish the air interface 115/116/117 and/or 115*c*/116*c*/117*c* respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114*a* in the RAN 103/104/105 and the WTRUs 102*a*, 102*b*, 102*c*, and 102*g*, or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A), for example. The air interface 115/116/117 or 115*c*/116*c*/117*c* may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114*a* in the RAN 103/104/105 and the WTRUs 102*a*, 102*b*, 102*c*, and 102*g* or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, 102*e*, and 102*f* may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114*c* and the WTRUs 102, e.g., WTRU 102*e*, may implement a radio technology such as IEEE 802.11 to establish a Wireless Local Area Network (WLAN). Similarly, the base station 114*c* and the WTRUs 102, e.g., WTRU 102*d*, may implement a radio technology such as IEEE 802.15 to establish a wireless personal area network (WPAN). The base station 114*c* and the WTRUs 102, e.g., WRTU 102*e*, may utilize a cellular-based RAT (e.g., WCDMA, CDMA2000, GSM, LTE, LTE-A, NR, etc.) to establish a picocell or femtocell. As shown in FIG. 1A, the base station 114*c* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
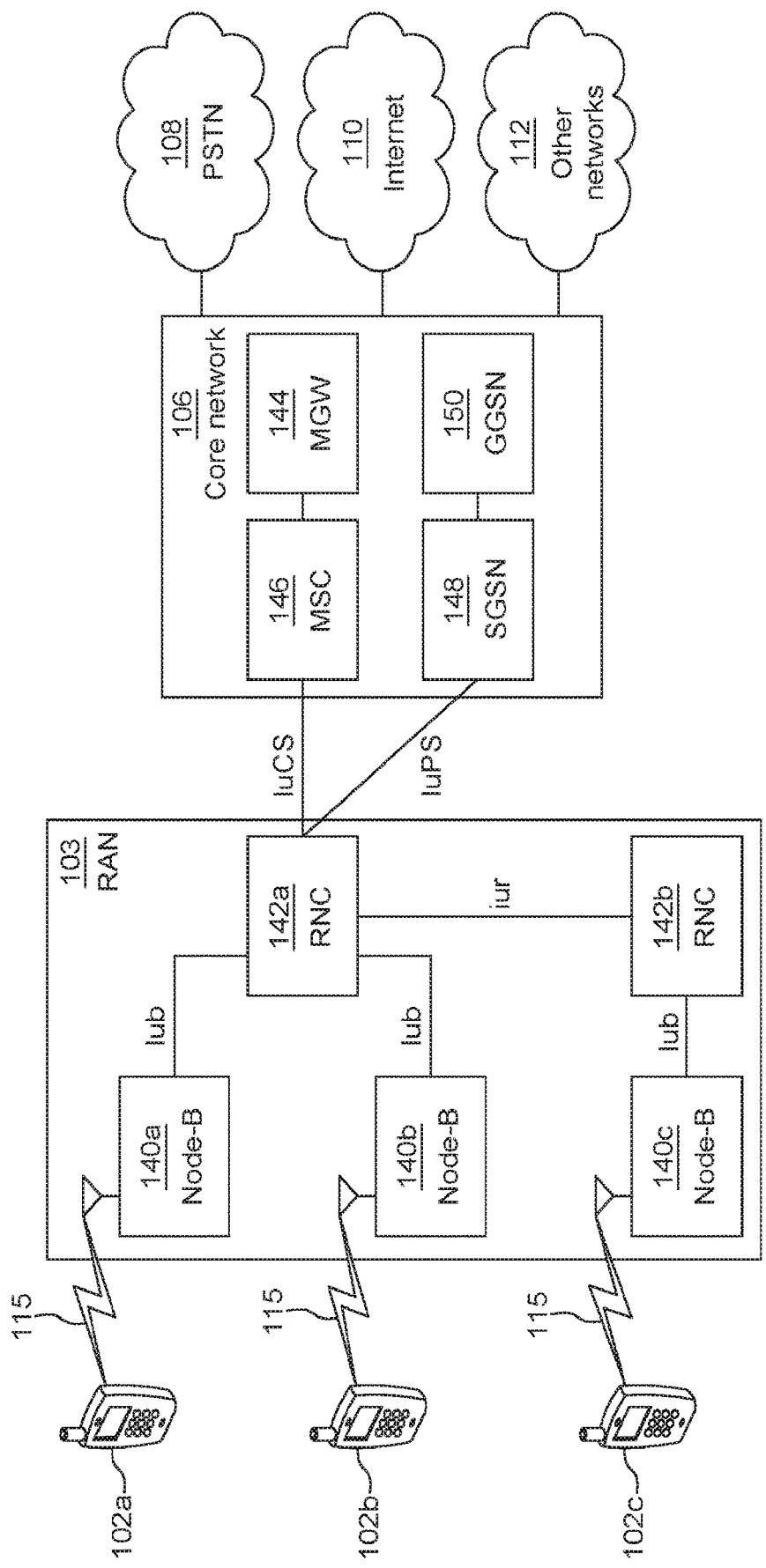
FIG. 1B is a system diagram that shows an example of a Radio Access Network (RAN) architecture and a core network architecture.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
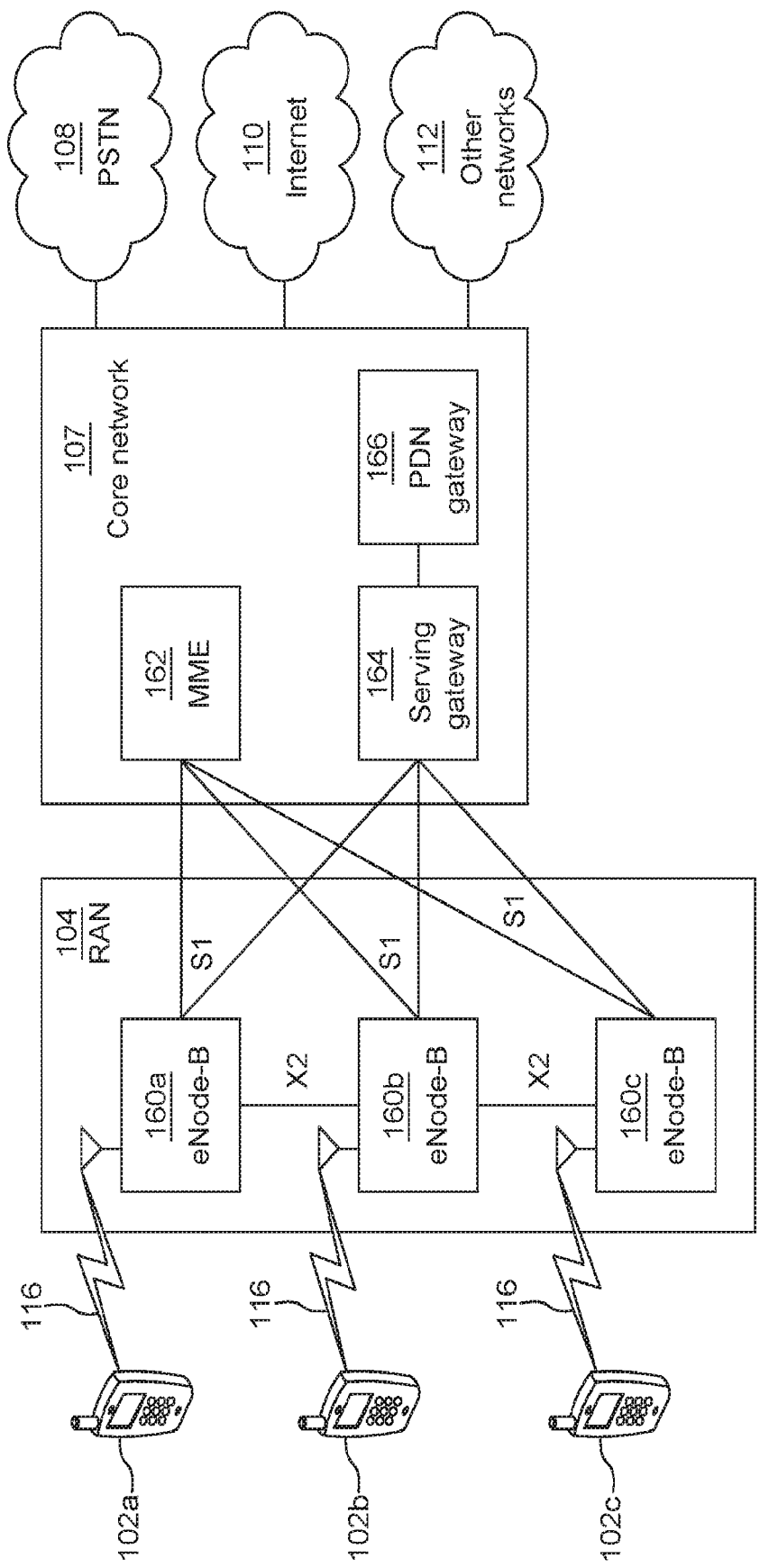
FIG. 1C is a system diagram that shows an example of a Radio Access Network (RAN) architecture and a core network architecture.

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-B s. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
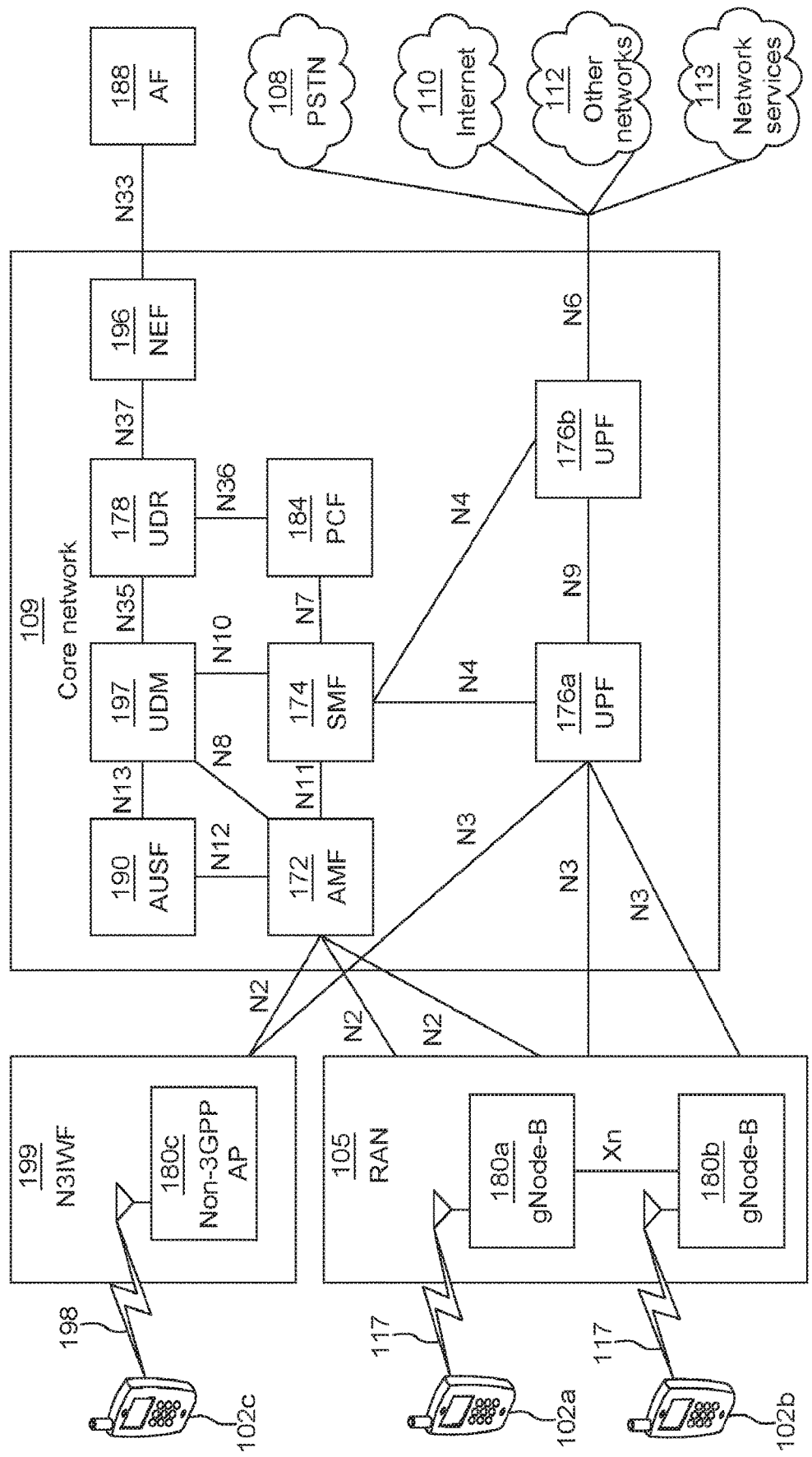
FIG. 1D is a system diagram that shows an example of a Radio Access Network (RAN) architecture and a core network architecture.

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible for forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible for packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
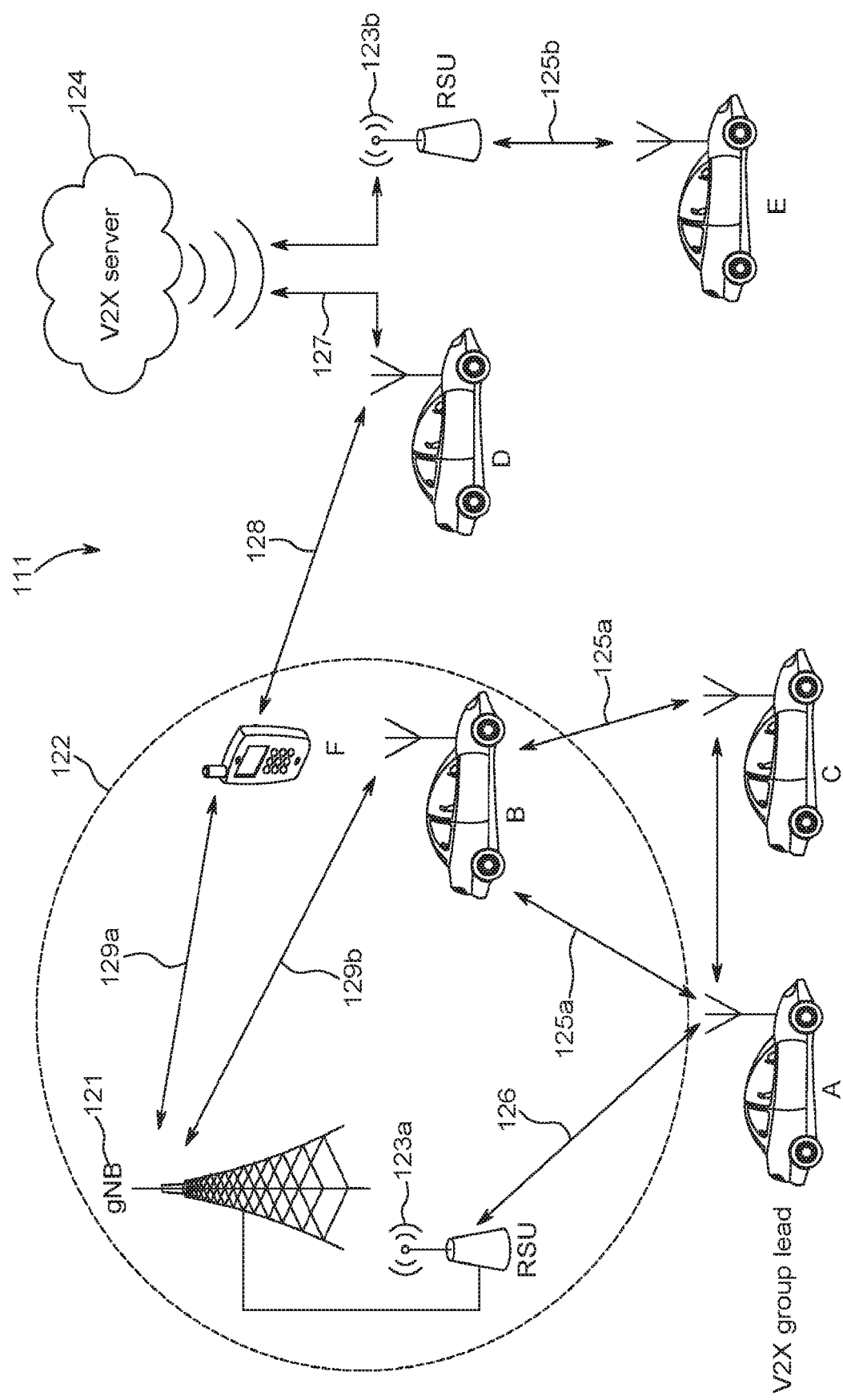
FIG. 1E is a system diagram that shows an example 3GPP architecture.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 122. WTRUs A, B, and C form a V2X group, among which WTRU A is the group lead and WTRUs B and C are group members.

WTRUs A, B, C, D, E, F may communicate with each other over a Uu interface 129b via the gNB 121 if they are under the access network coverage (only B and F are shown under the network coverage in FIG. 1E). WTRUs A, B, C, D, E, F may communicate with each other directly via a Sidelink (PC5 or NR PC5) interface 125 a, 125b, 128, if they are under or out of the access network coverage (e.g., A, C, WTRUs A, B, C, D, E, F may communicate with each other D and E are shown out of the network coverage in FIG. 1E).

WTRUs A, B, C, D, E, and F may communicate with RSU 123a or 123b via a Vehicle-to-Network (V2N) 126 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
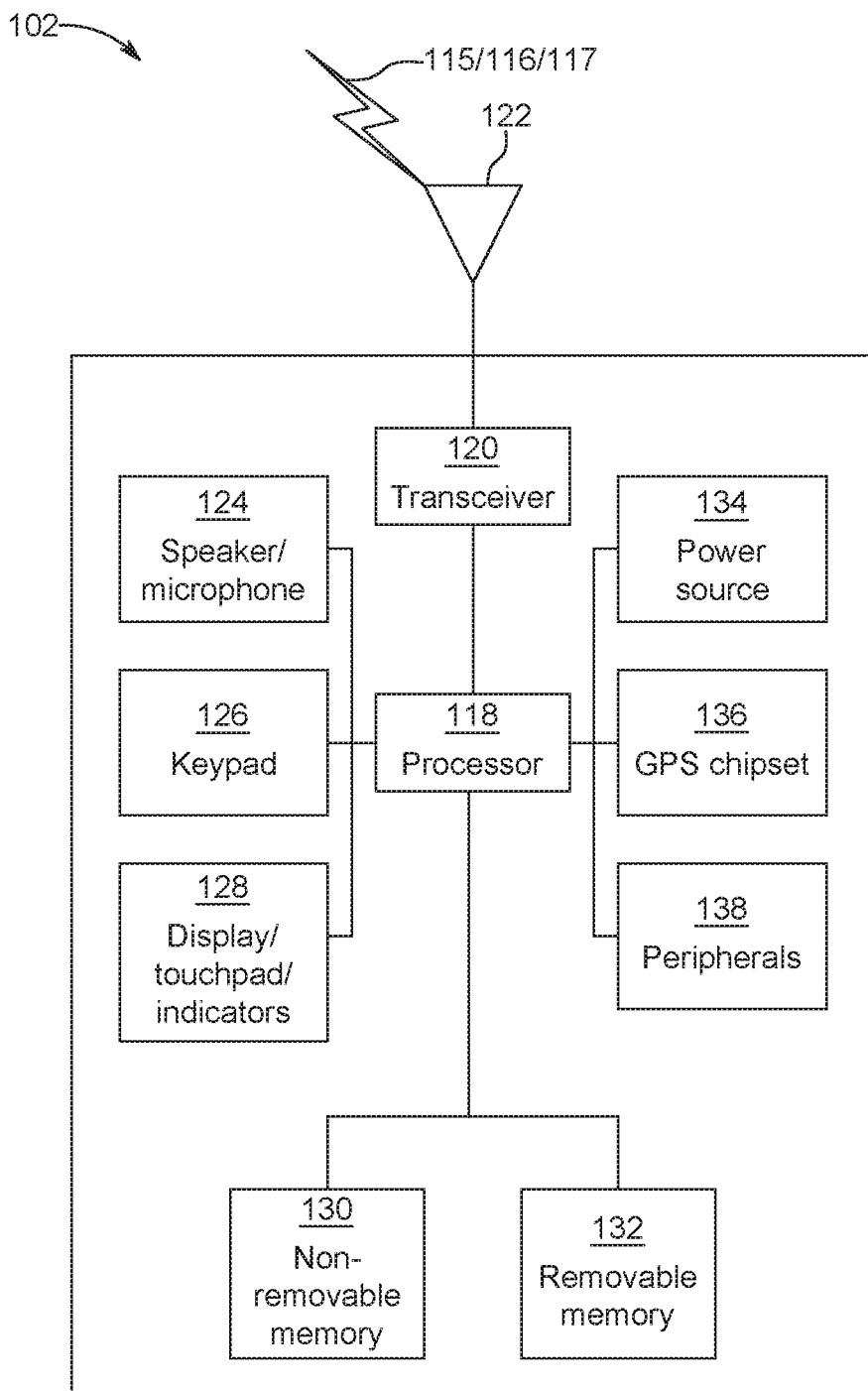
FIG. 1F is a system diagram of an example apparatus or device configured for wireless communications.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
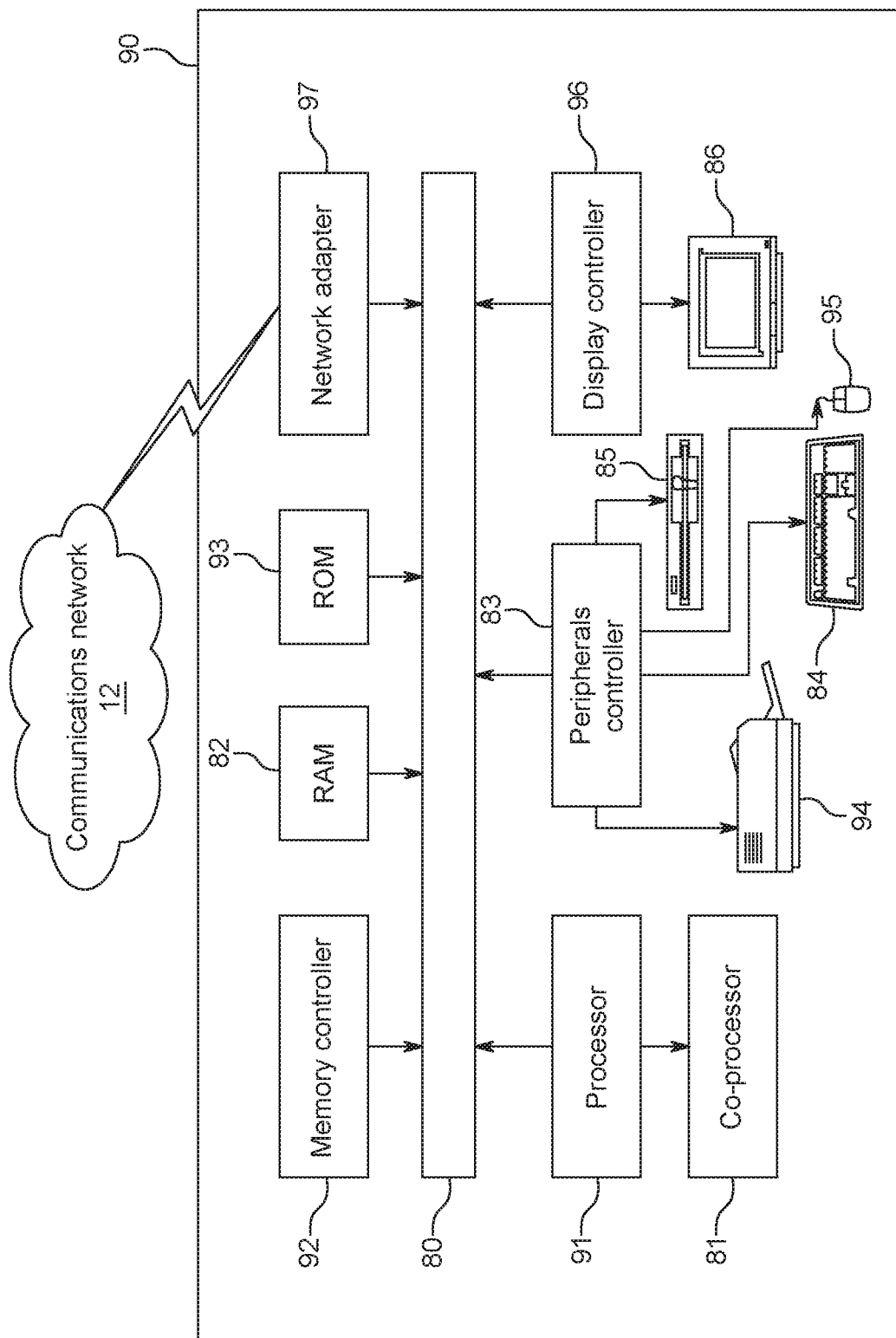
FIG. 1G is a system diagram that shows an example of a computing system used in a communication network.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

5G System Architecture

Figure 2:
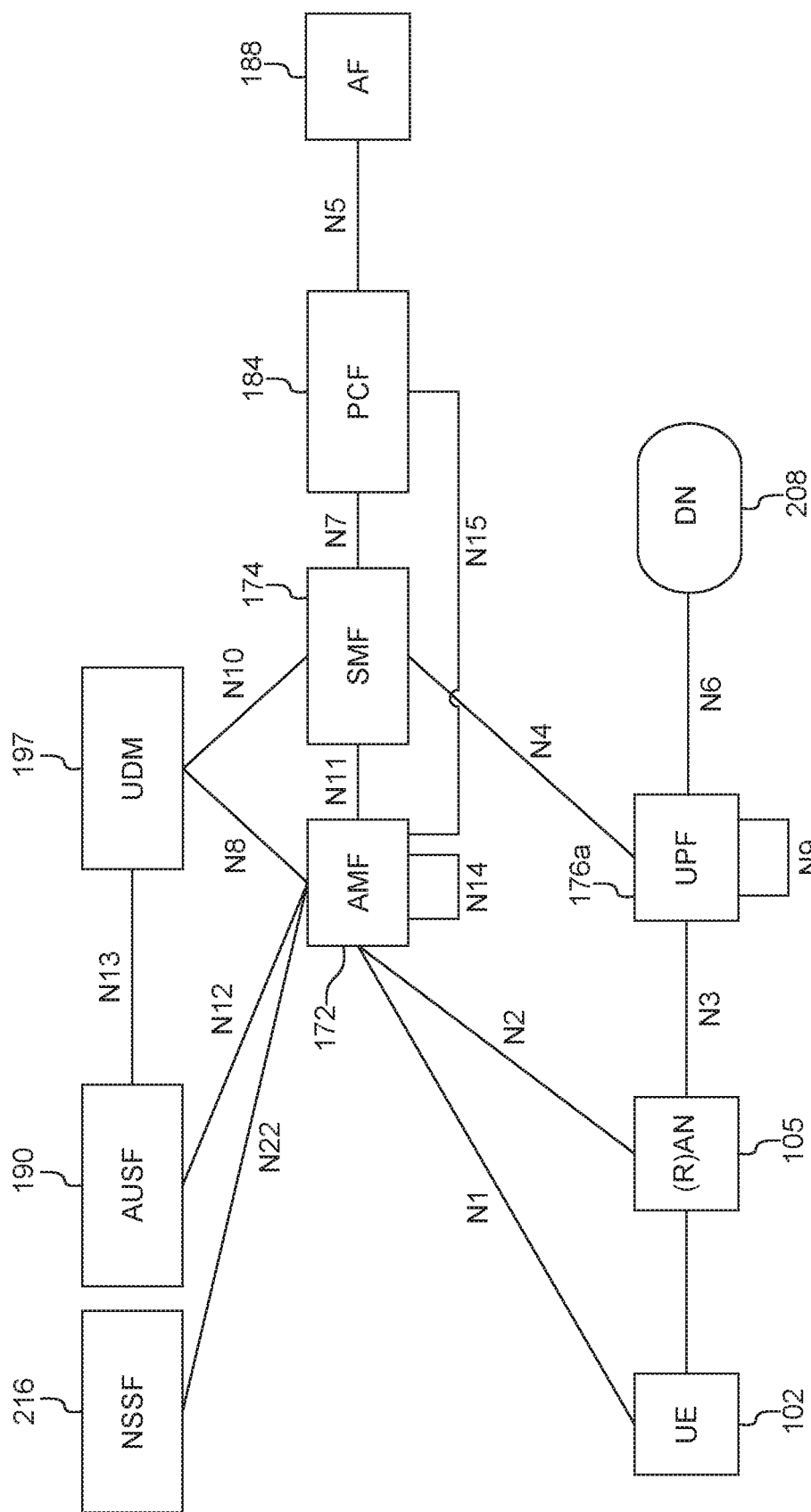
FIG. 2 shows a non-roaming 5G system architecture in accordance with an exemplary embodiment.

FIG. 2 shows the 3GPP 5G non-roaming system architecture where various entities interact with each other over the indicated reference points. A User Equipment (UE) 102 may communicate with a Core Network (CN) to establish control signaling and enable the UE 102 to use services from the CN. Examples of control signaling functions are: registration, connection and mobility management, authentication and authorization, session management, etc.

The following Network Functions (NFs) from FIG. 2 are the main NFs in the Control Plane (CP) of the CN involved with control signalling:

Access and Mobility Function (AMF) 172: The UE 102 sends an N1 message through the RAN node 105 to the AMF 172 to perform many control plane signaling such as registration, connection management, mobility management, access authentication and authorization, etc.

Session Management Function (SMF) 174: The SMF 174 is responsible for session management involved with establishing PDU sessions to allow UEs to send data to Data Networks (DNs) 208 such as the internet or to an application server and other session management related functions.

Policy and Control Function (PCF) 184: The PCF 184 provides the policy framework that governs network behavior, accesses subscription information to make policy decisions, etc.

Authentication Server Function (AUSF) 190: The AUSF 190 supports authentication of UEs for 3GPP and untrusted non-3GPP accesses.

Unified Data Management (UDM) 197: The UDM 197 supports generation of 3GPP AKA Authentication Credentials, user identification handling, subscription management, etc.

Network Slice Selection Function (NSSF) 216: The NSSF 216 is involved with aspects of network slice management such as selection of network slice instances for UEs, management of NSSAIs, etc.

Radio Access Network (RAN) 105: The RAN node 105 offers communication access from the UE 102 to the core network for both control plane and user plane communications.

5G Roaming Architecture

Figure 3:
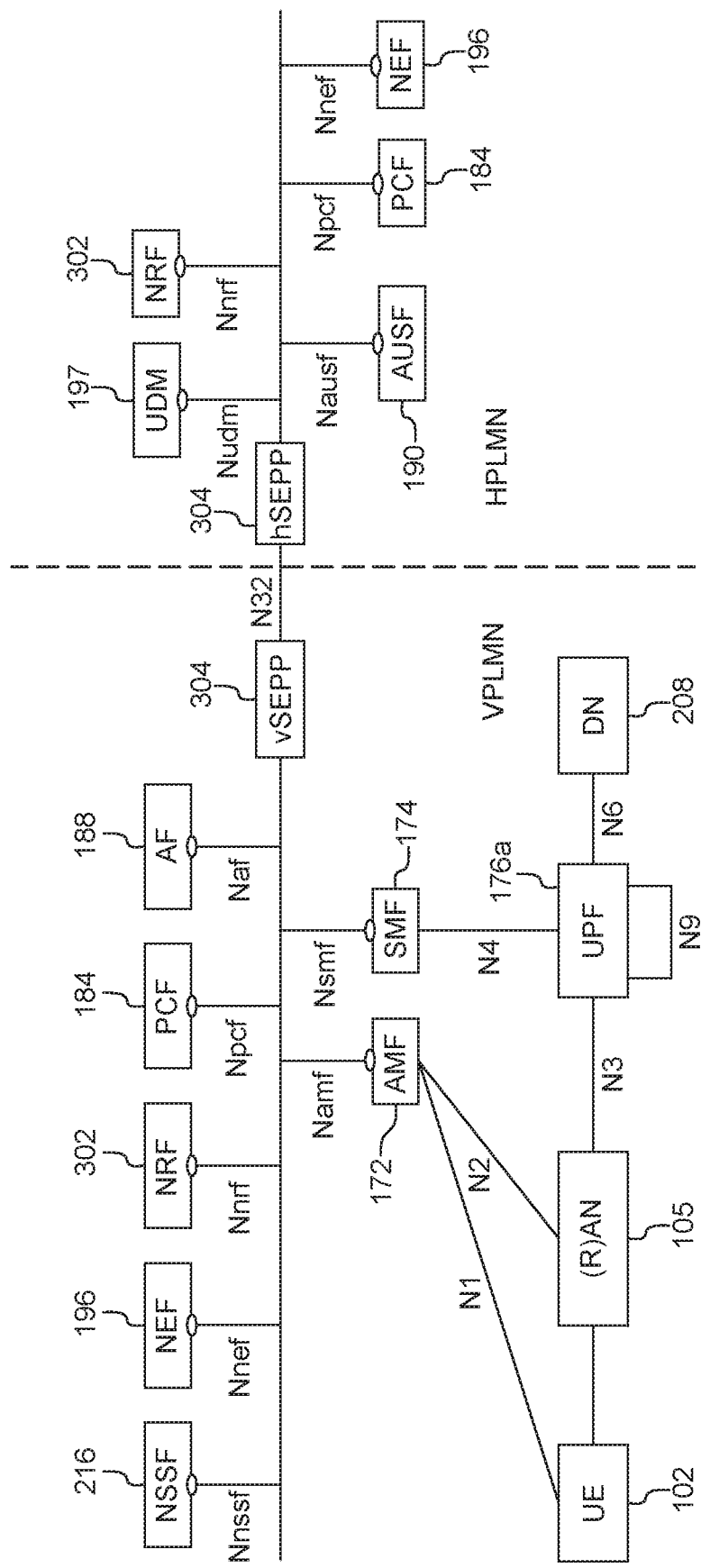
FIG. 3. shows a roaming 5G system architecture in accordance with an exemplary embodiment.

FIG. 3 shows the 5G system roaming architecture for the local breakout scenario in service-based representation where VPMLN is the Visited PLMN and HPLMN is the Home PLMN. The Security Edge Protection Proxy (SEPP) 304 enables communication between the VPLMN and HPLMN.

Figure 4:
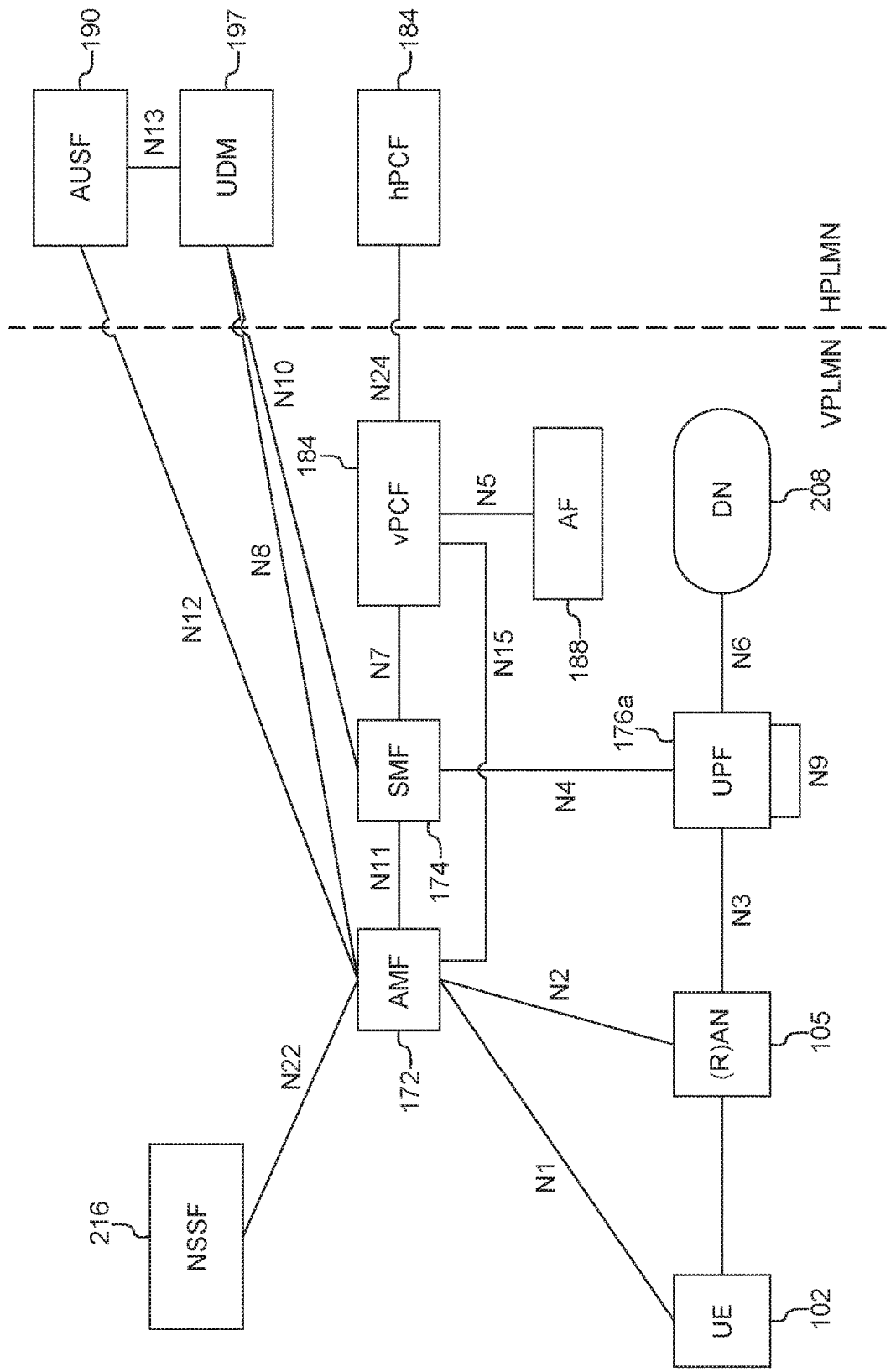
FIG. 4 shows a roaming 5G system architecture in accordance with an exemplary embodiment.

FIG. 4 shows the 5G system roaming architecture for the local breakout scenario in reference point representation. In this figure, the SEPPs are not depicted for the sake of clarity. The AMF in the VPLMN is able to communicate with the AUSF of HPLMN over the N12 interface to authenticate the UE from the HPLMN. Policy information may be communicated between vPCF and hPCF over the N24 interface.

5G Registration Procedure

Figure 5A:
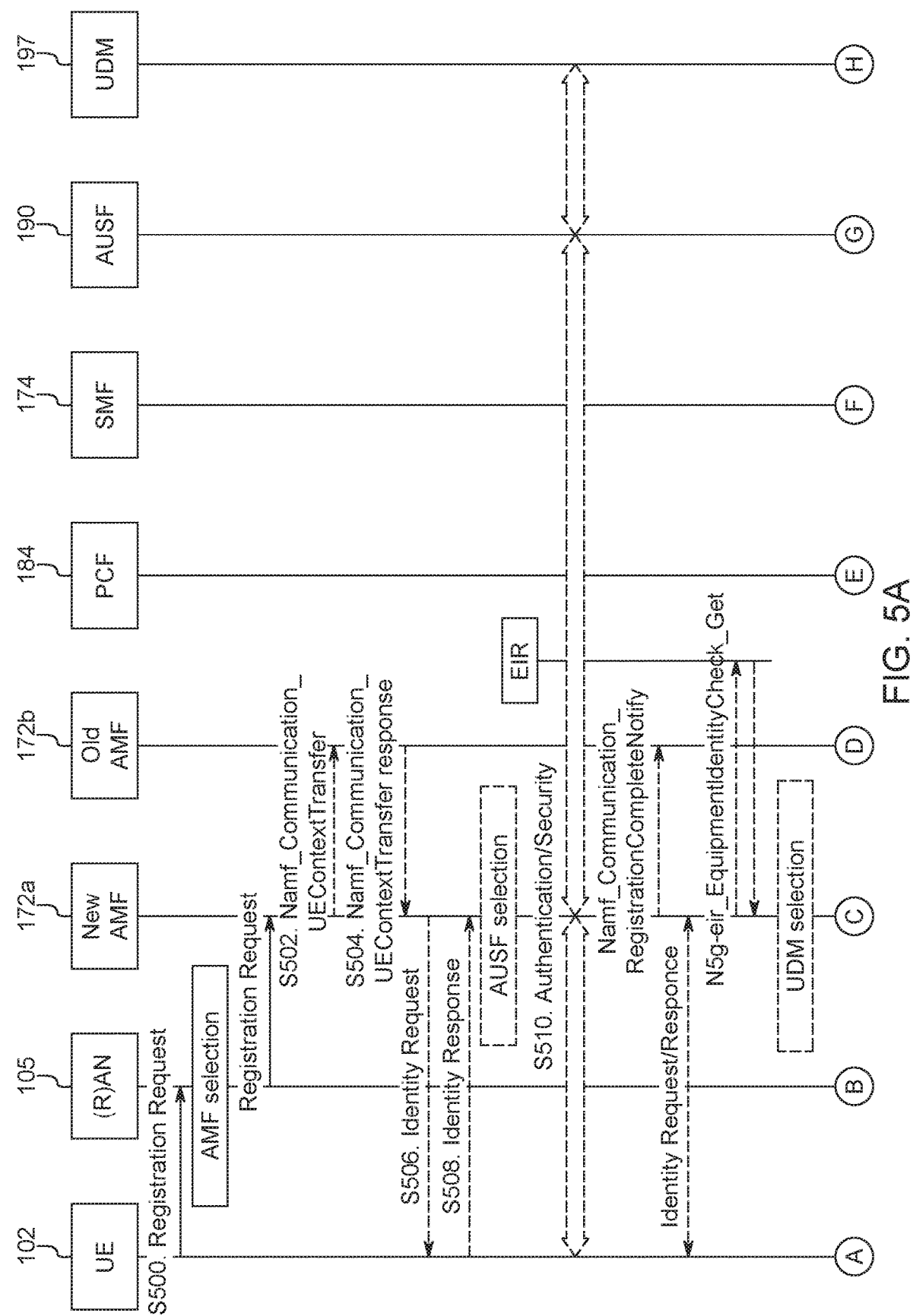
FIG. 5 shows a 5G general registration procedure in accordance with an exemplary embodiment.
Figure 5B:
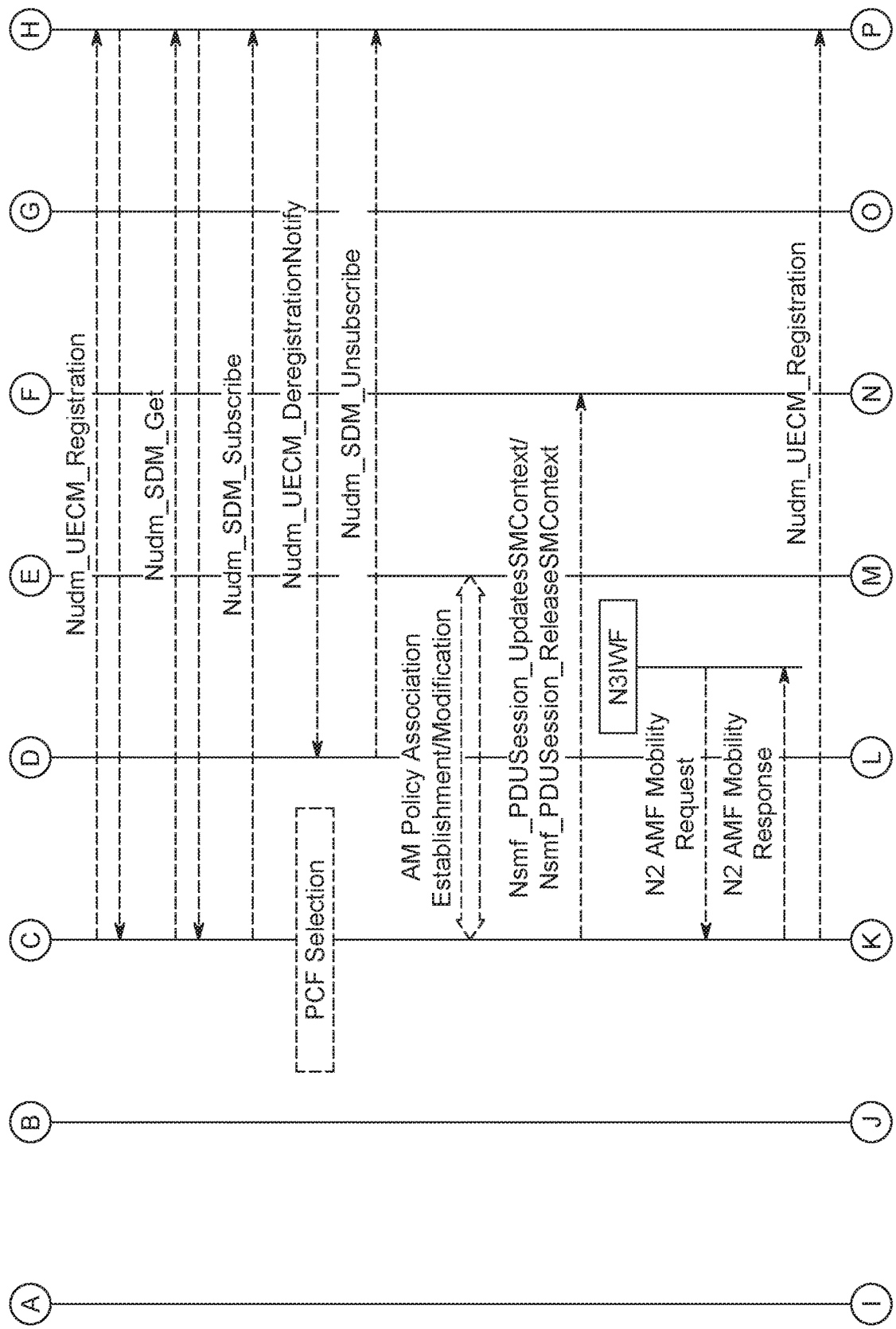
Figure 5C:
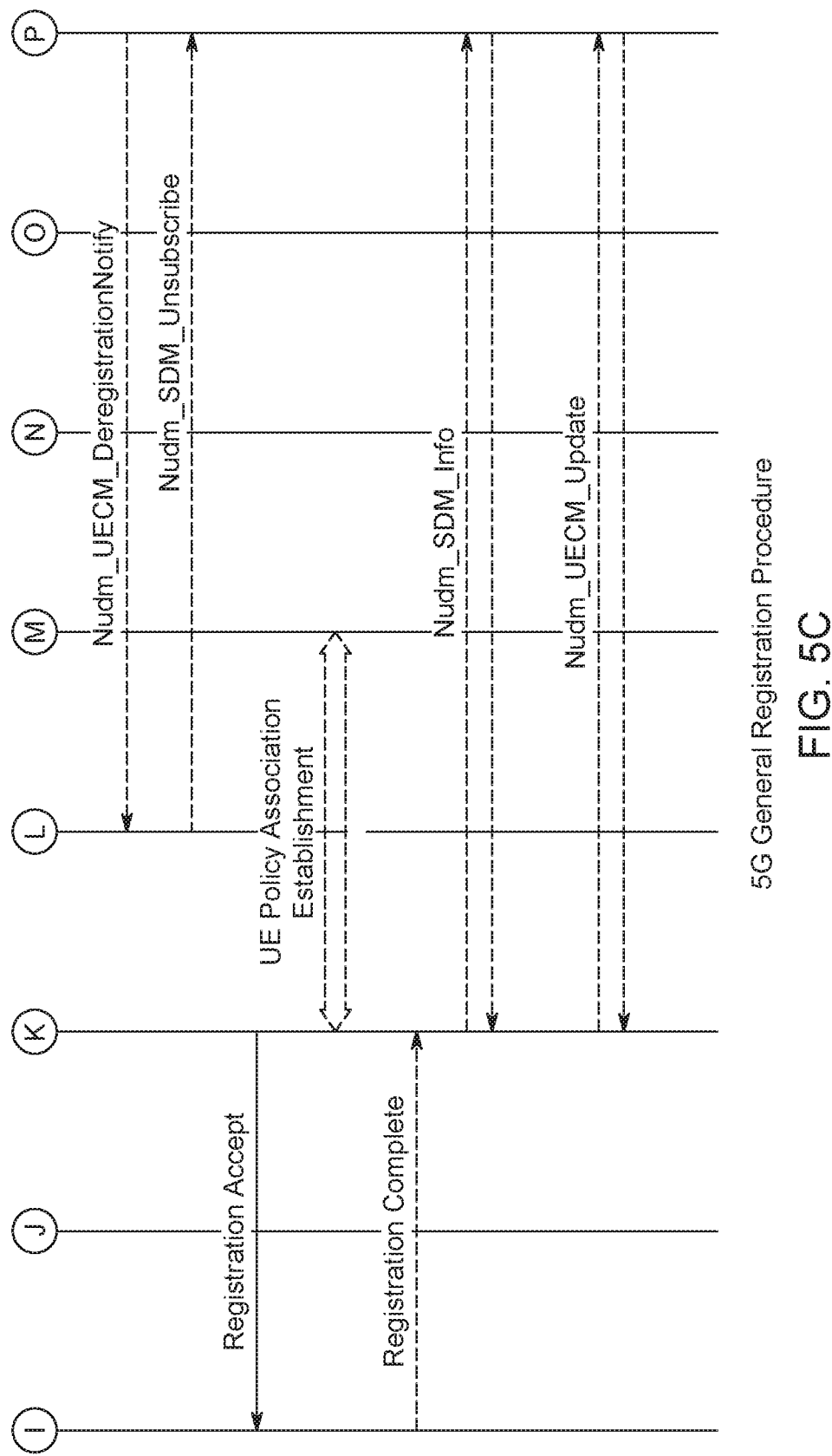

A UE must register to the core network before the UE can use the services offered by the CN. FIG. 5 shows the 5G General Registration procedure from TS 23.502 [2] that a UE executes to register to the CN. The following are note-worthy steps of the General Registration procedure:

In step S500, the UE provides a Registration Type to indicate what the request is for. Two common types are the Initial Registration that is executed by the UE to first establish registration with the CN and Period Registration Update which is executed at periodic intervals to inform the CN the UE is still present. In addition, the UE may provide the CN an identifier such as the SUCI that the CN uses to authenticate the UE in step S510 during initial registration.

In steps S502, S504, S506, S508, the AMF may obtain the SUCI for the UE if it was not provided in step S500.

In step S510, the AUSF authenticates the UE based on subscription information provided by the UDM and the SUCI provided by the UE.

In step S512, the AMF returns the Registration Accept message to the UE indicating the results of the registration procedure. For initial registration, the Accept message includes a temporary identifier such as the 5G-GUTI, a list of allowed network slices, DRX parameters, and other pertinent data for UE operations. The 5G-GUTI identifier contains a 5G-S-TMSI identifier that is used to identify paging requests for the UE.

Registration, Connection, and Radio Resource Control Management States

In 5GS, the UE maintains management states to enable communications with the core network. These management states consist of registration (RM), connection (CM), and radio resource control (RRC) management states. The management states are maintained in both the UE and the RAN/CN.

Figure 6:
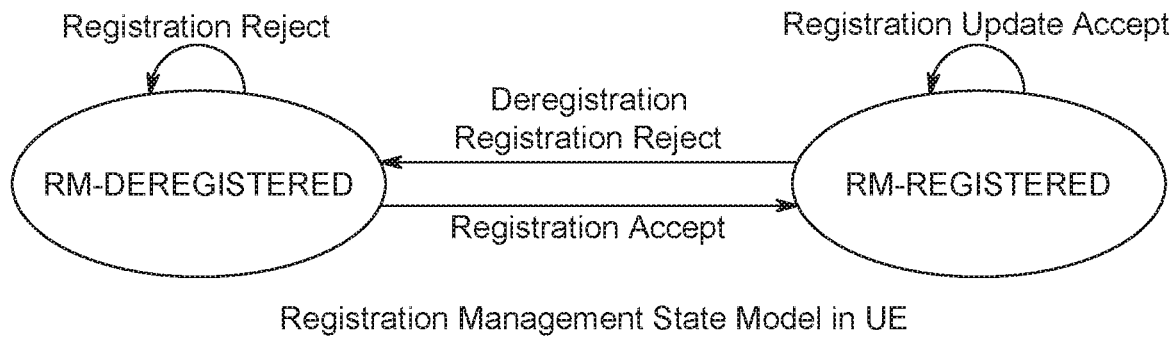
FIG. 6 shows a registration management state model in a UE in accordance with an exemplary embodiment.

In order for a UE to use the services offered by the CN, the UE must register with the CN by executing an Initial Registration procedure. Once registered, the UE goes from RM-DEREGISTERED state to RM-REGISTERED state as shown in FIG. 6. The UE needs to perform Periodic Registration Update to remain in the RM-REGISTERED state with the network. When the UE is in the RM-DEREGISTERED state, it cannot access services offered by the CN.

Figure 7:
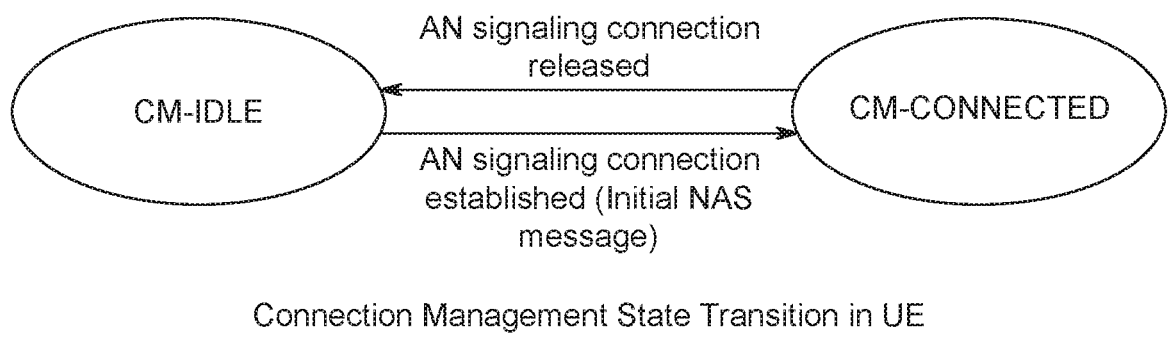
FIG. 7 shows a connection management state transition in a UE in accordance with an exemplary embodiment.

The Connection Management (CM) states shown in FIG. 7 represents the NAS signaling connection between the UE and the AMF over the N1 interface. This signaling connection allows the UE and the CN to communicate information over the control plane for efficient communications within the 5G system.

Finally, the UE also maintains RRC states with the RAN node and is described in TS 38.300 [4] as follows:

RRC_IDLE: A UE in this state performs PLMN selection, receives broadcast system information, and performs cell re-selection. In addition, the UE can be put into Discontinuous Reception (DRX) mode and monitors for paging requests from the 5GC.

RRC_INACTIVE: A UE in this state performs similar functions as those for RRC_IDLE except for the fact that paging requests are initiated by the RAN node. In addition, the UE and RAN node maintain context information that enables the UE to quickly transition to the RRC_CONNECTED state. Both control and user plane connections between the RAN node and the 5GC are established for the UE when in this state.

RRC_CONNECTED: The transfer of unicast data to/from the UE is enabled when a UE is in this state. This is due to both CP and UP being established between the RAN node and the CN for the UE and other context information being kept between the UE and RAN node to enable communications.

5G Paging Mechanism

Figure 23:
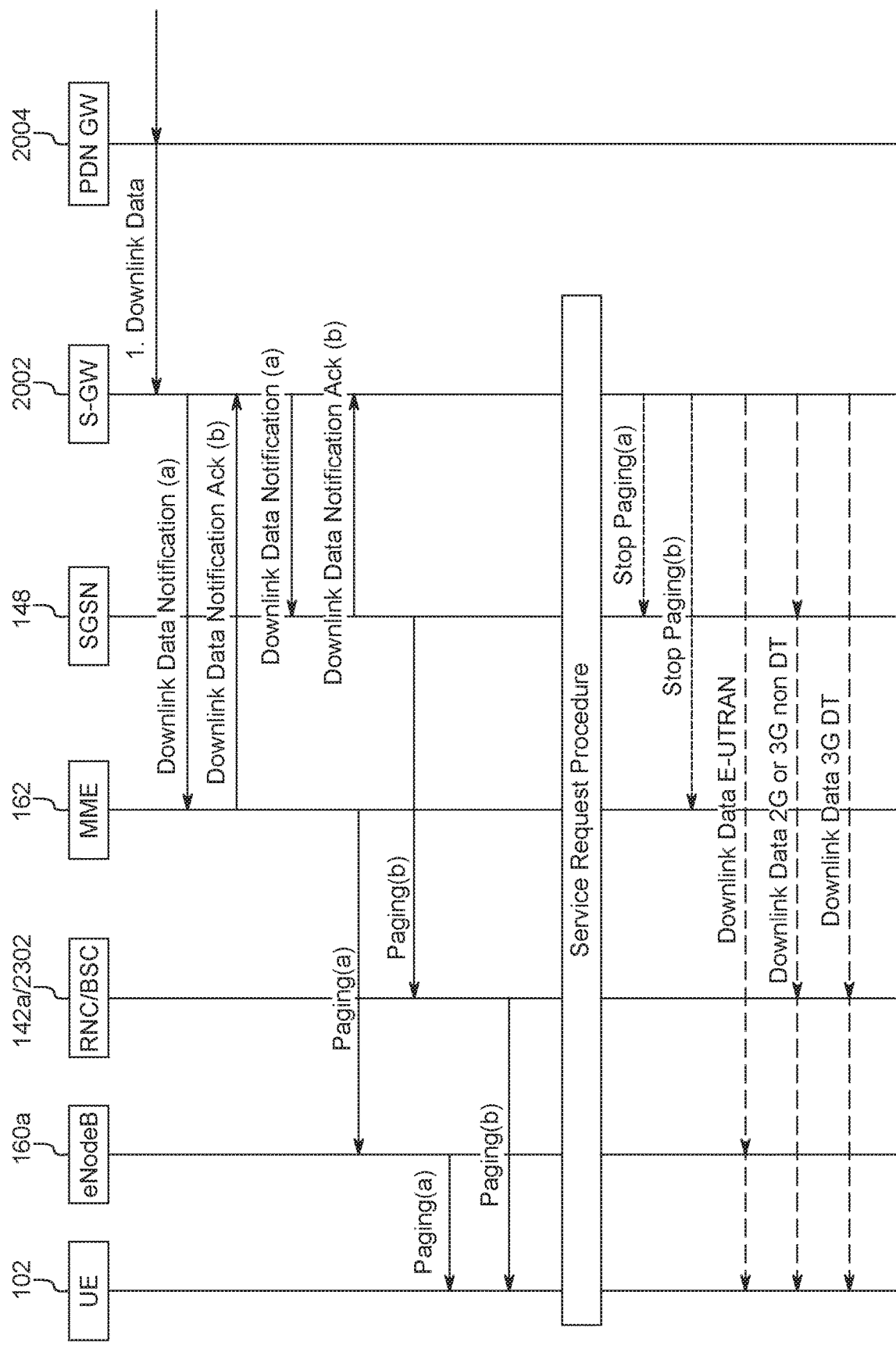
FIG. 23 shows the EPS network triggered service request procedure in accordance with an exemplary embodiment.

Paging refers to the mechanism in 5GS in which either the core network or the RAN notifies a UE in CM-IDLE or RRC_IDLE/RRC_INACTIVE states of pending data destined for the UE. TS 38.304 [5] provides a description of UEs using Discontinuous Reception (DRX) when in RRC_IDLE and RRC_INACTIVE states in order to reduce power consumption during periods of inactivity. The UE monitors for Paging Occasions (PO) during DRX to be informed of activities in the CN that may require the UE to establish connectivity. The UE makes calculations based on information provided by System Information received by the UE and a UE_ID to know when to monitor for the paging occasions. The UE_ID is computed from an identifier for the UE such as IMSI or 5G-S-TMSI by modulo operation of the identifier to 1024. At the network side, paging works similarly in 5G as LTE paging that is shown in FIG. 23.

Identifiers

Section 5.9.4 of 23.501 describes the 5G Globally Unique Identifier (5G-GUTI).

The 5G-GUTI is structured as:

<5G-GUTI>:=<GUAMI><5G-TMSI> where GUAMI identifies the assigned AMF and 5G-TMSI identifies the UE uniquely within the AMF.

The Globally Unique AMF ID (GUAMI) shall be structured as:

<GUAMI>:=<MCC><MNC><AMF Region ID><AMF Set ID><AMF Pointer> where AMF Region ID identifies the region, AMF Set ID uniquely identifies the AMF Set within the AMF Region and AMF Pointer uniquely identifies the AMF within the AMF Set.

NOTE 1: The AMF Region ID addresses the case that there are more AMFs in the network than the number of AMFs that can be supported by AMF Set ID and AMF Pointer by enabling operators to re-use the same AMF Set IDs and AMF Pointers in different regions.

NOTE 2: See TS 23.003 [19] for details on the structure of the fields of GUAMI. The 5G-S-TMSI is the shortened form of the GUTI to enable more efficient radio signaling procedures (e.g. during Paging and Service Request) and is defined as:

<5G-S-TMSI>:=<AMF Set ID><AMF Pointer><5G-TMSI>

Slice-Specific Authentication and Authorization

Figure 8A:
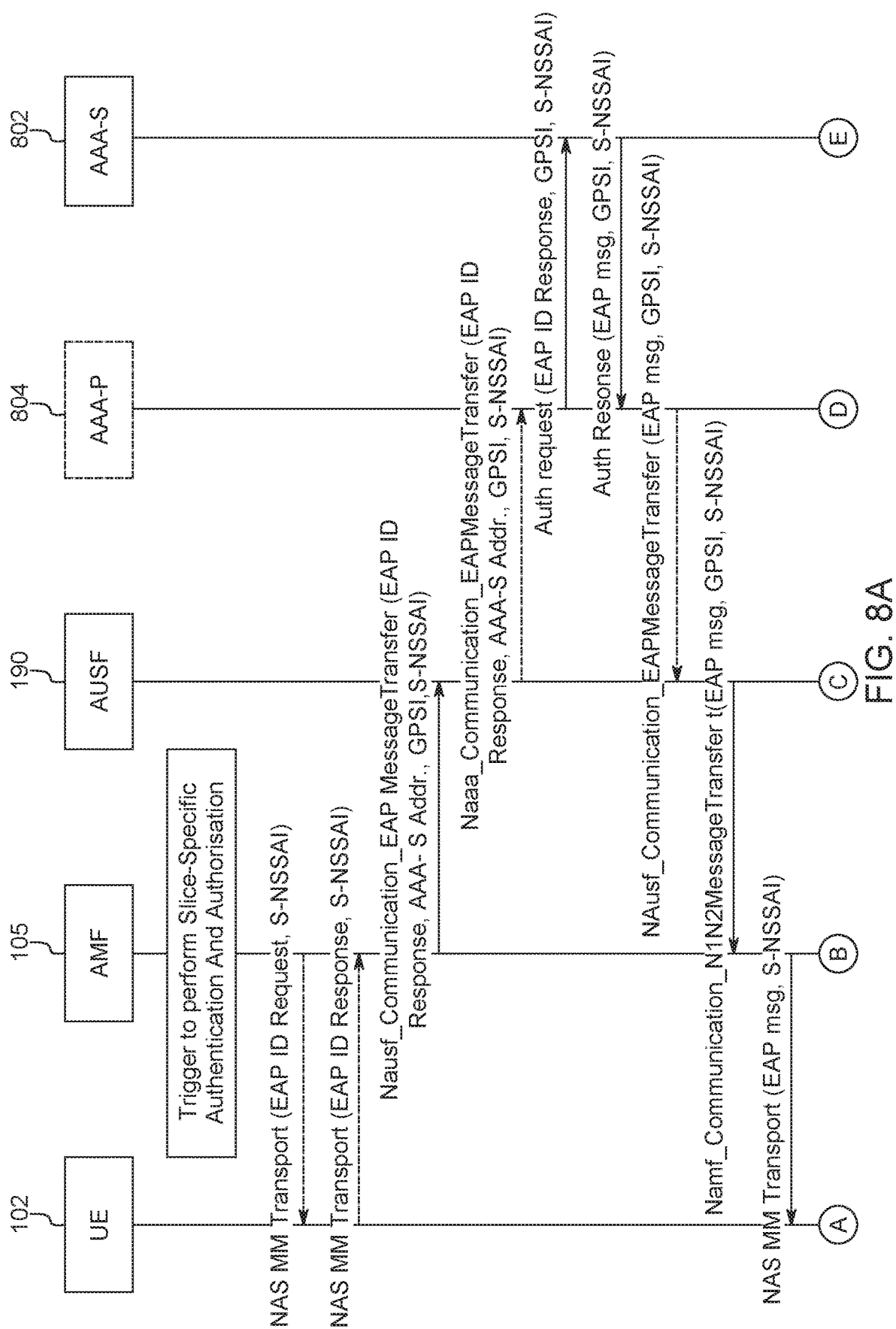
FIG. 8 shows a network slice-specific authentication and authorization method in accordance with an exemplary embodiment.
Figure 8B:
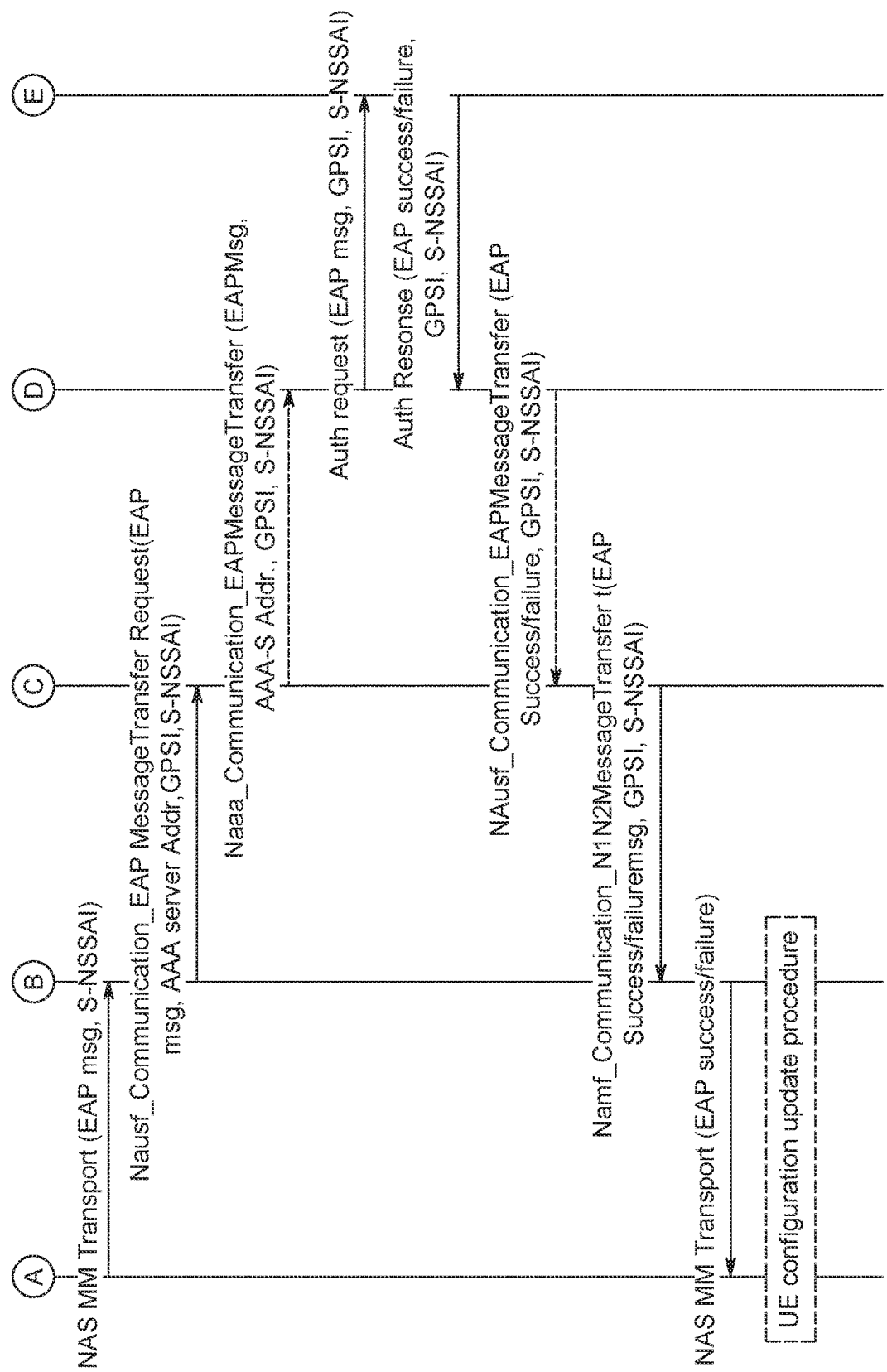

In Release 16 of the 5G System, 3GPP has agreed to add a Slice-Specific Authentication and Authorization feature. The procedure allows the Network to initiate an EAP based procedure with the UE when the UE attempts to register with certain slices (i.e. S-NSSAI's). The EAP based authentication procedure is based on the UE providing a User ID and associated network credentials in order to be authorized to access the slice. The new procedure is described in references [7] and [8] and shown in FIG. 8. FIG. 8 is copied from reference [8].

LTE System Architecture

Figure 19:
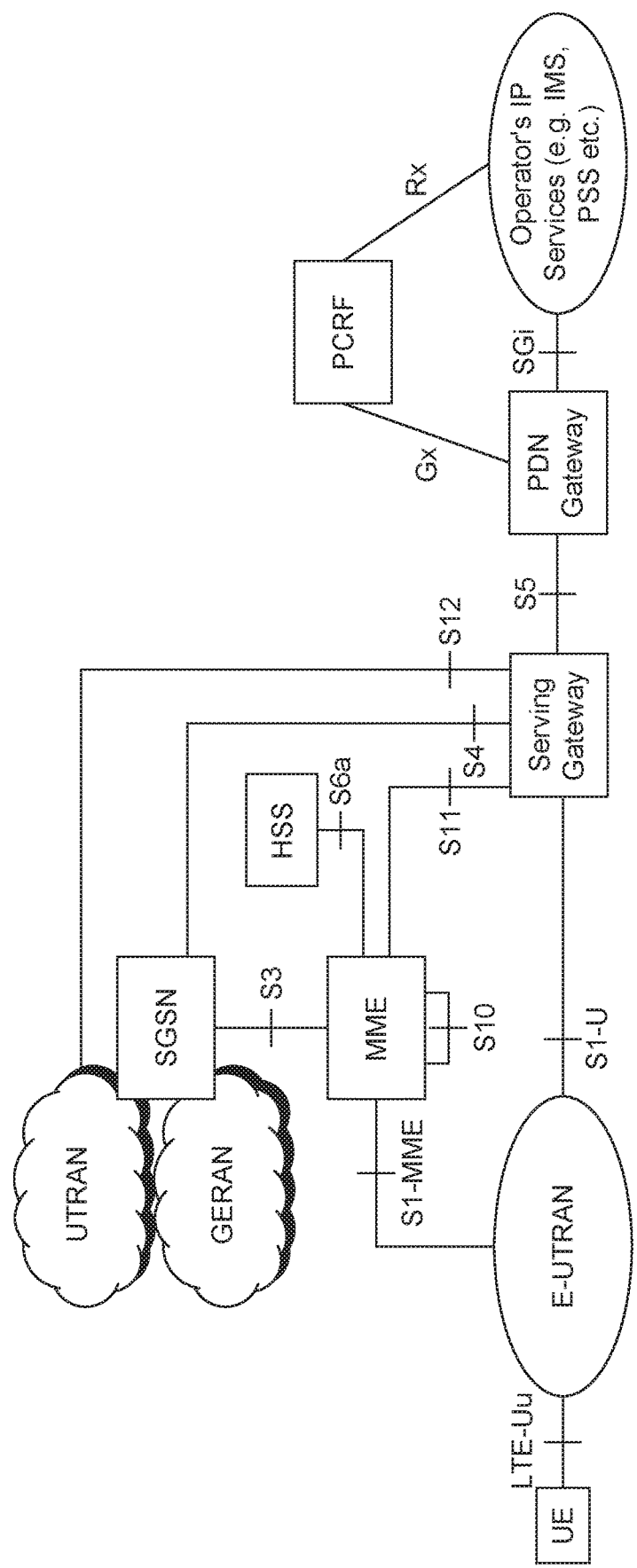
FIG. 19 shows the 3GPP EPS non-roaming system architecture in accordance with an exemplary embodiment.

FIG. 19 shows the 3GPP EPS non-roaming system architecture where a User Equipment (UE) communicates with a Core Network (CN) over the E-UTRAN 3202 to obtain internet services or other operator services such as IMS. The E-UTRAN is a Random Access Network (RAN) that interfaces to the UE through the LTE-Uu interface. The UE accesses the CN using NAS signaling through the E-UTRAN over the S1-MME interface and sends and receives data through the E-UTRAN over the S1-U interface.

The following Network Functions (NFs) from FIG. 19 are described briefly below:

Mobility Management Entity (MME): The MME provides NAS signaling with UEs and authenticates and authorizes UEs to access the CN while also managing UE mobility among the many functions it performs.

Home Subscriber Server (HSS) 2000: The HSS 2000 provides authentication/authorization of the UE as well as stores subscription information for the UE.

Serving Gateway (S-GW) 2002: The S-GW 2002 serves as the mobility anchor point for the UE in the User Plane (UP) that routes and forwards traffic to and from the P-GW.

PDN Gateway (P-GW) 2004: The P-GW 2004 allocates IP address to the UE and offers the UE access to packet data networks such as the internet.

Policy and Charging Rules Function (PCRF) 2006: The policy and charging element of the core network.

LTE Attach Procedure

Figure 20A:
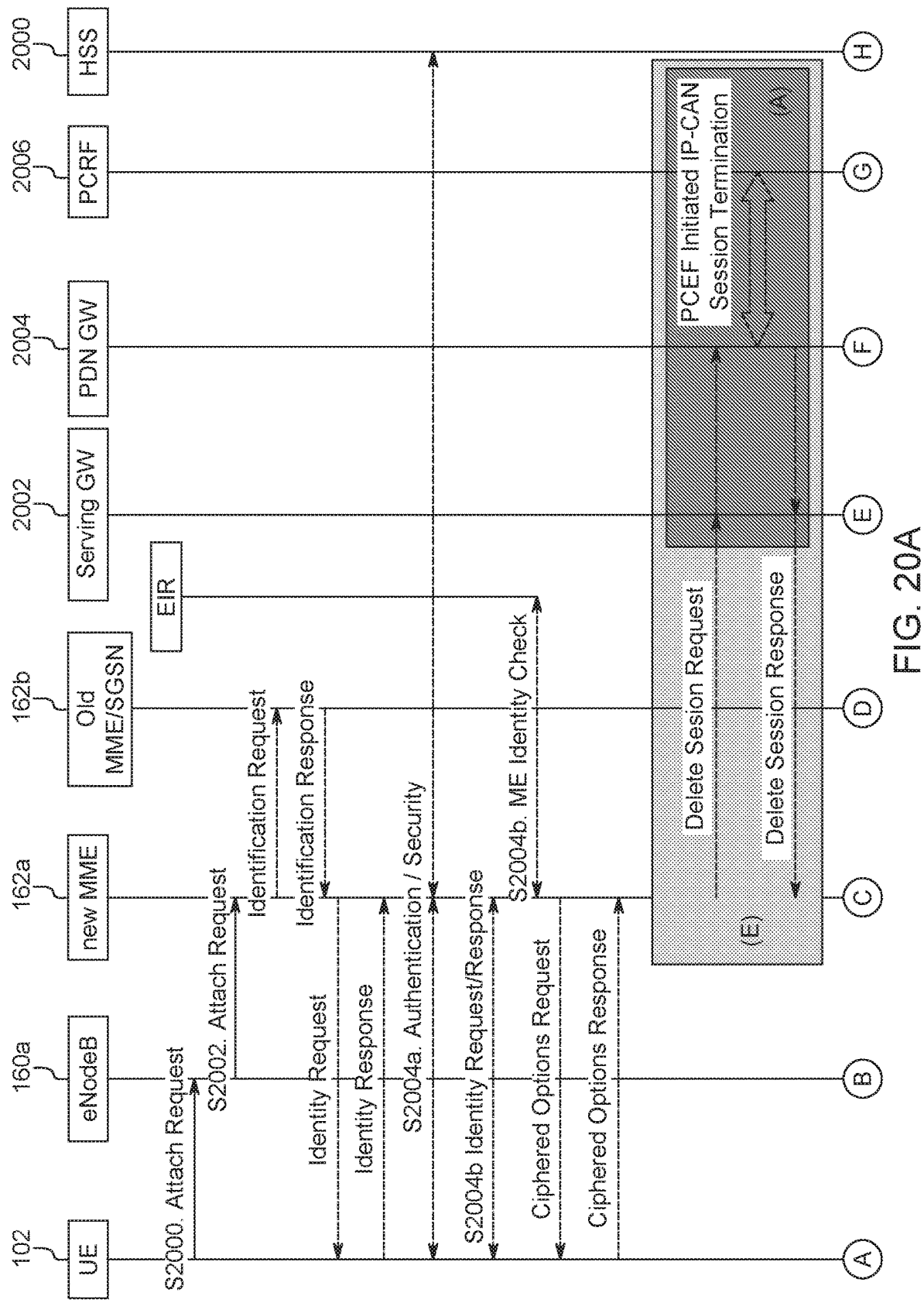
FIG. 20 shows the EPS Attach procedure in accordance with an exemplary embodiment.
Figure 20B:
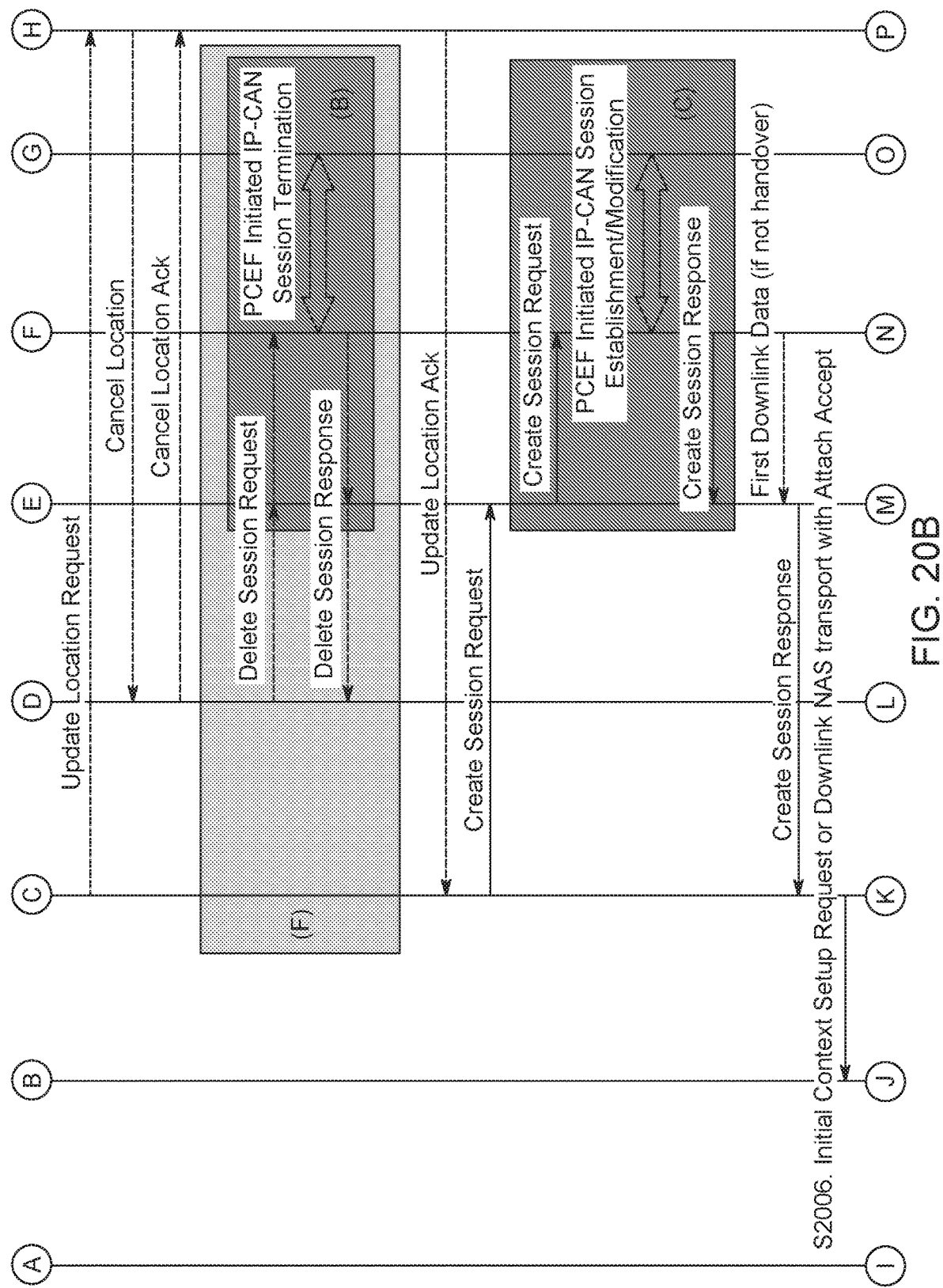
Figure 20C:
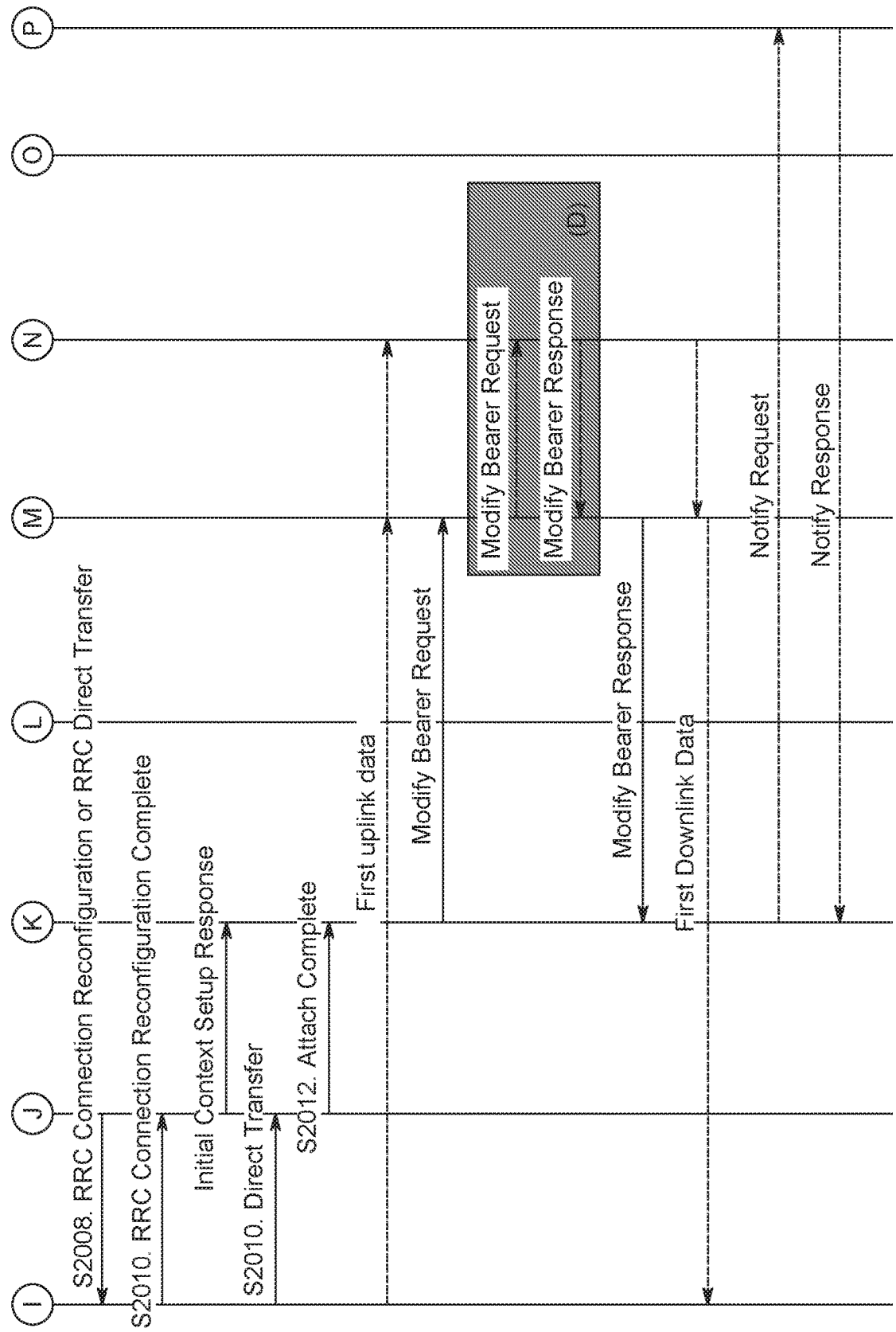

A UE performs the Attach procedure in order to register to a core network and use the services from the core network that requires registration. FIG. 20 shows the Attach procedure and some notable steps are highlighted below in relation to initial attach:

In step S2000, UE sends the Attach Request to the CN through the eNodeB. In the request, the UE provides an identifier (IMSI), Attach Type, UE Core Network Capability, UE Specific DRX parameters, Preferred Network behavior, and other message parameters as indicated in [9].

In step S2002, the eNodeB selects an appropriate MME and forwards the request to the selected MME.

In steps S2004a and b, the MME performs Authentication and NAS security setup to activate integrity protection and NAS ciphering, which are mandatory. The MME communicates to the HSS to complete this step. From this point on, NAS signaling are both protected for integrity and ciphering.

In step S2006, the MME returns an Attach Accept to the Attach Request that includes GUTI, TAI List, Session Management Request information, Supported Network Behaviour, Service Gap Time, and other message parameters as indicated in [9].

In step S2008, the eNodeB returns the Attach Accept message to the UE and the UE saves the message parameters for future use. There may be associated RRC signaling as well.

In step S2010, the UE returns a Direct Transfer message, which includes the Attach Complete message. The eNodeB forwards the Attach Complete message to the MME in step S2012.

EPS Mobility Management and Connection Management States

Figure 21:
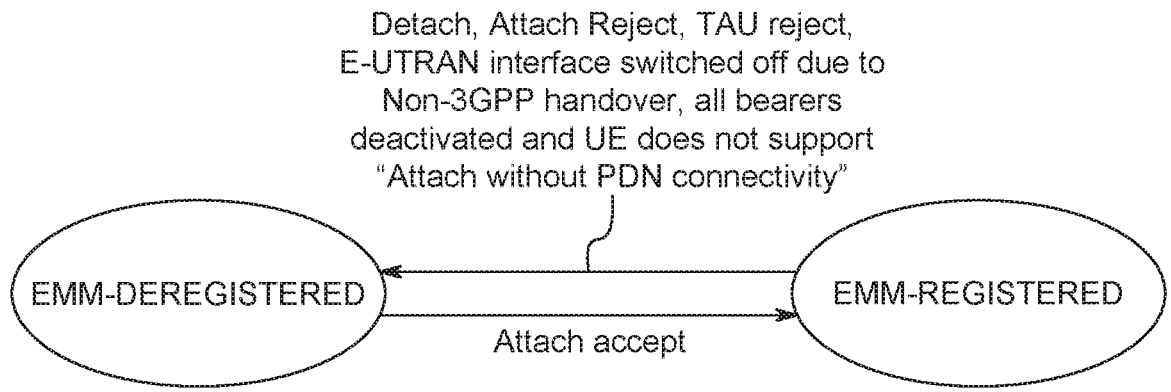
FIG. 21 shows the EPS Mobility Management (EMM) states in accordance with an exemplary embodiment.

The EPS Mobility Management (EMM) states are shown in FIG. 21. The UE is initially in EMM-DEREGISTERED state and after successfully attaching to the network, the UE enters the EMM-REGISTERED state. Once registered, the UE is then able to use the services offered by the network, such as connecting to the internet and making IMS calls. The UE remains in the EMM-REGISTERED state by performing a Tracking Area Update (TAU) procedure and may be put into the EMM-DEREGISTERED state by performing the Detach procedure.

Figure 22:
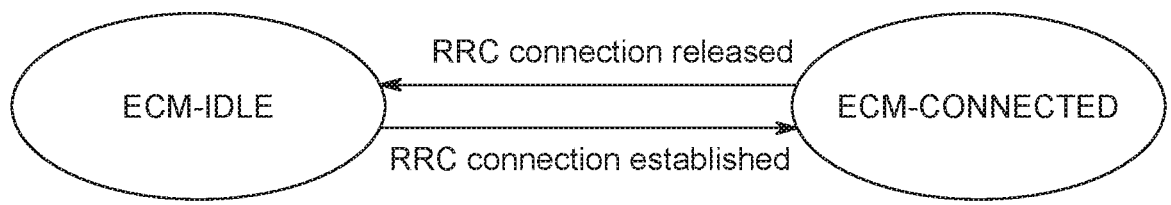
FIG. 22 shows the EPS Connection Management states in accordance with an exemplary embodiment.

The EPS Connection Management states are shown in FIG. 22. These states indicate the state of NAS signaling connection between the UE and the core network. In ECM-IDLE, the UE has no NAS signaling connection and performs cell and PLMN selection. A transition from ECM-IDLE to ECM-CONNECTED state occurs for the following procedures: Attach Request, Tracking Area Update, Service Request, and Detach Request.

LTE Paging and Service Request

When a UE 102 is in ECM-IDLE state and data is available in the core network for the UE 102, the MME 162 sends a paging request to the UE 102 as shown in FIG. 23. The UE 102 may then connect to the core network to receive the data associated with the page after performing a Service Request procedure. The S-GW 2002 then stops paging the UE 102 and downlink data are transferred to the UE 102 over the user plane. TS 36.304 [5] describes the calculations of paging occasions for UEs in Discontinuous Reception (DRX) and how the paging occasions are calculated based on the UE's identifier. Based on the calculations, two UEs may have the same paging occasions and can be monitoring for paging messages at the same time. The paging message will identify the recipient of the page using the associate UE identifier.

Problem Statement

UEs with multiple USIMs can be applied to various use cases that take advantages of having registrations with two or more operator networks. TR 22.834 [6] from the MUSIM study in 3GPP SA1 working group highlights scenarios where use cases involving multiple USIMs may exist. This disclosure focuses on cases where the UE is equipped with common radio and baseband components to support the multiple USIMs. Thus, radio and baseband components cannot be dedicated to a single USIM. The disclosure will also provide solutions for dual Rx, single Tx UEs that are also in scope with the MUSIM study.

The MUSIM SA1 study highlights potential requirements for multiple USIM UEs. Some of these requirements are:
  Support of UEs with multiple USIMs in the 3GPP system
  Support of UE implementations with single Rx, single Tx and dual Rx, single Tx
  A MUSIM UE to allow users to configure preferences of services from multiple USIMs
  The 3GPP system should support a MUSIM UE with multiple USIMs from the same or different operators
  The 3GPP system to indicate the type of traffic to a MUSIM UE that triggered the paging procedure
  The 3GPP system shall be able to suspend an active communication and to resume a suspended communication in communications with multiple USIM UEs
  The 3GPP system shall minimize paging collisions for paging with multiple USIM UEs
  The 3GPP system shall minimize signaling overhead with supporting multiple USIMs
  MUSIM UE should be supported in both 5G and LTE systems Note that the terms SIM and USIM (as utilized in TR 22.834 [6]) are used interchangeably in this disclosure. In addition, the term multi-SIM will be used to refer to multiple USIMs. Note also that the terms LTE and EPS are used interchangeably in this disclosure.

Use Case 1

A user is traveling abroad from the United States to Asia and has a UE that supports multiple USIMs. For cost reduction purposes, the UE is implemented with common radio and baseband components in which the USIMs share access. As a result, only one USIM can be active at any one time. The user purchases a USIM upon arrival for access to cellular services while traveling within the destination country. The travel USIM provides services for local voice, text, and high speed data while the home USIM is mostly used to provide voice and text that the user may want to receive from family and friends while traveling.

Use Case 2

Another prominent use case that takes advantage of multiple USIMs centers around a user who has both business and personal subscription services and wants to use both services on the same device. The user has a corporate issued UE with subscription services for USIM1 with operator 1 while the user also has a personal subscription service for USIM2 with operator 2. The user wants to be able to receive voice calls from either service and access data services according to the subscriptions to either USIM1 or USIM2 depending on the time of day or on the application that is using the service.

Problems

As can be seen from the use cases above, a multi-SIM UE that utilizes common radio and baseband components must decide which SIM to service at any instance in time. Current implementations of multi-SIM UEs are proprietary and as a result, implementation varies and UE behaviors may be different. This difference in behavior may negatively impact the operations of the core network as many operations and algorithms are optimized based on the CN's knowledge of the UE's behavior. Both 3GPP SA1 and SA2 working groups are currently studying the issues related to supporting UEs with multiple SIMs.

In those studies, it is proposed that multi-SIM UEs and the corresponding procedures be standardized to provide knowledge of UE behavior to the core network and to enable optimal operations of the UE communicating to either network. The studies focus on UE implementations where common radio and baseband components are used to support the multiple SIMs in the UE. Issues such as how UEs notify the CN of multi-SIM capability, how UEs know when to monitor for paging occasions associated with pages for either SIM, how UEs switch operations from one SIM to the other SIM, how UEs inform the CN when switching usage of SIMs, how to minimize paging collisions, what policies UEs use to provide service type prioritization among the multiple SIMs, etc. remains to be determined. In addition, the support of multiple SIM UEs is expected for both LTE and 5G systems.

One main issue with UEs operating with multiple SIMs and using common radio and baseband components is the issue of monitoring of paging information by a UE of a second SIM when it is actively communicating with a first SIM. This is referred to as paging collisions where paging occasions associated with multiple SIMs overlap in time. A UE with a single transceiver must make the decision to monitor for a single paging channel over other paging channels [6]. This decision may result in a UE missing a page if it is not monitoring for paging requests at the time of the paging occasion for the inactive SIM.

Paging collisions may occur in a multi-SIM UE for several scenarios. One scenario may be that the UE is not actively monitoring for the paging occasions of the inactive SIM as the UE is connected to the network of the active SIM. Since the UE shares common baseband and radio components, the UE is able to connect to one network at a time and monitor for paging occasions associated with the SIM of that network. If a page is sent for the SIM of another network, the UE is not able to receive the page. This wastes radio resources at the RAN node that may be used for other purposes.

Another cause for paging collisions is when the paging occasions of multiple SIMs overlap in time. Again, the UE is able to monitor and process paging occasions associated with one SIM due to the single transceiver. When the paging occasions overlap or are close together, the UE does not have enough time to switch connections to the other network. This once again wastes radio resources at the RAN node.

Even in the case where a multi-SIM UE is able to monitor for paging occasions associated with multiple SIMs, the constant switching performed to achieve this will result in higher power consumption and reduced battery life of the UE. Furthermore, the UE may be switching connections to no avail as for the majority of time, the UE may not be paged if there is no data for the UE. Side effects of the frequent switching are that the UE may be creating scenarios for the occurrence of paging collisions and the UE is not able to enter DRX cycles to preserve battery power.

Overview

Multiple SIM UEs to date have been proprietary solutions implemented by device manufacturers without knowledge of the core networks and outside the scope of the 3GPP standard. Operations of the cellular network were designed where behaviors of the various entities (UE, RAN, and CN) are well defined and are known among the various entities. With the varied implementations of existing multiple SIM UEs, the different behaviors negatively impact the operations of the network and may even degrade its performance. As a result, the MUSIM studies from the 3GPP SA1 and SA2 working groups set out to define the architecture, interfaces, and procedures to support UEs with multiple SIMs.

The requirements set forth in the MUSIM studies focuses on UEs with common radio and baseband components that are shared by the multiple SIMs installed in the UE as well as for dual Rx, single Tx UEs. The goal of the MUSIM work then is for a UE with multiple SIMs to provide the best possible service for each of the SIM's operation. A central focus of the studies is how a UE can provide seamless paging monitoring for the multiple SIMs with common radio and baseband components. Solutions are proposed in this disclosure to address that issue and also for cases with dual Rx, single Tx UEs. Specifically, the solutions consist of:

Defining enhancements to the UE registration and attach procedures to allow multiple SIM UEs to inform the core network that it is a multi-SIM device and to provide information about other SIMs installed in the UE Defining a new registration management state, sub-state, or mode of operation for both the UE and the CN to maintain the UE's registration state for each SIM Defining enhancements to the existing paging request mechanism to allow for paging request forwarding from one PLMN to another PLMN to reach the UE Defining a SIM Switch procedure where the UE can indicate to the CN the UE is switching to another SIM and at the same time, updating the registration state of the UE in the CN and in the UE Defining an inactive registration timer update procedure executed through an active PLMN to maintain the registration timer of an inactive SIM Defining a procedure where a UE can provide cell measurements obtained for an inactive PLMN when trying to establish connection to the inactive PLMN after deciding to switch to that PLMN Defining a procedure where a UE may request a new temporary identifier whose paging occasion is aligned or separated from the paging occasion of another SIM Defining a procedure in which the UE may request the suspension of a registration timer where the CN will also suspend paging the UE Defining procedures where a UE or CN can provide to the other information about the paging process Defining a new policy to the 5G UE Policy to allow for the configuration of multiple SIMs and also giving the user the ability to initiate a manual switch between SIMs through a GUI Concept 1

UE informs CN that it is a multi-SIM device and provides information to CN about another SIM:
UE sends a request to a first PLMN to register a second SIM to a second PLMN
UE includes an indication and an identifier for the second SIM to be registered with the second PLMN
First PLMN forwards the request to the second PLMN
Second PLMN authenticates the UE's SIM credentials and provides a temporary identifier used for paging requests to the UE for the second SIM
UE and second PLMN updates the registration state of the UE for the second SIM Supporting Features for Concept 1

UE is registered with the first PLMN for a first SIM
The request is either a Partial Registration/Attach or Indirect Registration/Attach request
UE is registered on the first PLMN and requesting registration to the second PLMN
The indication is a Multi-SIM indication
The identifier for the second SIM can be one of the following: SUPI (e.g. IMSI), GUTI, 5G-S-TMSI, or SUCI
The temporary identifier assigned to the second SIM can be a 5G-GUTI, GUTI, 5G-TMSI, TMSI or 5G-S-TMSI
First PLMN includes identifier of a network node that supports multi-SIM operations and also the identifier of a first SIM, which has been authenticated with the first PLMN
The registration state of UE is RM-INACTIVE or EMM-INACTIVE after successful registration to second PLMN
First PLMN may assign a second temporary identifier for second SIM and save the registration state of UE for second SIM
UE provides multi-SIM assistance information to the CN; multi-SIM assistance information may consist of one or more of: paging criteria, limit paging area, paging occasion separation, number of missed pages before notification, proposed temporary identifier Concept 2

A first PLMN forwards paging requests to a UE through a second PLMN:
A first PLMN receives data associated with a first SIM
The first PLMN forwards a paging request to a second PLMN wherein the paging request includes a temporary ID associated with the first SIM
The second PLMN sends the paging request to a UE on a paging occasion the UE is monitoring on
The UE retrieves paging information and receives the temporary identifier associated with the first SIM

Supporting Features for Concept 2

The UE supports multi-SIM operations
The UE has simultaneous registration with both the first and second PLMNs
The UE has an inactive registration with the first PLMN
The UE has an active registration with the second PLMN
The paging request is sent in an encrypted NAS container from the first PLMN to the second PLMN
The paging occasion is calculated from the temporary identifier of SIM1
The paging occasion is calculated from the temporary identifier of SIM2
The paging information includes service category of what the page is for and may be classified as voice calls, SMS messages, or other data (e.g. application data), control plane signaling, emergency messages, emergency callback, mobile terminated exception data, etc.
The paging information includes PDU session ID and application ID that associates with the page
The UE sends a response to the first PLMN through the second PLMN

Concept 3

UE performs SIM Switch procedure:
A UE receives paging information for data associated with a second SIM while connected to a first PLMN
UE decides to switch to second PLMN to retrieve the data based on service type prioritization indicator provided in the paging information
UE informs first PLMN to suspend the registration state for the first SIM
UE and first PLMN updates the registration state of the first SIM on the UE and on the first PLMN
UE attempts to establish communication with second PLMN for second SIM

Supporting Features for Concept 3

Paging information provides service type prioritization that may include service category, PDU session ID, and application ID associate with the data the UE is being page for
UE checks service type prioritization against internal policy and finds a match
UE sends registration update request with registration type set to SIM switch
First PLMN activate paging request forwarding for first SIM
The registration state for first SIM is set to RM-INACTIVE or EMM-INACTIVE in UE and in first PLMN
First PLMN sends response to second PLMN that UE received the paging request
Establishing communications with second PLMN includes sending Registration Update request to include SIM switch Registration Type

Concept 4

A UE updates a registration timer in a second PLMN through a first PLMN:
UE sends a request to a first PLMN to update the registration timer of a second SIM on a second PLMN
First PLMN forwards the request to the second PLMN
Second PLMN updates the registration timer for the second SIM in second PLMN
Second PLMN returns a response to first PLMN
First PLMN forwards the response to the UE

Supporting Features for Concept 4

The request may be a registration update, a tracking area update, or an inactive registration timer update
The request includes a temporary identifier associated with the second SIM
The response may include a status for the registration update request, a new value for the registration timer, or an updated TAI list
The response may include an indication that the registration state for the second SIM is no longer valid
Second PLMN may assign a new temporary identifier for second SIM and include it in the response to the UE

Concept 5

A UE collects cell measurement information while connecting to second PLMN after a SIM switch procedure and provides the measurements directly to the second PLMN upon connection or through a first PLMN if the connection was not successful:
A UE collects cell measurements while trying to connect to a second PLMN after disconnecting from a first PLMN
UE provides cell measurements to a RAN node after successful connection to the second PLMN
UE connects to a first PLMN after unsuccessful attempt to connect to second PLMN and includes the collected measurements and a cause code
First PLMN forwards the measurements and cause code to the second PLMN

Supporting Features for Concept 5

If UE is successful in connecting to second PLMN, UE formats cell measurements into a Minimization for Drive Test report to the RAN node of the second PLMN
Cell measurements indicate signal strength of cells belonging to second PLMN
Cell measurements include location and time when the measurements were taken
Cell measurements may be queued by the UE and sent to a RAN node upon successful connection at a future time
UE saves the cell measurements after unsuccessful connection to second PLMN and a cause code
The cause code may be received from second PLMN or generated by the UE
The cause code may indicate the RAN node is overloaded and not accepting new registrations
The cause code may indicate the mobility management node is overloaded and not accepting new registrations
The cause code may indicate signal strength of cells are not strong enough to maintain connection with second PLMN
The cause code may indicate no cells are available to establish a connection with second PLMN

Concept 6

A UE requests a new temporary identifier whose paging occasion is aligned or separated from the paging occasion associated with another SIM:

UE has registered to a first PLMN and received a temporary identifier with an associated paging occasion for a first SIM UE has registered to a second PLMN and received a temporary identifier with an associated paging occasion for a second SIM UE determines that there is a potential for paging collisions between the paging occasions of the two SIMs UE makes a request to obtain a new temporary identifier whose paging occasion is different from the previous paging occasions Supporting Features for Concept 6

The request may be one of, for example, an initial registration, a mobile registration update, a periodic registration update, an attach, or a tracking area update request The UE may provide parameters in the request to assist the network in assigning a new temporary identifier The new parameters may be, for example: paging criteria, limit paging area, paging occasion separation, multi-SIM indicator, a temporary identifier, or multiple paging occasion The network may assign a temporary identifier whose paging occasion is, for example, the same as, spaced close to, far apart from, or different than an existing paging occasion The network may assign multiple temporary identifiers to the UE that correspond to multiple paging occasions Concept 7

A UE requests to suspend the registration timer associated with a SIM:

UE is registered to a PLMN and PLMN starts a registration timer

UE sends a request to activate a registration suspend timer

CN suspend the registration timer and starts the registration suspend timer

CN provides a response that registration suspend timer is active

Supporting Features for Concept 7

The request may be one of, for example, an initial registration, a mobile registration update, a periodic registration update, an attach, or a tracking area update request The UE may provide an expiration value for the registration suspend timer The UE may request the CN to queue any downlink data for the UE while the registration suspend timer is running The CN preserves contexts for the UE such as, for example, registration state, security contexts, PDU sessions, etc.

The CN may return a new value for the expiration time of the registration suspend timer The CN may provide an indication that it will queue downlink data for the UE Concept 8

UE or CN provides information about issues with respect to the paging process:
 UE has registrations for multiple SIMs
 UE is receiving data for a first SIM
 UE receives a page for a second SIM
 UE or CN notifies the other of UE or CN about issue with the paging process Supporting Features for Concept 8

The notification may be a request sent by the UE

The request may be one of, for example, a mobile registration update, a periodic registration update, a tracking area update, or a service request The UE may provide an indication for the CN to stop paging the UE The notification may be a response sent by the CN The response may include, for example, an indication that informs the UE it has missed a previously sent page, the time of that page, the tracking or registration area where the page was sent to, and other information about the page such as service category, phone number, PDU session ID, and application ID

DETAILED DESCRIPTIONS

As highlighted by the MUSIM study [6], current multi-SIM UE implementations with common radio and baseband components pose many issues with different UE behaviors that may degrade network performance. To solve such issues, a more integrated solution is proposed in which the UE communicates its support of multi-SIM functionalities to the core network using the newly proposed registration requests and the network enhances paging mechanisms through providing service prioritization information in paging messages and enabling paging request forwarding to minimize UE switching cycles between SIMs. These enhancements will enable UEs to receive prioritization information for pages for multiple SIMs by only monitoring for paging occasions calculated for the active SIM instead of requiring the UE to switch operations to monitor for paging occasions for each SIM. In addition, the network is made aware of a new registration state, sub-state, or mode of operation for the UE through a new SIM Switch procedure and by an enhancement to the UE registration state. This enhancement will enable entities within the cellular system to have knowledge of the operations of the multi-SIM UE. The solutions proposed herein are designed based on the following assumptions:

1. UE implementation with multiple SIMs share common radio and baseband components; some solutions will be presented to address dual Rx, single Tx capable UEs
2. The multiple SIMs are from the same or different PLMNs (PLMN refers to different operator's network, which is also referred to as mobile network operators or MNOs)
3. Where required, PLMNs may have roaming agreements with each other and support authentication of SIMs as proposed herein
4. There is established security support for multi-SIM operations between the UE and the core network
5. Both UEs and core networks support multi-SIM capabilities as proposed herein There may be cases, though, in which there is no coordination between the mobile network operators, or MNOs.

In these cases, alternative solutions that do not require coordination between MNOs will be presented in which the UE may request from the network different temporary identifiers which correspond to different paging occasions than the currently assigned PO. This and other solutions will also be presented to address the no MNO coordination scenario. Note that certain aspects of the solutions associated with MNO coordination may also be used in the no MNO coordination scenario. For example, the core network assigning temporary identifiers that associates the same PO for multiple SIMs may be used for the no MNO coordination case. This may be utilized in the intra-MNO case where the multiple SIMs belong to the same MNO.

The solutions in support of multi-SIM UEs are required for both 5GS and LTE systems. As such, this disclosure will apply the proposed solutions to both 5GS and LTE systems. For cases in which a solution is shown for only one system, the solution may be easily applied to the other system as well.

FIG. 9 shows the main procedures of the proposed solutions for a UE with two SIMs but the solution may be extended to UEs with more than two SIMs. The figure shows a UE registering to two PLMNs using different SIMs, SIM1 and SIM2. The UE has service subscription for both SIM1 and SIM2 and mainly communicates to PLMN1 using SIM1 while registering with PLMN2 for SIM2 and requesting PLMN2 to forward paging requests for SIM2 to PLMN1 for further processing. Therefore, the UE will only need to monitor for paging occasions associated with SIM1 on PLMN1 to receive paging requests for both SIM1 and SIM2. Similarly, the UE may receive paging requests for both SIM1 and SIM2 when the UE is communicating with PLMN2 by only monitoring for paging occasions associated with SIM2 on PLMN2. Note that the UE is only monitoring for paging occasions on the active PLMN while being able to receive pages for multiple SIMs, e.g. for the active SIM as well as for the inactive SIMs. The mutual registrations of SIMs between PLMNs and the paging request forwarding feature allow the UE to operate in this manner, thereby reducing the power consumption required and still being able to receive pages for the multiple SIMs.

Two different registration procedures are proposed in FIG. 9 to link SIM1 and SIM2 in the respective PLMNs: Partial Registration and Indirect Registration procedures. These registration procedures enable all paging requests, whether it is for SIM1 or SIM2, to be received by the UE on the PLMN that the UE is actively registered with. In other words, paging requests for the inactive SIM will be received on the paging occasions of the active SIM. This solution solves the issues of paging collisions as previously described as the UE can receive pages for multiple SIMs without needing to frequently switch connections among different PLMNs.

The SIM Switch procedure is utilized by the UE to notify the active PLMN to suspend the UE's registration state so the UE can establish communications with the inactive PLMN to complete processing a paging request or to use the subscription services associated with the inactive SIM. Using this procedure, the UE is able to switch between subscription services provided by the two SIMs and still receive paging requests for either SIM regardless of which PLMN the UE is actively registered to at any instance in time. This procedure informs the core network of the UE's intention to switch connections between PLMNs and thereby solving the issue of the network not knowing what the UE is doing in multiple SIM applications.

Step S900: UE registers to PLMN1 with SIM1 and establishes PDU sessions on PLMN1. UE may provide a Multi-SIM indication to PLMN1 to inform PLMN1 that the UE is a multi-SIM device and may provide UE identifier(s) (e.g. SUPI (e.g. IMSI), GUTI, 5G-S-TMSI, or SUCI) for SIM2 to be used in the Partial Registration procedure shown in step S902b. The inclusion of the Multi-SIM indication and the UE identifier(s) supports the case in which the UE is installed with the two SIMs prior to executing the UE initial registration procedure. This step may be triggered by insertion of a second SIM, a download of a second SIM profile to an eSIM, an indication from a GUI, or through a power cycle event.

Step S909: Alternatively, UE may notify PLMN1 that it is a multi-SIM device separately and provide PLMN1 with UE identifier(s) for SIM2 to initiate the Partial Registration procedure shown in step S902b. Note that steps S900 and S902a are different approaches to initiate the Partial Registration procedure. For example, Step S902a may be performed by the UE if the two SIMs were installed at different times. In step S902b, PLMN1 performs Partial Registration with PLMN2 for SIM2. The AMF in PLMN1 may contact either the AUSF and/or the UDM in PLMN2 and provide the following information to link the two SIMs together: an indication that partial registration is requested, an indication that the UE is a multi-SIM device, the UE identifier(s) for SIM1 and SIM2, an indication that SIM1 has been authenticated and registered with PLMN1, multi-SIM assistance information, etc. PLMN2 may save this information in UDM2 while PLMN1 may save the same information plus information returned to the UE (such as temporary identifiers) after a successful registration, in UDM1. UE Identifier(s) in this case may refer to both permanent and temporary identifiers used to associate to a SIM. Multi-SIM assistance information may be provided to assist the network to enhance the paging process of multi-SIM UEs.

Step S904: As an alternative to Partial Registration, the UE may perform Indirect Registration with PLMN2 for SIM2 through PLMN1 to establish registration state with PLMN2. This may be performed over either the control plane or the user plane. The result of an Indirect Registration, if successful, is similar to the result of a UE establishing registration state with the core network as outlined in TS 23.502 [2] General Registration, i.e. assignment of temporary identifiers, network slices, update timers, DRX parameters, etc. However, certain enhancements as proposed hereafter for multi-SIM operations applies for Indirect Registration. This registration procedure puts the UE in RM-INACTIVE state and may provide the UE a different set of temporary identifiers than those returned from the General Registration procedure. The procedure may link SIM1 and SIM2 together on PLMN2 similar to the link that is established by Partial Registration to enable paging request forwarding. Similar to Partial Registration, Indirect Registration may be initiated as part of General Registration or standalone as a separate registration step (i.e. similar to steps S900 and S902a but for Indirect Registration).

Step S906: Sometime later, UE receives a paging request for SIM2 from PLMN1. The paging request originated from PLMN2, which forwarded the request to PLMN1. Note that the detailed paging information may be sent from PLMN2 to PLMN1 within an encrypted NAS container to preserve the privacy of the UE. The paging request is found on the paging occasion associated with SIM1 and when the UE reads the paging channel, the paging information is associated with SIM2. The paging information may contain a service type prioritization for the page to enable the UE to make a decision on whether to continue processing the paging request. Additionally, more detailed paging information may be obtained by the UE executing a Service Request procedure and receiving the encrypted NAS container with service prioritization information. Alternatively, the forwarded paging request may be received by the UE as a NAS notification through the user plane of the network.

Step S910: UE notifies PLMN1 that it needs to perform a "SIM Switch" procedure to PLMN2. Since PLMN1 is aware of SIM2 and has linked information for SIM2, PLMN1 assists the UE in performing the SIM switch. This procedure changes the UE's registration state on PLMN1 to RM-INACTIVE, which is a new registration state, sub-state, or mode of operation of RM-REGISTERED state proposed by this solution to indicate the UE's registration with PLMN1 is temporarily suspended. The UE's context in PLMN1 is preserved for SIM1 to allow the UE to switch to using SIM2 on PLMN2. With the saved context, the UE is able to switch back to PLMN1 and quickly resume operations. Other alternatives to the SIM switch procedure are also proposed in which the multi-SIM UE may notify the network to suspend the registration state of one SIM so the UE can communicate with another SIM. During the suspension of the registration state, the paging mechanism may be modified such that the network forwards paging requests, filters paging messages to the UE, buffers downlink data, etc.

Step S912: UE performs a Periodic Registration Update procedure to change its registration state for SIM2 from RM-INACTIVE to RM-REGISTERED. Note the UE may first need to perform procedures involving cell search, PLMN selection, establishing RRC connection with RAN2, etc. before performing the Periodic Registration Update. Upon receiving the Registration Accept response, the UE may then perform either Service Request or PDU Session Establishment procedures to retrieve the data associated with the paging request. The UE may perform a Service Request as an alternative to the Periodic Registration Update.

Step S914: After the UE has completed the session to retrieve the data associated with the paging request, the UE may suspend the registration state for SIM2 as shown in step S1914a by performing a SIM Switch procedure and then reactivate the registration state for SIM1 as shown in step S1914b.

Other enhancements that are not shown in FIG. 9 are the inactive registration timer update procedure where a UE can request the update of the registration timer of an inactive SIM through the active PLMN. This procedure provides an update to the inactive PLMN that the UE is still connected to an active PLMN and thus can receive forwarded paging requests. Another enhancement allows a UE to collect cell measurement information while trying to establish connection with a PLMN after a SIM switch procedure. These measurements may be provided to the PLMN upon successful connection establishment or through another PLMN if the connection was not successful. The cell measurements may be used by network operators to determine network coverage and to improve cellular coverage of the system where necessary. There are also other enhancements proposed for multi-SIM operations in MNOs with no coordination.

When discussing multi-SIM operations, it is important to define terminologies for use that clearly distinguish which SIM/PLMN the UE is actively using to communicate with at any instance in time. The terms "Primary" and "Secondary" refer to the SIM prioritization as outlined by a UE policy or by the user via a GUI. These terms indicate which SIM has priority (Primary) over other SIMs (Secondary) in the UE. The UE will typically use the Primary SIM the majority of the time. The terms "Active" or "Inactive" refer to the SIM/PLMN the UE is currently communicating with. In other words, the UE maintains connection to a PLMN that is "active" and has no connection to an "inactive" PLMN. Using FIG. 9 as an example, the following describes the use of the terms.

Primary SIM=SIM1
Secondary SIM=SIM2
Active SIM/PLMN=SIM1/PLMN1 (for steps 1-5); SIM2/PLMN2 (for steps 6-7)
Inactive SIM/PLMN=SIM2/PLMN2 (for steps 1-5); SIM1/PLMN1 (for steps 6-7)

The terms Primary and Secondary may be applied to PLMNs as well when it is not known initially which PLMN is the active one and which is the inactive one, e.g. before the UE registers to a PLMN.

The following solutions apply to the case where the SIMs are from different operators. However, the solutions may be adapted to support SIMs from the same operators. For example, the registration procedures will apply to the same PLMN and do not depend on roaming agreements between PLMNs. The procedures will still link paging requests together for SIM1 and SIM2 and the UE will receive paging requests on the paging occasion of the active SIM. The registration state transitions and SIM Switch procedure remains the same whether the SIMs are from the same or different operators. In the same operator case, the UE does not need to switch connections between PLMNs after performing the SIM switch procedure.

Note the following solutions are described within the context of 5GS but the solutions may also be applied to EPS as well. For example, the proposed registration procedures may be performed with an MME in EPS, which functions similarly to an AMF in 5GS. It should be noted that in 5GS, NAS messaging is between the UE and AMF; in EPS, NAS messaging is between the UE and MME. In EPS, the Attach procedure and the HSS performs similar functions as that of the general registration procedure and the UDM in 5GS, respectively. The RAN nodes are eNodeB for EPS and gNodeB for 5GS. Similarly, the RM-INACTIVE state proposed herein for 5GS may be a new state such as EMM-INACTIVE in EPS. The SIM Switch procedure may likewise be performed in both EPS and 5GS and multi-SIM policies or informational elements may be incorporated in both systems. The solutions in this disclosure describe how polices may be delivered to the UE, from the PCF via NAS messaging. In EPS, policies may be delivered to the UE via IP based procedures from an ANDSF server or via informational elements sent within NAS messages. Embodiments will be provided to show some of these enhancements as it is applied to EPS systems.

Different aspects of LTE systems are enhanced to support the use of multi-SIM UEs. The first aspect applies to the Attach procedure a UE performs in order to register to the core network. These enhancements to the Attach procedure are proposed: Partial Attach, Indirect Attach, and MUSIM Attach. These Attach procedure enhancements involve the registration of multi-SIMs used within a UE. The Partial Attach registers secondary SIMs with the HSS of their corresponding PLMNs that will trigger paging request forwarding originating from the HSS. The Indirect Attach, on the other hand, registers secondary SIMs with an MME of the corresponding PLMNs and may establish a default bearer for always on PDN connectivity. Finally, the MUSIM Attach enhancement allows a UE to, in a single request, indicate to the core network the need to execute attachment procedures for multiple SIMs, which may trigger the execution of either Partial or Indirect Attachment procedures for secondary SIMs.

Additionally, it is proposed that a new LTE EMM state be added in the UE and the MME to support a new registration mode of operation enabled for multiple SIMs UE: EMM-INACTIVE. This new registration state indicates that a UE operating with a secondary SIM is registered with the corresponding PLMN but it is not actively connected with that PLMN. Furthermore, paging request forwarding is enabled due to the aforementioned Attach procedure enhancements. Paging request forwarding refers to the process in which a paging request for an inactive SIM is forwarded by the inactive PLMN to the active PLMN in order to page the UE. All these LTE system enhancements are similar to the 5G enhancements and will be described in more details hereafter.

Note that while the disclosure refers to EMM-INACTIVE as a new state in the EMM state model, it may be more feasible that it may be a sub-state or mode of operation within the EMM-REGISTERED state instead due to current LTE deployments. This sub-state or mode of operation may be referred to as "Inactive Registration" sub-state or mode of EMM-REGISTERED. Note also that the UE and MME may maintain separate EMM and ECM states for each SIM.

Once the registration states are established for each of the SIM in a multi-SIM UE, the function of paging request forwarding is enabled to eliminate the occurrence of paging collisions. When data is available for an inactive SIM, the corresponding PLMN forwards a paging request to the UE through the active PLMN. Within the active PLMN, the calculation of the paging occasion is such that the UE will only need to monitor for one paging occasion while being able to receive paging requests for multiple SIMs. The paging information may be sent via a NAS notification in some cases as described hereinafter.

Multi-SIM Registration Procedures

An E-UTRAN cell may broadcast, in the System Information Broadcast, whether a UE can connect to an MME that supports partial and/or indirect attach. A UE may check that an E-UTRAN cell is broadcasting this indication before attempting to perform a partial and/or indirect attach with the network via the E-UTRAN cell.

Note: this same check operation may be performed in a 5G system. In other words, an NR cell may broadcast, in the System Information Broadcast, whether it can connect to an AMF that supports partial and/or indirect attach. A UE may check that an NR cell is broadcasting this indication before attempting to perform a partial and/or indirect attach with the network via the NR cell.

As previously mentioned, two registration procedures are proposed in this disclosure to support multi-SIM operations in 5GS. The registration procedure enables the UE to receive services from the 5G network. Partial Registration is invoked by a UE to register a SIM with a secondary PLMN via the primary PLMN. By performing this registration, the UE is informing the secondary PLMN to forward all paging requests to the UE through the primary PLMN when the UE is not actively registered with the secondary PLMN. Indirect Registration, on the other hand, performs a full registration as outlined by the General Registration procedure found in TS 23.502 [2] with the secondary PLMN through the primary PLMN. The Indirect Registration procedure also informs the secondary PLMN to forward all paging requests to the primary PLMN when the UE is not actively communicating to the secondary PLMN. In both registration procedures, the UE's RM state with the secondary PLMN transitions from RM-DEREGISTERED to RM-INACTIVE. For indirect registration, an AMF is assigned to serve the UE which differs from the partial registration where no AMF is assigned to serve the UE.

Similar to the 5G registration procedure, a UE must perform an attach procedure with the core network in LTE systems in order to be able to receive services from the network. The attach procedure registers the UE with the core network by authenticating the UE and establishing contexts for the UE to securely communicate with the network. For multi-SIM cases, it is proposed that the attach procedure is enhanced to support registering multiple SIMs. The enhancements are described herein: 1) Partial Attachment, 2) Indirect Attachment and 3) MUSIM Attach. The MUSIM attach combines multiple attach requests into a single request, e.g. attach request for a primary SIM and one or more attach requests for secondary SIMs. The MUSIM attach procedure may be applied to 5G systems as well in a similar fashion.

For all the registration and attach procedures described, the UE may include multi-SIM assistance information in the corresponding request messages such as information configured at the UE (e.g. by the user). The assistance information may be used by the network to enhance existing paging mechanisms for multi-SIM operations. For example, the assistance information may provide prioritization information that informs whether and when to page a UE when downlink data is available for a particular SIM. Furthermore, the assistance information may provide information on how the network may assign identifiers that corresponds to paging occasions such that they avoid paging collisions for multiple SIMs. The multi-SIM assistance information will be described in more details hereinafter.

Partial Registration

The UE performs Partial Registration mainly to configure a secondary PLMN to forward all paging requests to the UE through the primary PLMN whenever the UE's RM state with the secondary PLMN is RM-INACTIVE. This procedure enables a UE to receive all paging requests, whether the paging requests are for SIM1 or SIM2, on the paging occasion associated with the active SIM regardless of the PLMN the UE is actively communicating with. As a result, the UE will not need to switch network connections between SIMs in order to receive paging requests. In fact, this procedure will guarantee the UE receives all paging requests whereas the procedure to have the UE switch between SIMs may result in missed paging requests if the switch timing is not aligned with the timing of the paging requests. Note that the partial registration enhancement enables the page request forwarding function to originate from a UDM, which is a new function added to the UDM.

Figure 10:
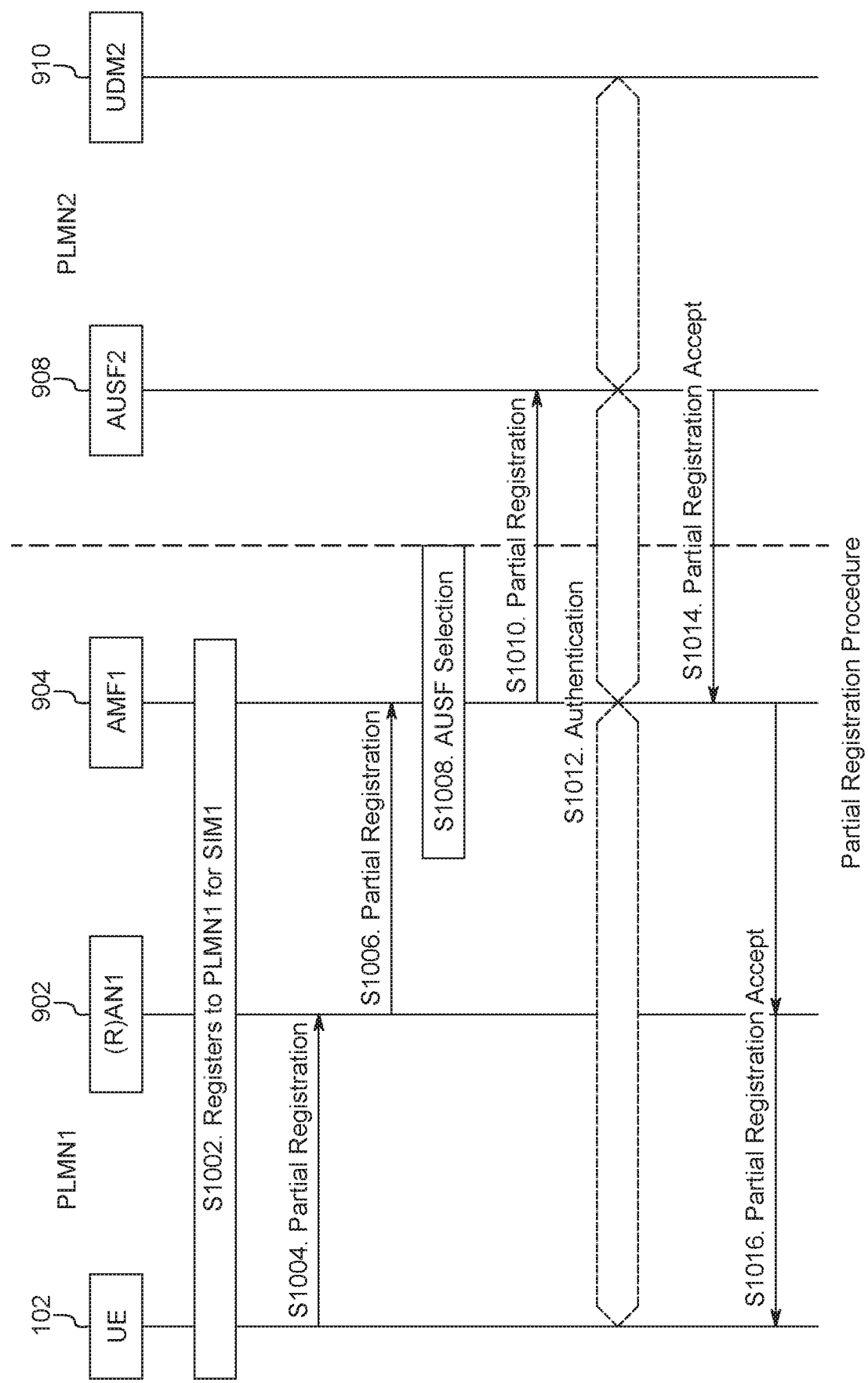
FIG. 10 shows a method of partial registration in accordance with an exemplary embodiment.

FIG. 10 shows a UE initiating the Partial Registration procedure for SIM2 through PLMN1. The figure shows two cases in which the partial registration for SIM2 can be made: 1. When both SIMs are installed together and the Partial Registration request is part of the Initial Registration request (this is referred to as MUSIM registration) or 2. When SIM2 is installed after SIM1 was installed and the UE has already performed Initial Registration for SIM1.

Step S1002: UE registers to PLMN1 for SIM1 with a Registration Type of Initial Registration. At this time, only SIM1 is installed in the UE. However, if both SIM1 and SIM2 are installed at the same time, the UE may include a Multi-SIM indication with the appropriate SIM2 identifier (s) (e.g. SUPI (e.g. IMSI), GUTI, 5G-S-TMSI, or SUCI) when the UE registers to PLMN1 for SIM1. In this case, it is proposed that the Partial Registration request is integrated as part of the General Registration procedure (the General Registration procedure described in TS 23.502 [2]) executed for SIM1. This procedure may be referred to as MUSIM registration. The additions to the Initial Registration request would be the inclusion of the Multi-SIM indication, a partial registration indicator, and one or more SIM2 identifier(s) as indicated above. The multi-SIM indicator may be encoded as an option in the Preferred Network Behavior parameter or it may be a standalone indicator and the partial registration indicator may be incorporated within the Registration Type parameter. The message may further indicate which SIM is the primary SIM and which SIMs are secondary SIMs and should be used for registering to inactive PLMNs. For this case, the procedure skips to step S1006.

Step S1004: Sometime after the UE has successfully registered to PLMN1 for SIM1 and after SIM2 is installed in the UE, a Partial Registration request may be initiated by the UE to notify PLMN1 the UE is a multi-SIM device and includes a Multi-SIM indication and SIM2 identifier(s). The Registration Type for this request may be Partial Registration or a partial registration indicator may be provided. The RM state for SIM1 is RM-REGISTERED and for SIM2 (with PLMN2) is RM-DEREGISTERED at this time. The SIM2 identifier(s) will be used by PLMN2 to authenticate SIM2 to the UE and may consist of: SUPI (e.g. IMSI), GUTI, 5G-S-TMSI, or SUCI. The Partial Registration request may be a newly defined procedure, or it may be incorporated as part of the General Registration procedure. The multi-SIM indicator may be encoded as an option in the Preferred Network Behavior parameter or it may be a standalone indicator. The multi-SIM indicator may be used by network entities to check and select appropriate network entities that support multi-SIM operations during the registration procedure.

Step S1006: RAN1 forwards the Partial Registration request to AMF1 over the N2 interface that was previously established for SIM1. In the case of a MUSIM registration, RAN1 selects AMF1 to process the request.

Step S1008: Due to the presence of the Multi-SIM indication and/or the fact that the UE 102 is requesting a partial registration, AMF1 904 selects and requests AUSF2 908 to authenticate UE 102 for SIM2 by sending the SIM2 identifier(s) to AUSF2 908 with the Multi-SIM indication and a partial registration indicator. If the request was a MUSIM registration, AMF1 904 may first register SIM1 and then send the partial registration request for SIM2 afterwards. Note that it is assumed roaming agreements between PLMN1 and PLMN2 are in place and AMFs within each PLMN may be configured with contact information of AUSFs in other PLMNs to forward the Partial Registration request to. It is also assumed that the communications between AMF1 904 and AUSF2 908 are secured, e.g. over the N32 interface through the SEPPS of the corresponding PLMNs.

Step S1010: AMF1 904 forwards the Partial Registration request to AUSF2 908 and may include: Registration Type set to Partial Registration or include a partial registration indicator, the Multi-SIM indication may be encoded as an option in Preferred Network Behavior, SIM2 identifier(s), AMF1 ID and UE ID to indicate UE with SIM1 has been authenticated to PLMN1, context information of an AMF in PLMN1 which PLMN2 can forward future paging requests for SIM2 to, etc. Note that in step S1002, the Registration Type was set to Initial Registration for SIM1; however, this registration request is targeted for SIM2 and hence the change of Registration Type from Initial Registration to Partial Registration for this request to AUSF2 908. Alternatively, the Registration Type may be set as Initial Registration and a partial registration indicator may be provided in the request. The Registration Type from step S1002 may also be encoded as Initial Registration with Partial Registration.

Step S1012: AUSF2 908 performs the authentication of the UE for SIM2 and may create or update subscription information in UDM2 910. UDM2 910 may provision a temporary identifier to the UE 102 for SIM2 that will be used to indicate when paging requests are targeted for SIM2. In addition, the RM state for SIM2 will be updated to RM-INACTIVE to enable the forwarding of paging requests to the UE through PLMN1. The RM state in this case may be an indication saved in the subscription data in the UDM to indicate paging request forwarding is enabled.

Step S1014: After AUSF2 has authenticated the UE for SIM2, a Partial Registration Accept message is returned to AMF1. The Partial Registration Accept message may be a modified Registration Accept message. AUSF2 may include the following information in the Accept message: an indication of the successful authentication of SIM2, temporary identifier assigned to the UE for SIM2 by UDM2, an indication that the UE's RM state for SIM2 has been changed from RM-DEREGISTERED to RM-INACTIVE, an acknowledgement of support for receiving paging requests forwarded for SIM1 by PLMN1, the contact information of an MME to receive the paging requests from PLMN1, and a registration timer for SIM2. The temporary identifier for the UE will be used to page the UE whenever there is a page for SIM2 while the UE is actively registered to PLMN1. In addition, the contact information for a default AMF may be included in the Accept message to inform AMF1 that future paging requests may originate from the default AMF instead of from the UDM.

Step S1016: AMF1 forwards the Partial Registration Accept message to the UE through RAN1 and includes the information returned to AMF1 from AUSF2. The Accept message may contain an indication of the successful authentication of SIM2, a temporary identifier assigned to the UE for SIM2 by UDM2, an indication that the UE's RM state for SIM2 has been changed from RM-DEREGISTERED to RM-INACTIVE, and a registration timer for SIM2. The temporary identifier for the UE will be used to page the UE from PLMN2 using the paging request forwarding feature whenever there is a page for SIM2 while the UE is actively registered to PLMN1. Alternatively, AMF1 may assign a separate temporary identifier for SIM2 that may be used to page the UE in PLMN1 instead. The assignment of this temporary identifier may be such that the associated paging occasion occurs overlap the paging occasion associated with SIM1. Therefore, the UE will only need to monitor for one paging occasion in order to receive pages for both SIM1 and SIM2. AMF1 may alternatively assign the same temporary identifier for all SIMs associated with the UE while maintaining the fact the UE only needs to monitor for one paging occasion and is able to receive pages for all SIMs. The UE's RM state for each SIM is updated in the UE and should match the ones in AMF1: RM-REGISTERED for SIM1 and RM-INACTIVE for SIM2.

This procedure proposes that a UDM assigns a temporary identifier to the UE and that the temporary identifier be provided to the UE. This temporary identifier may be a new type of 5G-GUTI. This 5G-GUTI may be formatted in ways that is compatible with existing 5G-GUTI formats. For example:

The GUAMI may include only a <MCC> and <MNC> so that it can be resolved to a UDM/UDR. The fact that the GUAMI includes no <AMF Region ID><AMF Set ID> and <AMF Pointer> may indicate that the 5G-GUTI was assigned by a UDM.

The 5G-TMSI in the 5G-GUTI may be a temporary identifier that was assigned to the UE by the UDM or it may be a SUCI or a GPSI. This temporary identifier can be included in paging messages so that the UE can detect that it is being paged for the associated SIM.

Partial Registration Alternative Approach

Figure 11:
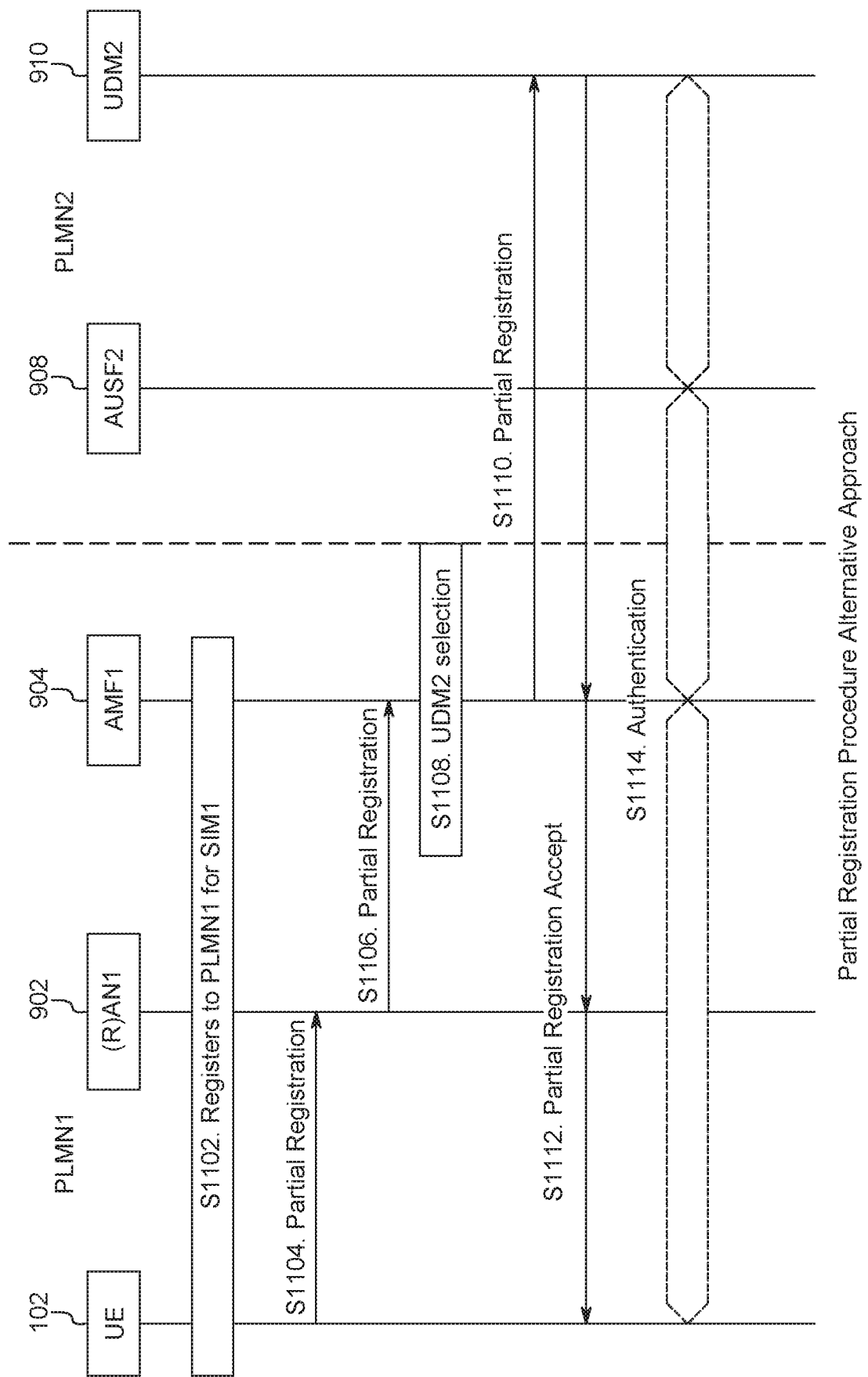
FIG. 11 shows an alternative method of partial registration in accordance with an exemplary embodiment.

This section proposes an alternative procedure for the UE to perform Partial Registration, which is shown in FIG. 11.

Step S1102: UE registers to PLMN1 for SIM1 with a Registration Type of Initial Registration. At this time, only SIM1 is installed in the UE. However, if both SIM1 and SIM2 are installed at the same time, the UE may include a Multi-SIM indication, a partial registration indicator, and appropriate SIM2 identifier(s) (e.g. SUPI (e.g. IMSI), GUTI, 5G-S-TMSI, or SUCI) when the UE registers to PLMN1 for SIM1. In this case, it is proposed that the Partial Registration request is integrated as part of the General Registration procedure (the General Registration procedure described in TS 23.502 [2]) executed for SIM1. This procedure may be referred to as MUSIM registration. The additions to the Initial Registration request would be the inclusion of the Multi-SIM indication, a partial registration indicator, and one or more SIM2 identifier(s) as indicated above. The multi-SIM indicator may be encoded as an option in the Preferred Network Behavior parameter or it may be a standalone indicator and the partial registration indicator may be incorporated within the Registration Type parameter. The message may further indicate which SIM is the primary SIM and which SIMs are secondary SIMs and should be used for registering to inactive PLMNs. For this case, the procedure skips to step S1106.

Step S1104: Sometime after the UE has successfully registered to PLMN1 for SIM1 and after SIM2 is installed in the UE, a Partial Registration request may be initiated by the UE to notify PLMN1 the UE is a multi-SIM device and includes a Multi-SIM indication and SIM2 identifier(s). The Registration Type for this request may be Partial Registration or a partial registration indicator may be provided. The RM state for SIM1 is RM-REGISTERED and for SIM2 (with PLMN2) is RM-DEREGISTERED at this time. The SIM2 identifier(s) will be used by PLMN2 to authenticate SIM2 to the UE and may consist of: SUPI (e.g. IMSI), GUTI, 5G-S-TMSI, or SUCI. The Partial Registration request may be a newly defined procedure or it may be incorporated as part of the General Registration procedure. The multi-SIM indicator may be encoded as an option in the Preferred Network Behavior parameter or it may be a standalone indicator. The multi-SIM indicator may be used by network entities to check and select appropriate network entities that support multi-SIM operations during the registration procedure.

Step S1106: RAN1 forwards the Partial Registration request to AMF1 over the N2 interface that was previously established for SIM1. In the case of a MUSIM registration, RAN1 selects AMF1 to process the request.

Step S1108: AMF1 determines what UDM to connect to by examining the SIM2 identifier. The SIM2 identifier may include an MCC and MNC that are used to determine the UDM that should be contacted.

Step S1110: AMF1 forwards the Partial Registration request to UDM2 and may include: Registration Type set to Partial Registration or a partial registration indicator, the Multi-SIM indication may be encoded as an option in Preferred Network Behavior, SIM2 identifier(s), AMF1 ID and UE ID to indicate UE with SIM1 has been authenticated to PLMN1, context information of an AMF in PLMN1 which PLMN2 can forward future paging requests for SIM2 to, etc. Note that in step S1102, the Registration Type was set to Initial Registration for SIM1; however, this registration request is targeted for SIM2 and hence the change of Registration Type from Initial Registration to Partial Registration. Alternatively, the Registration Type may be set as Initial Registration and a partial registration indicator may be added to the request. The Registration Type from step S1102 may also be encoded as Initial Registration with Partial Registration.

Step S1112: UDM2 responds to AMF1 and AMF1 responds to the UE. The response indicates to the UE, if the UE is allowed to be partially registered and indicates to the UE that authentication is pending. The message also includes a timer that indicates to the UE how long it should wait until it receives a request from the network to begin authentication. If the timer expires before the UE receives a request from the network to begin authentication, then the UE will ignore any request to perform authentication unless it sends another partial registration request. UDM2 may provision a temporary identifier to the UE for SIM2 that will be used to indicate when paging requests are targeted for SIM2. In addition, the contact information for a default AMF may be included in the Accept message to inform AMF1 that future paging requests may originate from the default AMF instead of from the UDM. The RM state for SIM2 will not be updated or may be updated to a state that indicates authentication is pending.

Step S1114: The AMF initiates Slice Specific Secondary Authentication with the UE and the AUSF of PLMN2. This procedure is described above in the section entitled "Slice-Specific Authentication and Authorization." UDM2 may provide the functionality of the AAA-S 802 in the procedure. UDM2 may provide the UE with a temporary identifier by providing the temporary identifier to the AMF. The AMF may provide the temporary identifier to the UE in the EAP Success Message. Furthermore, a registration timer for SIM2 may be provided. FIG. 8 also shows a AAA-P 804.

With Partial Registration, there is no AMF assigned to serve the UE and as a result, the UDM assigns the UE a temporary UE ID. This temporary UE ID will be used to page the UE whenever there is activity for the UE and the UE is in RM-INACTIVE state with the corresponding, inactive PLMN. Note the RM state in this case may be an indication saved in the subscription data in the UDM to indicate paging request forwarding is enabled. For this case, the UDM of the inactive PLMN may send the paging message to the AMF in the active PLMN with the temporary UE ID that was assigned to the UE during Partial Registration. Additionally, the UDM may return an identifier and/or contact information for a default AMF in the response to the Partial Registration request. This default AMF may be utilized to send paging requests for a SIM whose UE is in RM-INACTIVE state with a PLMN to the AMF of an active PLMN where the UE is currently registered with.

Partial Attach

Figure 24:
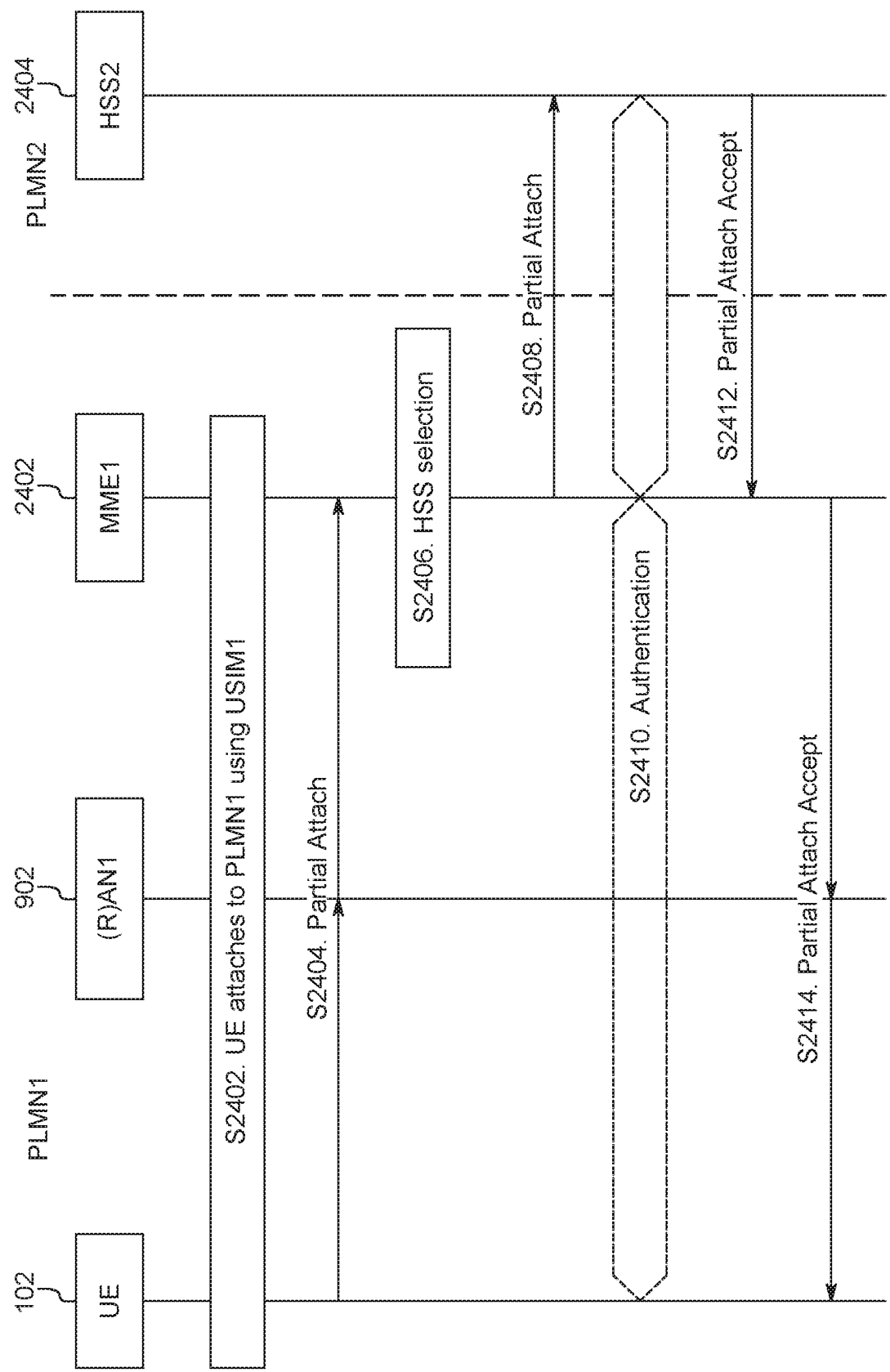
FIG. 24 shows a method of partial attachment in accordance with an exemplary embodiment.

A UE utilizing multi-SIMs may use the Partial Attach enhancement to not only register a primary SIM to the current PLMN but also other secondary SIMs to their corresponding PLMNs. FIG. 24 shows the procedure for the Partial Attach enhancement. The figure shows that the Partial Attach is executed separately from the Initial Attach for SIM1 but it may be combined together as one attach procedure as well, e.g. in a MUSIM attach request as described below. In addition, the Partial Attach enhancement may support partially attaching multiple, secondary SIMs by executing steps S2406 to S2414 for each SIM. Note that the partial attach enhancement enables the page request forwarding function to originate from an HSS, which is a new function added to the HSS.

Step S2402: The UE initially attaches to PLMN1 using SIM1. PLMN1 is considered the active PLMN while SIM1 is considered the primary SIM. This step may be performed initially when only SIM1 is installed in the UE. In the case where two or more SIMs are installed in the UE at the same time, a combined attach procedure may be executed to register the multiple SIMs together in one attach request. This combined attach request is referred to as a MUSIM attach and may include a multi-SIM indicator, a partial attach indicator, and appropriate SIM identifiers (e.g. IMSI, GUTI, etc.) for each SIM in addition to the information in a regular attach request. In this case, the partial attach is integrated as part of the attach procedure from TS 23.401 [9]. The multi-SIM indicator may be encoded as an option in the Preferred Network Behavior parameter or it may be a standalone indicator and the partial attach indicator may be carried in the Attach Type parameter. The message may further indicate which SIM is the primary SIM and which SIMs are secondary SIMs and should be used for registering to inactive PLMNs. The procedure skips to step S2406 for the combined attach request.

Step S2404: Sometime later, the partial attach procedure will begin. For example, this may take place when SIM2 is added to the UE either by inserting a physical SIM, through the configuration of an eSIM, based on a request from an application on the UE through a GUI or an API, or immediately after completion of the attach procedure with PLMN1. SIM2 is considered the secondary SIM and it is associated with PLMN2. PLMN2 is considered the inactive PLMN. The UE then executes a partial attach request to PLMN2 through PLMN1. This request may contain a multi-SIM indicator and appropriate SIM identifiers (e.g. IMSI, GUTI, etc.) for each SIM. The multi-SIM indicator may be encoded as an option in the Preferred Network Behavior parameter or it may be a standalone indicator. The multi-SIM indicator may be used by network entities to check and select appropriate network entities that support multi-SIM operations during the attach procedure and for enabling paging request forwarding.

Step S2406: In response to the partial attach request or the partial attach indication, the MME in PLMN1 selects an appropriate HSS to process the partial attach request for the respective SIMs. The identifier provided for SIM2 may include an MCC and MNC or may be resolved to an MCC and MNC that are used to determine the HSS that should be contacted. The MME in PLMN1 may be provisioned with contact information of other HSSs for different PLMNs due to core network configurations, roaming agreements, or other mechanisms that support multi-SIM operations, so that MME is able to forward any partial attach message for those secondary SIM to the default HSS in other PLMNs.

Step S2408: MME1 2402 sends a partial attach request to the selected HSS. The request may include a partial attach indicator, a multi-SIM indicator that may be encoded as an option in Preferred Network Behavior, the SIM2 identifier (s), MME1 ID and UE ID to indicate UE with SIM1 has been authenticated to PLMN1, etc. MME1 may further provide the context information of an MME in PLMN1 which PLMN2 may forward paging requests for SIM2 to. This MME in PLMN1 may be configured to support paging request forwarding and may be able to forward paging requests from PLMN2 to the appropriate network entities (e.g. the MME which the UE is attached to in case of UE mobility) so the UE receives the page.

Step S2410: The HSS in PLMN2 performs the authentication of the UE for SIM2 and may save context information about the UE, such as the information resulting from the authentication procedure as well as information provided by MME1. HSS2 2404 may also assign a temporary identifier to the UE for SIM2; this identifier may be used by HSS2 to identify paging requests for SIM2 that are forwarded in the future to the UE through PLMN1. Finally, the EMM state for SIM2 is set to EMM-INACTIVE in HSS2 to signify the UE with SIM2 is registered to PLMN2 but is not actively communicating with PLMN2. The EMM state in this case may be an indication saved in the subscription data in the HSS to indicate paging request forwarding is enabled.

Step S2412: The HSS in PLMN2 returns a Partial Attach Accept response to the MME in PLMN1 indicating the result of the partial attach procedure. The response may include an indication of the successful authentication of SIM2, the temporary identifier assigned for SIM2 by HSS2, an indication that the UE's EMM state for SIM2 has been changed from EMM-DEREGISTERED to EMM-INACTIVE, an acknowledgement of support for receiving paging requests forwarded for SIM1 by PLMN1, the contact information of an MME to receive the paging requests from PLMN1, and a registration timer for SIM2. If the partial attach was not accepted, the response may include further information detailing why the attach was not accepted. In addition, the contact information for a default MME may be included in the accept message to inform MME1 that future paging requests may originate from the default MME instead of from the HSS.

Step S2414: The MME in PLMN1 returns the Partial Attach Accept message to the UE, which may be a modified Attach Accept message that provides additional information about the status of the partial attach procedure. If the attach procedure was performed for multiple SIMs, there may be separate registration status for each SIM. The response message may include information returned from the HSS in PLMN2 such as an indication of a successful authentication of SIM2, the temporary identifier assigned to SIM2, an indication that the UE's EMM state for SIM2 has been changed from EMM-DEREGISTERED to EMM-INACTIVE, and a registration timer for SIM2. The temporary identifier will be used to identify future paging requests for SIM2 that are forwarded to PLMN1. In addition, the MME in PLMN1 may assign a separate temporary identifier for SIM2 that may be used to page the UE instead of using the temporary identifier assigned by PLMN2. The assignment of this temporary identifier may be such that the associated paging occasion overlap with the paging occasion associated with SIM1. As a result, the UE will only need to monitor for one paging occasion in order to receive pages for both SIM1 and SIM2. The MME may alternatively assign the same temporary identifier for all SIMs associated with the UE while maintaining the fact the UE only needs to monitor for one paging occasion and is able to receive pages for all SIMs. The UE's EMM state for each SIM is updated. In this scenario, the EMM state for SIM1 is EMM-REGISTERED and for SIM2 is EMM-INACTIVE. Similarly, the EMM states in the MME of PLMN1 are EMM-REGISTERED for SIM1 and EMM-INACTIVE for SIM2. MME in PLMN1 may maintain separate EMM states for SIM1 and SIM2 respectively.

Indirect Registration

The Indirect Registration procedure is the functional combination of the Partial Registration procedure with the General Registration procedure. Both partial and indirect registration procedures include the Multi-SIM indication and SIM2 identifier(s) to configure PLMN2 to forward paging requests to the UE through PLMN1. However, the indicator for each procedure is different (i.e. indirect as opposed to partial) and the Indirect Registration procedure provides added functionalities for a PLMN to allocate network slices and provide UE policy information to the UE. The indirect registration also assigns an AMF to serve the UE.

Figure 12:
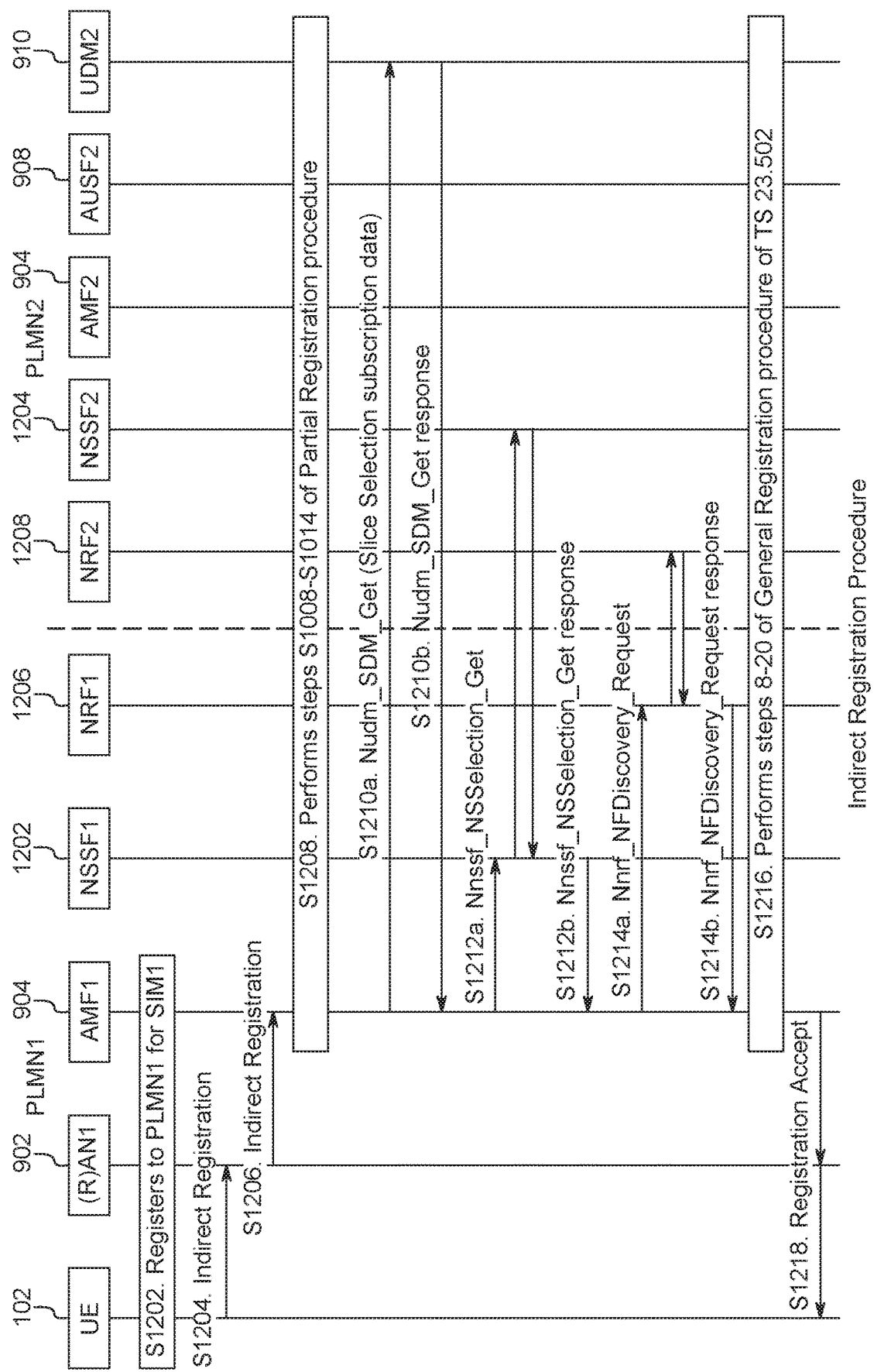
FIG. 12 shows a method of indirect registration in accordance with an exemplary embodiment.

FIG. 12 shows a UE initiating the Indirect Registration procedure for SIM2 through PLMN1. Note that similar to the Partial Registration procedure, the Indirect Registration procedure may be integrated with the General Registration procedure to register both SIM1 (direct registration) and SIM2 (indirect registration) together within one request. This procedure may be referred to as a MUSIM registration as described below. Similarly, the Indirect Registration procedure may also be performed separately from the General Registration procedure.

Step S1202: UE registers to PLMN1 for SIM1 with a Registration Type of Initial Registration. At this time, only SIM1 is installed in the UE. However, if both SIM1 and SIM2 are installed at the same time, the UE may also include a Multi-SIM indication, an indirect registration indicator, the appropriate SIM2 identifier(s) (e.g. SUPI (e.g. IMSI), GUTI, 5G-S-TMSI, or SUCI), and the identity of PLMN2 when the UE registers to PLMN1 for SIM1. In this case, the Indirect Registration request for SIM2 is part of the General Registration procedure for SIM1, e.g. as a MUSIM registration. The additions to the Initial Registration request would be the inclusion of the Multi-SIM indication, the indirect registration indicator, the SIM2 identifier(s), and the identity of PLMN2. The multi-SIM indicator may be encoded as an option in the Preferred Network Behavior parameter or it may be a standalone indicator and the indirect registration indicator may be incorporated within the Registration Type parameter. The message may further indicate which SIM is the primary SIM and which SIMs are secondary SIMs and should be used for registering to inactive PLMNs. For this case, the procedure skips to step S1206 and both General Registration for SIM1 and Indirect Registration for SIM2 may be executed concurrently or executed serially, e.g. registration for SIM1 and then registration for SIM2.

Step S1204: Sometime after the UE has successfully registered to PLMN1 for SIM1 and after SIM2 is installed in the UE, an Indirect Registration request may be initiated by the UE to notify PLMN1 the UE is a multi-SIM device and includes the Multi-SIM indication, SIM2 identifier(s), and the identity of PLMN2. The Registration Type for this request may be Indirect Registration or an indirect registration indicator may be provided. At this time, the RM state for SIM1 is RM-REGISTERED and for SIM2 (with PLMN2) is RM-DEREGISTERED. The SIM2 identifier(s) will be used by PLMN2 to authenticate SIM2 to the UE and may consist of: SUPI (e.g. IMSI), GUTI, 5G-S-TMSI, or SUCI. The Indirect Registration request may be a newly defined procedure, or it may be incorporated as part of the General Registration procedure where the Registration Type is set as Indirect Registration or with the inclusion of an indirect registration indicator. The multi-SIM indicator may be encoded as an option in the Preferred Network Behavior parameter or it may be a standalone indicator. The multi-SIM indicator may be used by network entities to check and select appropriate network entities that support multi-SIM operations during the registration procedure.

Step S1206: RAN1 902 forwards the General or Indirect Registration request to AMF1 904 over the N2 interface that was previously established for SIM1. In the case of a MUSIM registration, RAN1 902 selects AMF1 904 to process the request.

Step S1208: AMF1 904 performs steps S1008 to S1014 of FIG. 10 or 11 to authenticate the UE for SIM2. This step completes the Partial Registration procedure for the UE for SIM2 and enables PLMN2 to forward paging requests that originates from UDM2 to the UE. In addition, the contact information for a default AMF may be included in the Accept message to inform AMF1 that future paging requests may originate from the default AMF instead of from the UDM.

Steps S1210a and b: AMF1 requests the UE's Slice Selection Subscription data from UDM2 and UDM2 responds with the slice selection data to AMF1.

Steps S1212a and b: AMF1 uses the slice selection data retrieved from steps S1210a and b and performs the Nnssf_NSSelection_Get request to NSSF2 1204 through NSSF1 1202. AMF1 provides Requested NSSAI and other slice related parameters to NSSF2. NSSF2 returns a response that includes Allowed NSSAI and other NSSAI related parameters as well as NRF(s) 302 for AMF1 to select NFs/services for network slice instances.

Steps S1214a and b: AMF1 queries NRF2 1208 through NRF1 1206 to find an appropriate AMF to serve the UE's Indirect Registration request. NRF2 returns a list of potential AMFs within PLMN2 to process the Indirect Registration request.

Step S1216: AMF1 forwards the Indirect Registration request to AMF2 and AMF2 performs the General Registration procedure for the UE using SIM2. This general registration procedure may also include a Multi-SIM indication, an indirect registration indicator, and the appropriate SIM2 identifier(s) or the temporary identifier received in step S1208. AMF1 may obtain contact information of AMF2 through network configuration in support of multi-SIM operations (e.g. through roaming agreements), from step S1214 through NRF2, or from step S1208 through UDM2. At the completion of the General Registration procedure, the Registration Accept message returned to AMF1 may contain an indication of the successful authentication of SIM2, a temporary identifier assigned to the UE for SIM2 by AMF2, an indication that the UE's RM state for SIM2 has been changed from RM-DEREGISTERED to RM-INACTIVE, an acknowledgement of support for receiving paging requests forwarded for SIM1 by PLMN1, the contact information of an MME to receive the paging requests from PLMN1, and a registration timer for SIM2. The temporary identifier for the UE will be used to page the UE from PLMN2 whenever there is a page for SIM2 while the UE is actively registered to PLMN1. Alternatively, AMF1 may assign a separate temporary identifier for SIM2 that may be used to page the UE in PLMN1 instead. The assignment of this temporary identifier may be such that the associated paging occasion overlap with the paging occasion associated with SIM1. Therefore, the UE will only need to monitor for one paging occasion in order to receive pages for both SIM1 and SIM2. AMF1 may alternatively assign the same temporary identifier for all SIMs associated with the UE while maintaining the fact the UE only needs to monitor for one paging occasion and is able to receive pages for all SIMs. The UE's RM state for each SIM is updated in the UE and should match the ones in AMF1: RM-REGISTERED for SIM1 and RM-INACTIVE for SIM2.

Step S1218: AMF1 returns the Registration Accept message received from AMF2 to RAN1 and RAN1 forwards the Registration Accept message to the UE. The Accept message may contain an indication of the successful authentication of SIM2, a temporary identifier assigned to the UE for SIM2 by the General Registration procedure or by AMF1, an indication that the UE's RM state for SIM2 has been changed from RM-DEREGISTERED to RM-INACTIVE, and a registration timer for SIM2. The temporary identifier for the UE will be used to page the UE whenever there is a page for SIM2 while the UE is actively registered to PLMN1.

Figure 13:
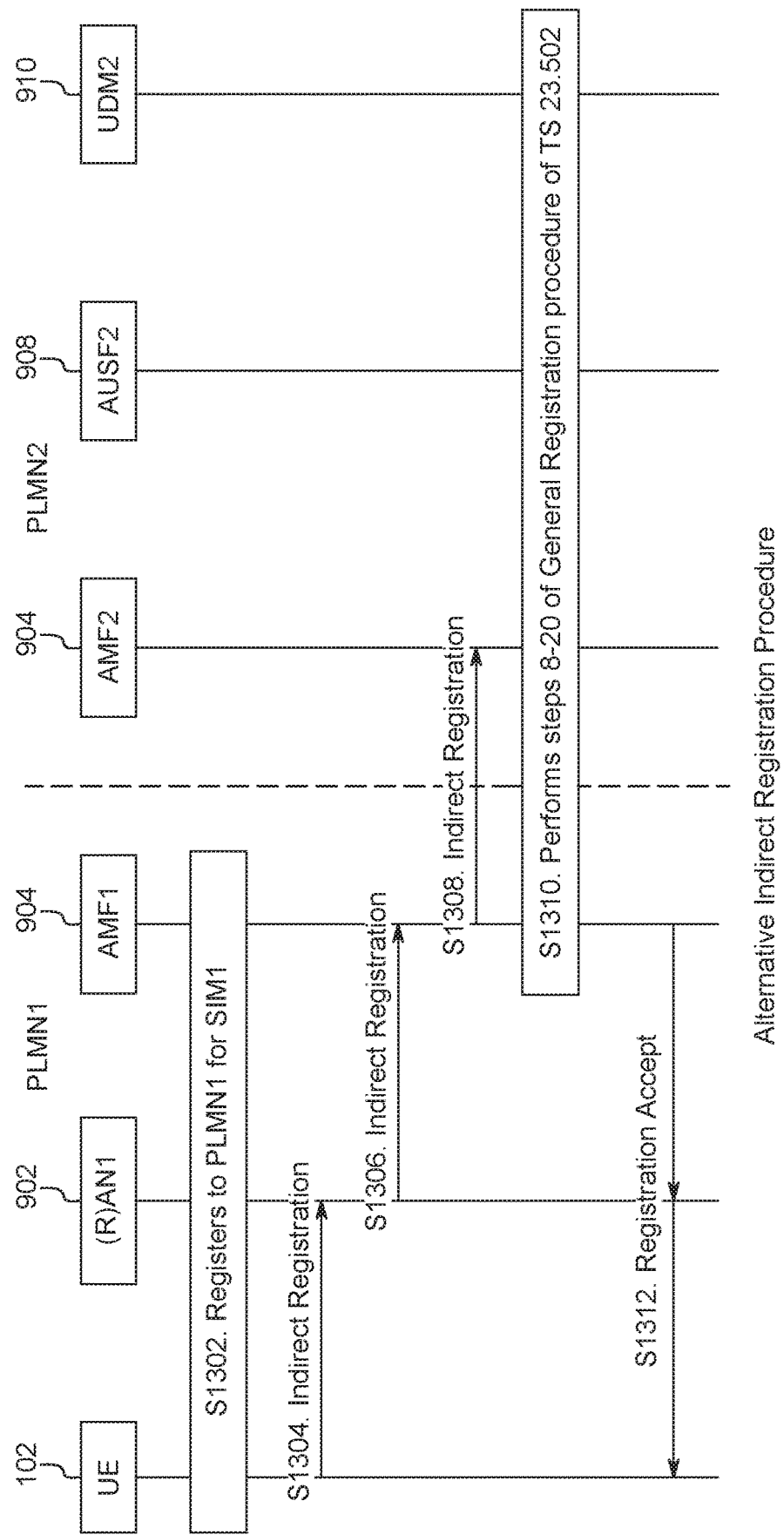
FIG. 13 shows an alternative method of indirect registration in accordance with an exemplary embodiment.

An alternative procedure for Indirect Registration is shown in FIG. 13 where AMF1 is provisioned with contact information for AMF2 as part of the support for multi-SIM operations. AMF2 is configured as default AMF in PLMN2 for AMF1 to contact in case of multi-sim support. Upon receiving an Indirect Registration request, AMF1 can look up its contact list for PLMN2 and forward the Indirect Registration request directly to AMF2. It is possible that AMF2 selects another AMF within PLMN2 to serve the UE based on the request forwarded from AMF1. From that point on, the General Registration procedure from TS 23.502 [2] is executed but with updates to account for changes to support Indirect Registration.

Steps S1302-S1306: These steps are the same steps as executed for the procedure shown in FIG. 12.

Step S1308: AMF1 has been provisioned with contact information for AMF2 and sends an Indirect Registration for the UE for SIM2 to PLMN2. AMF1 makes this determination based either on the presence of the Multi-SIM indication or if the Registration Type or an indicator was set to Indirect Registration. The Indirect Registration request may include: Registration Type set to Indirect Registration or an indirect registration indicator, the Multi-SIM indication may be encoded as an option in Preferred Network Behavior, SIM2 identifier(s), AMF1 ID and UE ID to indicate UE with SIM1 has been authenticated to PLMN1, context information of an AMF in PLMN1 which PLMN2 can forward future paging requests for SIM2 to, etc. If the request in step S1302 was a General Registration request, then AMF1 generates a new Indirect Registration request where the Registration Type is may be set to Indirect Registration and provides both the Multi-SIM indication and the SIM2 identifier(s). Alternatively, the Registration Type may be set as Initial Registration and an indirect registration indicator may be added to the request. The Registration Type may also be encoded as Initial Registration with Partial Registration.

Step S1310: The General Registration procedure from TS 23.502 [2] is executed for SIM2 on PLMN2 but modified to include functionality for support of indirect registration as outlined in FIG. 12.

Step S1312: AMF1 returns the Registration Accept message received from AMF2 to RAN1 and RAN1 forwards the Registration Accept message to the UE. The Accept message may contain an indication of the successful authentication of SIM2, a temporary identifier assigned to the UE for SIM2 by the General Registration procedure, an indication that the UE's RM state for SIM2 has been changed from RM-DEREGISTERED to RM-INACTIVE, an acknowledgement of support for receiving paging requests forwarded for SIM1 by PLMN1, the contact information of an MME to receive the paging requests from PLMN1, and a registration timer for SIM2. The temporary identifier for the UE will be used to page the UE from PLMN2 whenever there is a page for SIM2 while the UE is actively registered to PLMN1. Alternatively, AMF1 may assign a separate temporary identifier for SIM2 that may be used to page the UE in PLMN1 instead. The assignment of this temporary identifier may be such that the associated paging occasion overlap with the paging occasion associated with SIM1. Therefore, the UE will only need to monitor for one paging occasion in order to receive pages for both SIM1 and SIM2. AMF1 may alternatively assign the same temporary identifier for all SIMs associated with the UE while maintaining the fact the UE only needs to monitor for one paging occasion and is able to receive pages for all SIMs. The UE's RM state for each SIM is updated in the UE and should match the ones in AMF1: RM-REGISTERED for SIM1 and RM-INACTIVE for SIM2.

Indirect Registration may also be performed after the UE has registered each of the SIMs to the respective PLMNs, whether the PLMNs are the same or different. In other words, the multi-SIM UE first registers SIM1 to PLMN1, then registers SIM2 to PLMN2, and finally performs the indirect registration. Note the order of registration with PLMN1 and PLMN2 is not relevant. After the SIMs are registered to the respective PLMNs, the UE may then decide to operate primarily on one of the SIMs, e.g. on a primary SIM (e.g. SIM1) configured by the user. In this case, the UE may perform an indirect registration from PLMN1 to PLMN2 over the user plane of PLMN1 for SIM2.

Figure 39:
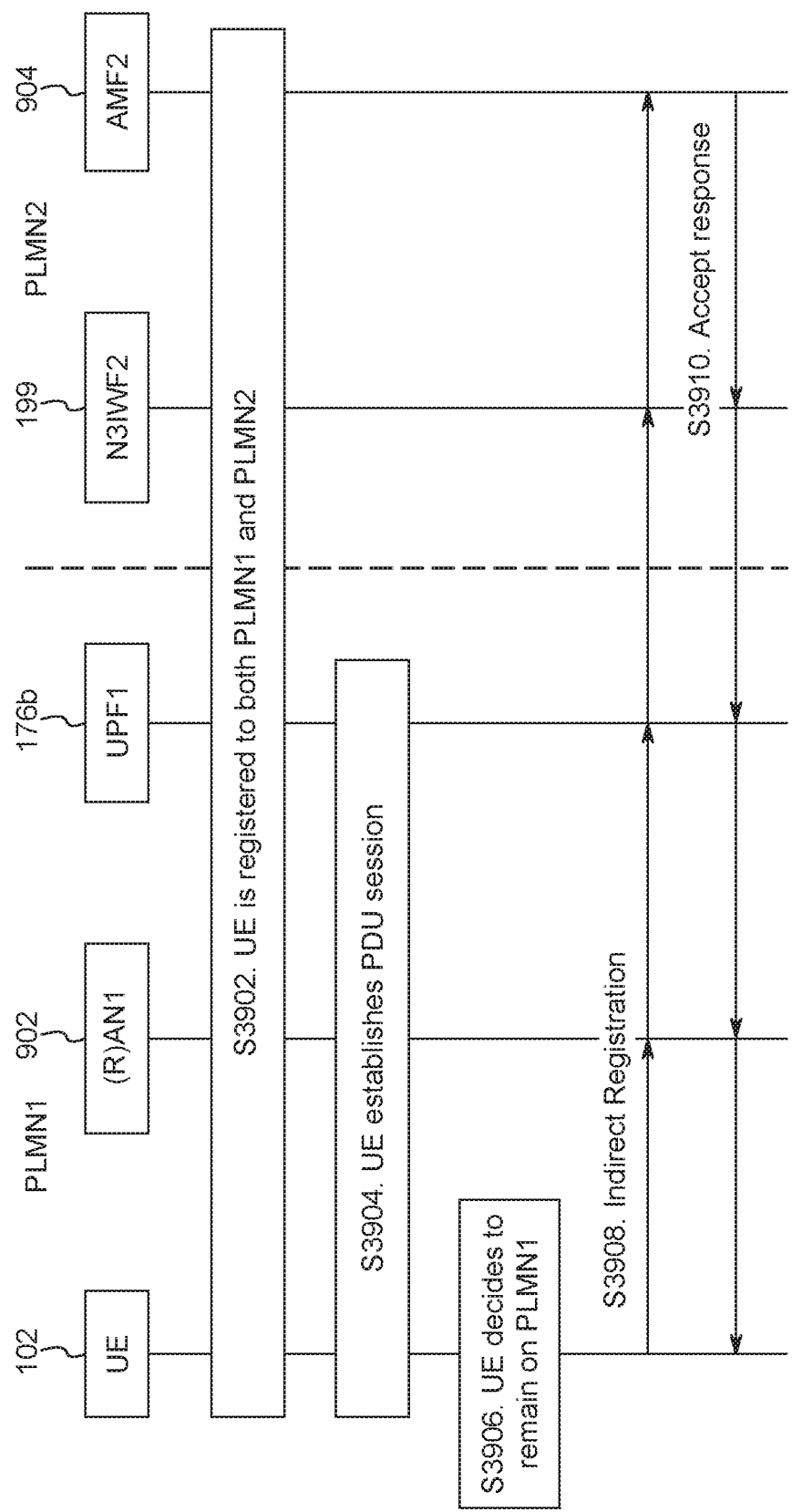
FIG. 39 shows a method in which a multi-SIM UE performs indirect registration for an inactive SIM over the user plane of the active SIM in accordance with an exemplary embodiment.

FIG. 39 shows a procedure in which a multi-SIM UE performs indirect registration for an inactive SIM over the user plane of the active SIM. Prior to executing the indirect registration procedure, the UE had individually registered to the corresponding PLMNs, e.g. registered SIM1 to PLMN1 and SIM2 to PLMN2. Then the UE executes the indirect registration procedure for SIM2 using a PDU session created for SIM1 on PLMN1. The user of the UE may have triggered this procedure by configuring the UE such that SIM1 is the preferred SIM or that the user would like to remain connected to PLMN1 for a certain duration to complete an important activity while also being able to receive mobile terminated services, such as paging requests, for SIM2.

Step S3902: UE separately registers to PLMN1 and PLMN2 for the respective SIMs. As part of multi-SIM operations, the UE will periodically switch communications between the two PLMNs to monitor for paging messages and to ensure the registration state for each SIM remains in RM-REGISTERED.

Step s3904: UE establishes PDU session(s) on PLMN1 for SIM1 to establish data connectivity. One or more PDU sessions may be created. One of the PDU sessions may be established for an important activity such as a voice call made by the user of the UE or an important download that the user does not want to be interrupted. Another PDU session may be associated with general connectivity to the internet that is established after the UE is registered with a PLMN. Separately, the UE also established PDU session(s) for SIM2 on PLMN2.

Step S3906: If the SIM1 activity from step S3904 was of importance to the user of the UE, the user may configure via a GUI that service for SIM1 is not to be interrupted. This configuration causes the UE to disable switching communications between the two PLMNs and remain connected to PLMN1, possibly for a configured time duration, configured location, etc. Alternatively, the user of the UE may have configured that SIM1 is the primary SIM and that SIM2 is the secondary SIM. As a result, the UE makes a determination that the user prefers to remain connected to PLMN1.

Step S3908: As a result of the decision made in step S3906, the UE sends an indirect registration request to the N3IWF of PLMN2 over the user plane of PLMN1. The UE utilizes the PDU session created in step S3904 and the address of N3IWF2 provisioned to the UE in the Access and Mobility Policies that were delivered to the UE by a PCF from PLMN2 to send the indirect registration. The registration message may include the following information in the request: multi-SIM indicator, indirect registration indicator, SIM2 identifier, an optional time duration, location information, whether PLMN2 should buffer downlink data for the UE, that the UE is reachable over the user plane of PLMN1, etc. The UE may obtain its public IP address through external mechanisms (e.g. STUN protocol) and provide the address in the indirect registration message to N3IWF2. If the UE was assigned a unique IPv6 address or prefix, the UE may provide the address or prefix to N3IWF2 in the indirect registration message. Alternatively, the UE may establish a secure tunnel to N3IWF2 to enable the proposed functionality. The UE may also indicate a PDU session ID to associate future paging requests with and that is provided by PLMN2 in the NAS notification sent to the UE over the user plane of PLMN1. The PDU session ID may be a PDU session previously established by the UE on PLMN2.

Step S3910: AMF2 processes the registration request received from the UE through the N3IWF of PLMN2. The presence of the multi-SIM indicator informs the AMF that the UE is a multi-SIM device and the indirect registration request indicates the UE can be reached via the user plane of the PLMN where this request originated from. If a time duration was provided to indicate how long the UE would remain connected to PLMN1, the AMF may reset or pause the registration timer associated with SIM2 and enable a new suspend timer based on the value provided by the UE. AMF2 returns an accept response to the indirect registration that may include: a status for the request, a time value the AMF will suspend the UE's registration, a PDU session ID PLMN2 will associate future paging requests forwarded to the UE if one was not provided by the UE, etc.

The procedure shown in FIG. 39 enables PLMN2 to forward paging requests to the UE over the user plane of PLMN1. It is assumed that the UE will maintain the PDU session established on PLMN1 to be able to receive the NAS notifications that may be received from PLMN2. Prior to releasing the PDU session on PLMN1, the UE may need to notify PLMN2 that it will no longer be reachable over the user plane of PLMN1. If a secure tunnel was created, the UE is able to receive paging requests as long as the secure tunnel is in effect.

Indirect Attach

Figure 25:
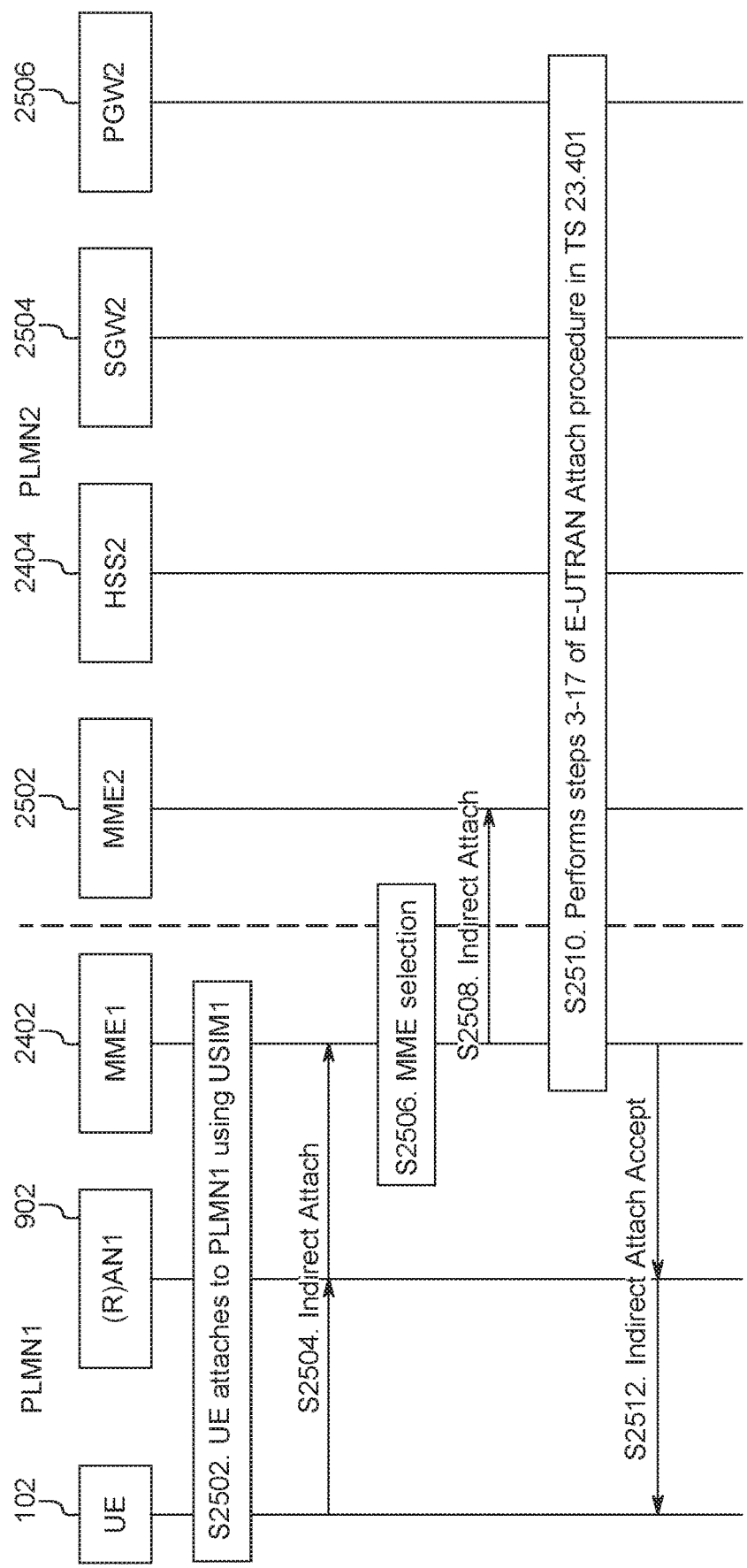
FIG. 25 shows a method of indirect attachment in accordance with an exemplary embodiment.

An alternative to the Partial Attach in LTE is the Indirect Attach enhancement as shown in FIG. 25. The Indirect Attach may be thought of as an Initial Attach procedure but executed indirectly from another PLMN rather than directly at the home PLMN plus the added functionality to support multi-SIM operations. In this case, the Indirect Attach procedure is executed for SIM2 through PLMN1. As a result, context information about SIM2's registration is established in the MME of PLMN2 and a default bearer may also be created in the SGW and PGW of PLMN2. Similar to the Partial Attach case, the Indirect Attach may be incorporated as the general Attach procedure executed in step S2502 of FIG. 25 that enables paging request forwarding. The indirect attach also assigns an MME to serve the UE.

Step S2502: The UE performs an attach procedure for SIM1 to PLMN1, the active PLMN. This step may be performed initially when only SIM1 is installed in the UE. In the case that two or more SIMs are installed in the UE at the same time, a combined attach procedure may be executed to register the multiple SIMs together in one attach request. This combined attach request may include a multi-SIM indicator, an indirect attach indicator, appropriate SIM identifiers (e.g. IMSI, GUTI, etc.) for each SIM, and the identity of PLMN2 when the UE registers to PLMN1 for SIM1. In this case, the indirect attach is integrated as part of the attach procedure from TS 23.401 and may be referred to as a MUSIM attach that is described below. The multi-SIM indicator may be encoded as an option in the Preferred Network Behavior parameter or it may be a standalone indicator and the indirect attach indicator may be carried in the Attach Type parameter. The message may further indicate which SIM is the primary SIM and which SIMs are secondary SIMs and should be used for registering to inactive PLMNs. The procedure skips to step S2506 for the MUSIM attach request and the requests may be executed concurrently or sequentially, e.g. registration for SIM1 and then registration for SIM2.

Step S2504: Sometime later, the indirect attach procedure will begin. For example, this may take place when SIM2 is added to the UE either by inserting a physical SIM, through the configuration of an eSIM, based on a request from an application on the UE through a GUI, or immediately after completion of the attach procedure with PLMN1. SIM2 is considered the secondary SIM and it is associated with PLMN2 and PLMN2 is considered the inactive PLMN. The UE then executes an indirect attach request to PLMN2 through PLMN1. This request may contain a multi-SIM indicator, appropriate SIM identifiers (e.g. IMSI, GUTI, etc.) for each SIM, and the identity of other PLMNs. The multi-SIM indicator may be encoded as an option in the Preferred Network Behavior parameter or it may be a standalone indicator. The multi-SIM indicator may be used by network entities to check and select appropriate network entities that support multi-SIM operations during the attach procedure and for enabling paging request forwarding.

Step S2506: In response to the indirect attach request or the indirect attach indication, the MME in PLMN1 selects an appropriate MME to process the indirect attach request for the respective SIMs. The identifier provided for SIM2 may include an MCC and MNC or may be resolved to an MCC and MNC that are used to determine the MME that should be contacted. The MME in PLMN1 may be provisioned with contact information of other MMEs in different PLMNs due to core network configurations, roaming agreements, or other mechanisms that support multi-SIM operations, so that MME in PLMN1 can forward the indirect attach request to corresponding MME.

Step S2508: MME1 sends an indirect attach request to the selected MME. The request may include an indirect attach indicator, a multi-SIM indicator, the SIM2 identifier(s), and other information required for an attach request. In addition, the MME1 ID and the UE ID associated with SIM1 may be provided to inform the MME in PLMN2 that SIM1 has been authenticated with PLMN1. MME1 may further provide the context information of an MME in PLMN1 to which PLMN2 may forward paging requests for SIM2 to or to receive paging requests for SIM1 from PLMN1. This MME in PLMN1 may be configured to support paging request forwarding and may be able to forward paging requests from PLMN2 to the appropriate network entities (e.g. the MME which the UE is attached to in case of UE mobility) so the UE receives the page. The MME may also forward paging requests for SIM1 from PLMN1 to PLMN2 for the times the UE is connected to PLMN2.

Step S2510: The indirect attach request is processed as outlined in steps 3 to 17 of the E-UTRAN 3202 Attach procedure in TS 23.401. Note the NAS message response sent in step S2006 is rerouted to the MME in PLMN1 instead of going to the RAN node in PLMN2. The Indirect Attach Accept response received from this procedure includes the status of the result of the procedure. The response may include an indication of the successful authentication of SIM2, the temporary identifier assigned for SIM2 by MME2 2502, an indication that the UE's EMM state for SIM2 has been changed from EMM-DEREGISTERED to EMM-INACTIVE, an acknowledgement of support for receiving paging requests forwarded for SIM1 by PLMN1, the contact information of an MME to receive the paging requests from PLMN1, and a registration timer for SIM2. If the indirect attach was not accepted, the response may include further information detailing why the attach was not accepted.

Step S2512: The MME in PLMN1 returns the Indirect Attach Accept message to the UE, which may be a modified Attach Accept message that provides additional information about the status of the indirect attach procedure. If the attach procedure was performed for multiple SIMs, there may be separate registration status for each SIM. The response message may include information returned from the MME in PLMN2 such as the temporary identifier and the indication of a successful authentication of SIM2. The temporary identifier assigned to SIM2 will be used to identify future paging requests for SIM2 that are forwarded to PLMN1. In addition, the MME in PLMN1 may assign a separate temporary identifier for SIM2 that may be used to page the UE instead of using the temporary identifier assigned by PLMN2. The assignment of this temporary identifier may be such that the associated paging occasion overlap with the paging occasion associated with SIM1. As a result, the UE will only need to monitor for one paging occasion in order to receive pages for both SIM1 and SIM2. The MME may alternatively assign the same temporary identifier for all SIMs associated with the UE while maintaining the fact the UE only needs to monitor for one paging occasion and is able to receive pages for all SIMs. The UE's EMM state for each SIM is updated. In this scenario, the EMM state for SIM1 is EMM-REGISTERED and for SIM2 is EMM-INACTIVE. Similarly, the EMM states in the MME of PLMN1 are EMM-REGISTERED for SIM1 and EMM-INACTIVE for SIM2. Finally, the EMM state in the MME of PLMN2 is EMM-INACTIVE for SIM2. FIG. 25 also includes SGW2 2504 and PGW2 2506.

Similar to the indirect registration performed over the user plane in 5G as shown in FIG. 39, an indirect attach request may be sent over the user plane in LTE as well. The procedure would be executed in a similar manner, but the messages and entities involved are LTE messages and entities. For example, the indirect registration message is replaced with an indirect attach message, and the message would pass through LTE RAN, SGW/PGW, ePDG, and MME. The LTE RAN and SGW/PGW are associated with PLMN1 while the ePDG and MME are associated with PLMN2. The policies may come from the Access Network Discovery Selection Function (ANDSF) policy for PLMN2.

MUSIM Registration/Attach

Figure 26:
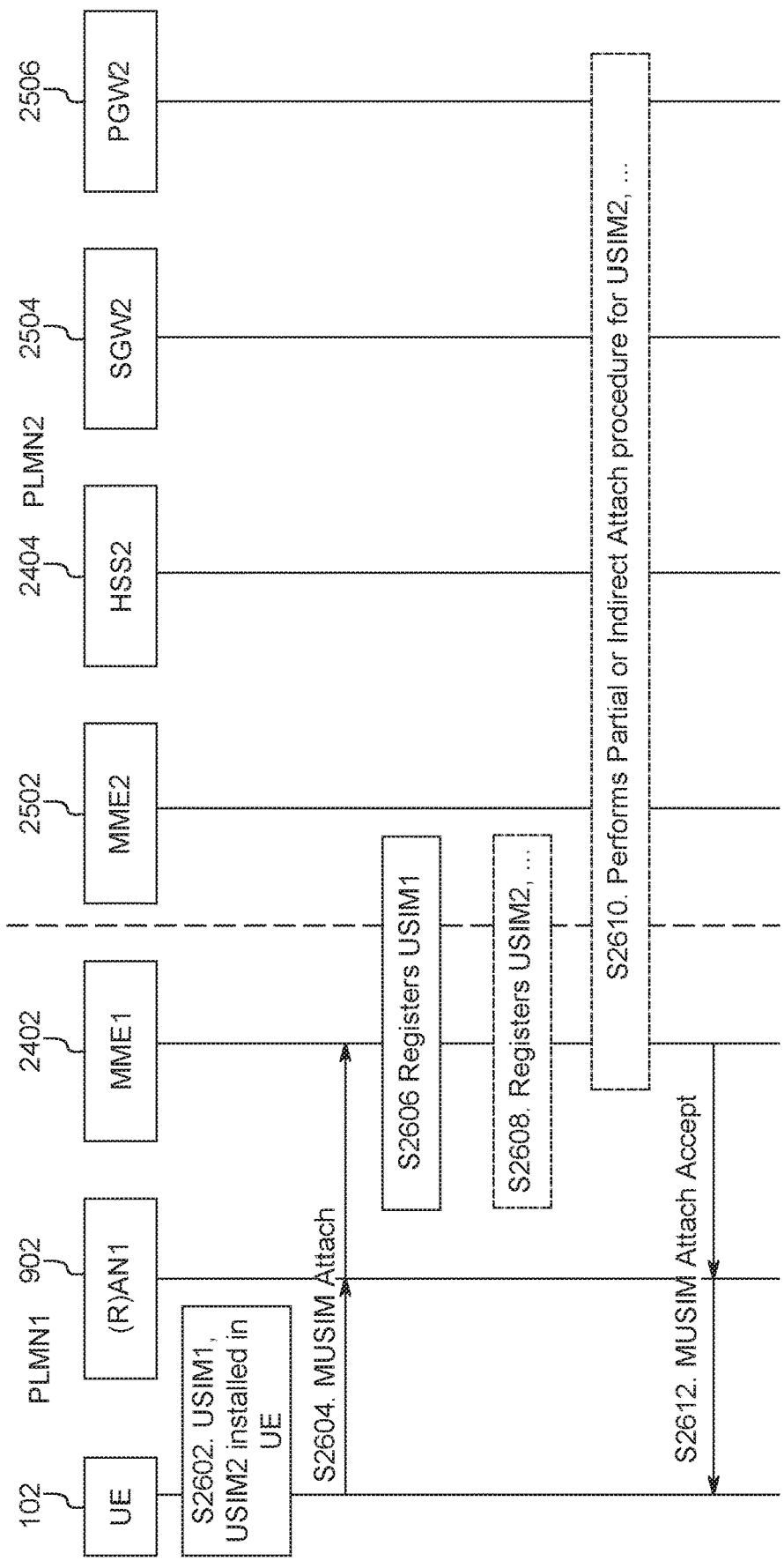
FIG. 26 shows a method of multiple SIM attachment in accordance with an exemplary embodiment.

Another enhancement for both 5G and LTE systems to support multiple SIMs is through the introduction of a MUSIM registration or attach procedure in which a UE may register multiple SIMs in the same registration or attach request. This MUSIM registration or attach procedure can support registrations of SIMs to the same or different PLMNs depending on which operators issued the SIMs. For SIMs obtained from the same operator, the SIMs may be registered to the same PLMN and individual UE contexts are created, one for each SIM, within the PLMN. In addition, the UE contexts may be linked together to provide optimizations when forwarding paging requests. For SIMs obtained from different operators, the UE may request the network to register the SIM associated with the active PLMN and then to register SIMs from other operators to their associate PLMNs. When registering SIMs to different PLMNs, the core network may use either the partial or indirect registration/attach procedure described above. FIG. 26 shows an example MUSIM attach procedure in more detail. Note that the figure uses terms related to LTE but the procedure may be applied to 5G systems as well.

Step S2602: Two SIMs are installed in a MUSIM capable UE. SIM1 is the primary SIM and is associated with PLMN1 while SIM2 is a secondary SIM and is associated with PLMN2. Note that the figure only shows two SIMs but it is understood that more than two SIMs may be installed in the UE and the procedure would remain the same except that the attach procedures will be extended to each installed SIM.

Step S2604: The UE executes a MUSIM attach request in which each installed SIM will be registered to an associate PLMN. The request may include the following: a multi-SIM indicator and identifiers for each SIM in addition to other data required for an attach procedure. In addition, either a partial attach or indirect attach indication may be provided to inform the MME in PLMN1 how to register SIMs associate with different PLMNs. This indication may be provided on a per SIM basis or collectively for all SIMs. If the Attach procedure from TS 23.401 is enhanced to integrate the MUSIM functionalities proposed here, the multi-SIM indicator may be encoded as an option in the Preferred Network Behavior parameter or it may be a standalone indicator and the partial/indirect attach indicator may be carried in the Attach Type parameter. The message may further indicate which SIM is the primary SIM and which SIMs are secondary SIMs and should be used for registering to inactive PLMNs.

Step S2606: The MME in PLMN1 executes the attach procedure for the primary SIM. The UE is authenticated and authorized and registration contexts are created on MME1 for SIM1. The procedure may also create a default bearer for the UE in the SGW and PGW of PLMN1. Since SIM1 is the primary SIM, the EMM state for SIM1 in the MME will be set to EMM-REGISTERED if the attach is successful.

Step S2608: The MME in PLMN1 may also register other SIMs belonging to the same operator as SIM1. If SIM2 belongs to the same operator as SIM1, the attach procedure is executed for SIM2 and registration contexts are created for SIM2 in the MME separate from the registration contexts for SIM1. However, the UE contexts may be linked together to provide optimizations when forwarding paging requests. If the attach is successful, the EMM state for SIM2 would be EMM-INACTIVE since it is not the primary SIM in the UE. This step may be repeated for multiple SIMs that belong to the same PLMN as SIM1. In this particular case, step S2608 is skipped since SIM2 belongs to another PLMN.

Step S2610: The MME in PLMN1 performs either a partial attach or indirect attach for SIM2 with PLMN2. The UE may have provided an indication of which attach request to perform in step S2604, or the MME may be configured on which attach procedure to perform, or the core network may have system policies that indicate which attach procedure to perform. The MME in PLMN1 will set the EMM state for each SIM here to EMM-INACTIVE. The EMM state for each SIM in their respective PLMN is set to EMM-INACTIVE as well. The information exchanged between PLMN1 and PLMN2 are the same as those specified previously and may be within encrypted NAS containers for certain information to preserve the privacy of the UE.

Step S2612: The MME in PLMN1 aggregates all the attach accept results for each of the SIMs and returns them to the UE. The MME in PLMN1 may assign a separate temporary identifier for each SIM that may be used to page the UE instead of using the temporary identifier assigned by the other PLMNs. The assignment of these temporary identifiers may be such that the associated paging occasion overlap or is in close proximity with the paging occasion associated with the primary SIM. As a result, the UE will only need to monitor for paging occasions within proximity of each other in order to be able to receive pages for all the SIMs. The MME may alternatively assign the same temporary identifier for all SIMs associated with the UE so the UE only needs to monitor for one paging occasion but is able to receive pages for all SIMs. Upon receiving the attach accept, the UE sets the appropriate EMM states for each SIM. In this particular case, the EMM state in the UE for SIM1 is EMM-REGISTERED and for SIM2 is EMM-INACTIVE.

5G Registration States for Multi-SIM Operations

A new Registration Management (RM) state is proposed to support multi-SIM operations in 5GS. The new state, termed RM-INACTIVE, refers to the RM state of a UE with an inactive PLMN. Furthermore, the state represents the fact that the PLMN has authenticated the SIM for use in the core network. Any existing UE contexts and PDU sessions within the core network associated with the SIM/UE will be maintained as if the UE was in RM-REGISTERED, CM-IDLE, and RRC_IDLE or RRC_INACTIVE states. Therefore, when a UE is in RM-INACTIVE state, it must also be in CM-IDLE and RRC_IDLE or RRC_INACTIVE states.

The RM-INACTIVE state signifies the following (with references to SIMs and PLMNs from FIG. 9):

UE is registered to PLMN2 for SIM2 and can receive services from PLMN2 (e.g. voice or IMS calls, SMS messages, etc.).

UE is in CM-IDLE state and has no NAS signaling with the core network of PLMN2.

UE is not connected to any RAN nodes of PLMN2 and therefore is not monitoring for paging occasions from PLMN2 for SIM2.

UE can receive paging requests for SIM2 if they are forwarded by PLMN2 to PLMN1.

AMF (or UDM) of PLMN2 can page UE by forwarding paging requests for SIM2 to an AMF of PLMN1

AMF of PLMN2 does not know the location of the UE.

Security contexts may be stored in an AMF within PLMN2 to secure NAS messages between the UE and PLMN2.

Figure 14:
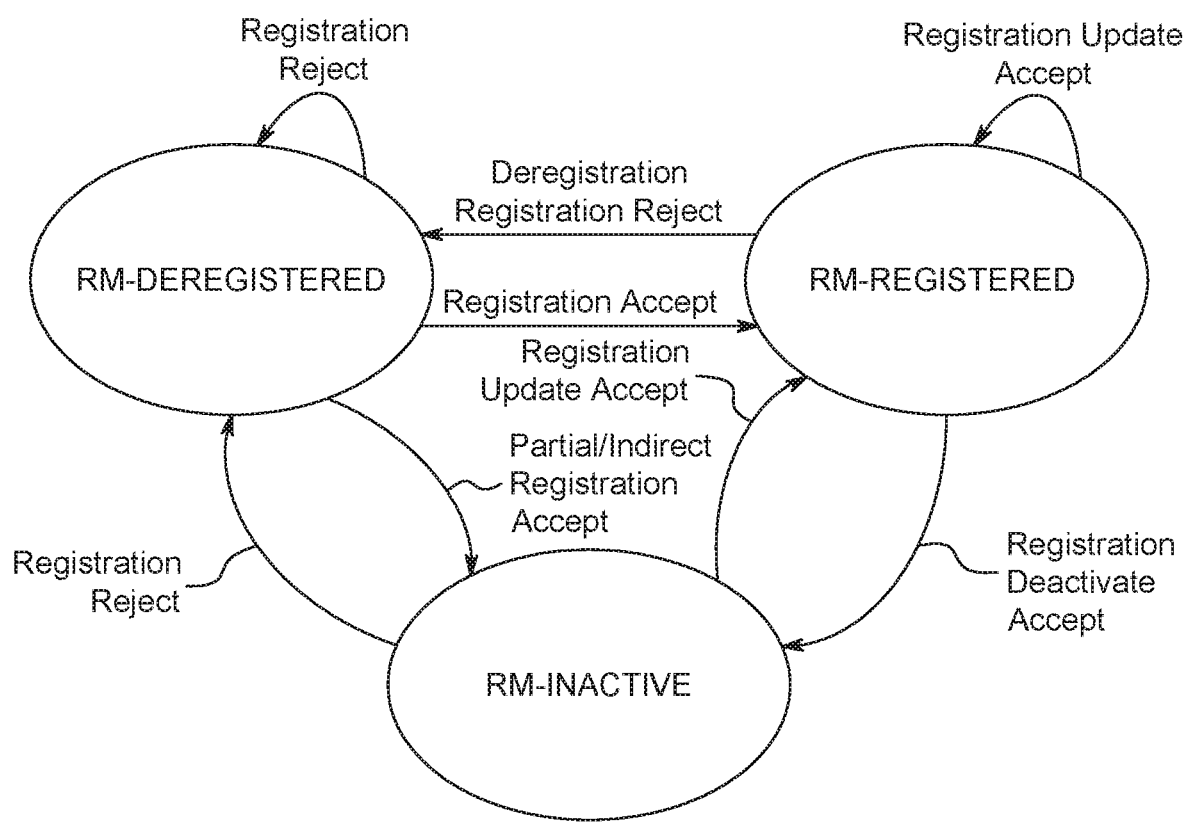
FIG. 14 shows an RM-INACTIVE registration management state in accordance with an exemplary embodiment.

FIG. 14 shows the updated RM management states to include the RM-INACTIVE state. A UE may transition to the RM-INACTIVE state from the indicated RM states by executing the listed procedures.

From RM-DEREGISTERED state to RM-INACTIVE state:
Executing Partial Registration procedure
Executing Indirect Registration procedure From RM-REGISTERED state to RM-INACTIVE state:
Executing SIM Switch (e.g. Periodic Registration Update) procedure A UE may transition out of the RM-INACTIVE state as follows.

From RM-INACTIVE state to RM-REGISTERED
Executing registration procedure
Executing SIM switch (e.g. Periodic Registration Update) procedure From RM-INACTIVE state to RM-DEREGISTERED
Executing Deregistration procedure (either UE or Network initiated)
The core network may initiate Deregistration procedure if the UE does not perform Periodic Registration Update in a timely manner when in RM-INACTIVE state (e.g. the Registration Timer (in a multi-SIM policy) expires before the UE executes the Periodic Registration Update procedure).
Registration Update request is unsuccessful When a UE performs a SIM Switch procedure and if the switch is accepted by the core network, the UE's RM state transitions from RM-REGISTERED to RM-INACTIVE. However, if the switch is rejected, then the UE's RM state transitions to RM-DEREGISTERED.

In the above description, it was proposed that the RM state model be updated to include the new state RM-INACTIVE. However, there may be complications in UE implementations with introducing a new state to the state model. As a result, the new RM-INACTIVE state may be considered as a sub-state of RM-REGISTERED state or as a mode of operation within the RM-REGISTERED state since both RM-INACTIVE and RM-REGISTERED states infer that a UE is registered with the core network and can receive services from the core network. Furthermore, many of the characteristics of RM-INACTIVE are similar to that of RM-REGISTERED state. The one main difference, however, is that the UE is not actively monitoring for paging occasions from the inactive PLMN and therefore, paging request forwarding is required. RM-INACTIVE may be referred to as the "Inactive Registration" sub-state or mode of operation of RM-REGISTERED state. Therefore, this "Inactive Registration" sub-state or mode may replace the RM-INACTIVE state referred to in FIG. 14 and elsewhere in this disclosure.

LTE Mobility Management States for Multi-SIM Operations

Similarly, the Enhanced Mobility Management (EMM) states in LTE offers similar functions to that of the 5GS Registration Management states. In order to support a UE for registering secondary SIMs to their corresponding PLMNs, a new EMM state is proposed to inform all entities of the state of registration for those secondary SIMs. The new state, EMM-INACTIVE, captures the fact that a secondary SIM is registered with a PLMN but the UE is not in active communications with that PLMN. Active communications refer to the fact that the UE is in EMM-REGISTERED state and may be in either ECM-IDLE or ECM-CONNECTED state. In other words, the UE can receive NAS notifications or can be paged from the core network. There may be UE contexts saved within the PLMN in order for the UE to receive, e.g. phone calls or short messages, even though it is not in active communications with the PLMN.

The EMM-INACTIVE state signifies the following (with references to SIMs and PLMNs from FIG. 25):

UE is registered to PLMN2 for SIM2 and can receive services from PLMN2 (e.g. voice or IMS calls, SMS messages, etc.).

UE is in ECM-IDLE state and has no NAS signaling with the core network of PLMN2.

UE is not connected to any RAN nodes of PLMN2 and therefore is not actively monitoring for paging requests for SIM2 from RAN nodes of PLMN2.

UE can receive paging requests for SIM2 if they are forwarded by PLMN2 to PLMN1.

MME (or HSS) of PLMN2 can page UE by forwarding paging requests for SIM2 to an MME of PLMN1.

MME of PLMN2 does not know the location of the UE. Security context are stored in the MME of PLMN2 and used to secure messages from PLMN2 to the UE.

Figure 27:
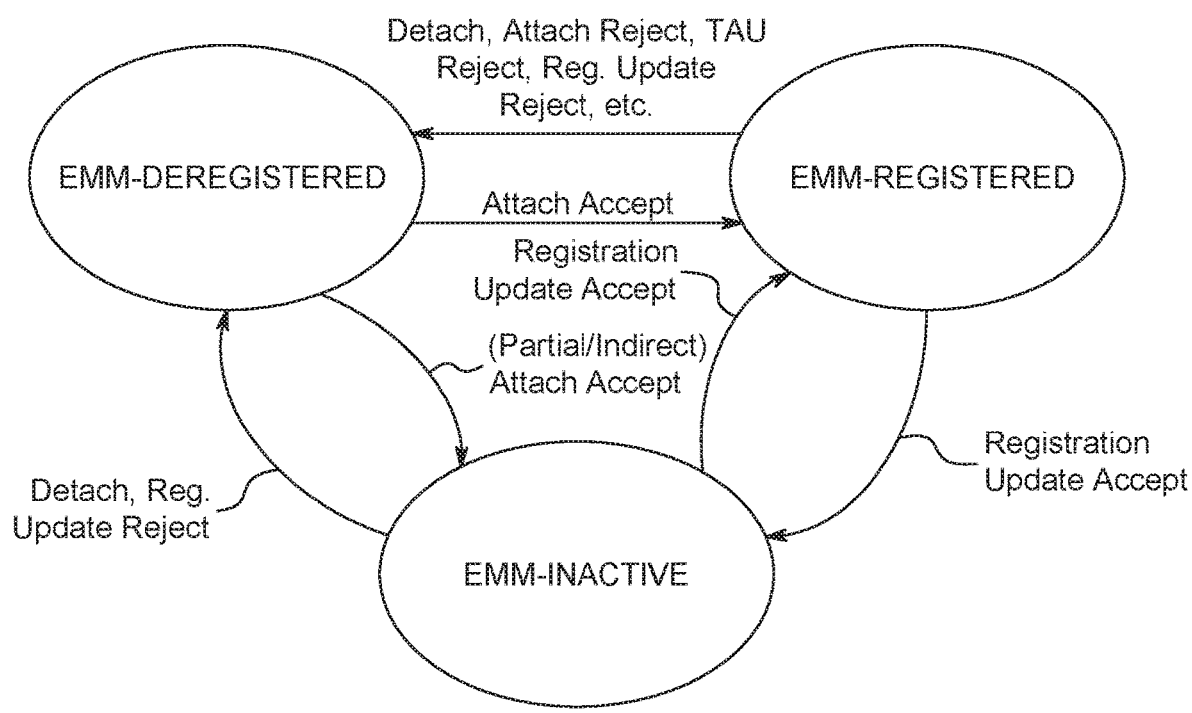
FIG. 27 shows an EMM-INACTIVE state in accordance with an exemplary embodiment.

FIG. 27 shows the EMM state model that incorporates the new state EMM-INACTIVE state. This state transition model is implemented in both the UE and the MME. A UE may transition to the EMM-INACTIVE state from the indicated EMM states by executing the listed procedures.

From EMM-DEREGISTERED state to EMM-INACTIVE state:
  Executing Partial Attach procedure
  Executing Indirect Attach procedure
From EMM-REGISTERED state to EMM-INACTIVE state:
  Executing SIM switch (e.g. Registration Update request) procedure A UE may transition out of the EMM-INACTIVE state as follows.

From EMM-INACTIVE state to EMM-REGISTERED state:
  Executing attach procedure
  Executing SIM switch (e.g. Registration Update request) procedure
From EMM-INACTIVE state to EMM-DEREGISTERED state:
  Executing Detach procedure (either UE or Network initiated)
    The core network may initiate detach procedure if the UE does not periodically update the attach timer when in EMM-INACTIVE state.
  Registration Update request is unsuccessful When a UE performs a SIM switch procedure and if the switch is accepted by the core network, the UE's EMM state transitions from EMM-REGISTERED to EMM-INACTIVE. However, if the switch is rejected, then the UE's EMM state transitions to EMM-DEREGISTERED.

In the above descriptions, it was proposed that the EMM state model be updated to include the new state EMM-INACTIVE. In theory, the proposed new state provides a clear delineation of functionality from the existing states and offers new functionality introduced by supporting multiple SIM UEs. However, in practice, the new state may not be feasible considering existing deployments. To that end, the new EMM-INACTIVE state may be considered as a sub-state of EMM-REGISTERED state or as a mode of operation within the EMM-REGISTERED state since both states infer that a UE is registered with the core network and can receive services from the core network. Furthermore, many of the characteristics of EMM-INACTIVE are similar to that of EMM-REGISTERED state. The one main difference, however, is that the UE is not actively monitoring for paging requests on the inactive PLMN and therefore, paging request forwarding is required. Referring back to the example from FIG. 25, the UE will be in EMM-REGISTERED state with PLMN2 (for SIM2) but operating in an "Inactive Registration" sub-state or mode, which requires PLMN2 to forward any paging requests to the UE through PLMN1. Hence, EMM-INACTIVE may be equated as the "Inactive Registration" sub-state or mode of the EMM-REGISTERED state. Therefore, this "Inactive Registration" sub-state or mode may replace the EMM-INACTIVE state referred to in FIG. 27 and elsewhere in this disclosure.

The EMM states for each SIM in the UE may be combined within the UE to offer optimized operations that will reduce power consumption for multi-SIM operations. For example, instead of performing PLMN and cell selections for each SIM, a multi-SIM UE can minimize power consumption by only performing PLMN and cell selection for the active SIM or for a target PLMN when trying to connect to that PLMN after a SIM switch procedure. Similarly, certain timers such as the DRX timer and other NAS timers may not need to be maintained for inactive SIMs. Table 1 shows an example of a two SIM UE and where optimizations may be realized based on the EMM states of each SIM. Note the table shows the case for two SIMs but it may easily be expanded to support more than two SIMs. Some of the state combinations are temporary such as the EMM-INACTIVE states for both SIMs, which may occur temporarily during a SIM switch procedure.

TABLE 1

UE NAS Operations of Multi-SIM UE for Reduced Power Consumption

| SIM1 NAS State | SIM2 NAS State | Supported UE NAS Operations |
| --- | --- | --- |
| EMM-REGISTERED | EMM-REGISTERED | N/A |
| | EMM-INACTIVE | Registration timer active for SIM1 and SIM2 |
| | | TAU request for SIM1 |
| | | Inactive Registration Timer Update request (SIM2) |
| | | DRX timer only active for SIM1 |
| | | NAS timers (e.g. active timer) for SIM1 |
| | | Minimize paging occasions monitoring |
| | | SIM switch procedure |
| | | Power reduced PLMN and cell selections |
| | | Cell measurement reporting for SIM2 |
| | EMM-DEREGISTERED | Power reduced PLMN and cell selections |
| | | Cell measurement reporting for SIM2 |
| | | Partial or Indirect Attach request for SIM2 |
| EMM-INACTIVE | EMM-REGISTERED | Registration timer active for SIM1 and SIM2 |
| | | TAU request for SIM2 |
| | | Inactive Registration Timer Update request (SIM1) |
| | | DRX timer only active for SIM2 |
| | | NAS timers (e.g. active timer) for SIM2 |
| | | Minimize paging occasions monitoring |
| | | SIM switch procedure |
| | | Power reduced PLMN and cell selections |
| | | Cell measurement reporting for SIM1 |

TABLE 1-continued

UE NAS Operations of Multi-SIM UE for Reduced Power Consumption

| SIM1 NAS State | SIM2 NAS State | Supported UE NAS Operations |
| --- | --- | --- |
| | EMM-INACTIVE | SIM switch procedure |
| | | Power reduced PLMN and cell selections |
| | | Cell measurement reporting for SIM1 or SIM2 |
| | EMM-DEREGISTERED | N/A |
| EMM-DEREGISTERED | EMM-REGISTERED | Power reduced PLMN and cell selections |
| | | Cell measurement reporting for SIM1 |
| | | Partial or Indirect Attach request for SIM1 |
| | EMM-INACTIVE | N/A |
| | EMM-DEREGISTERED | Power reduced PLMN and cell selections |
| | | Attach request for SIM1 |
| | | Partial or Indirect Attach request for SIM2 |

Multi-SIM Paging Operations

Figure 15:
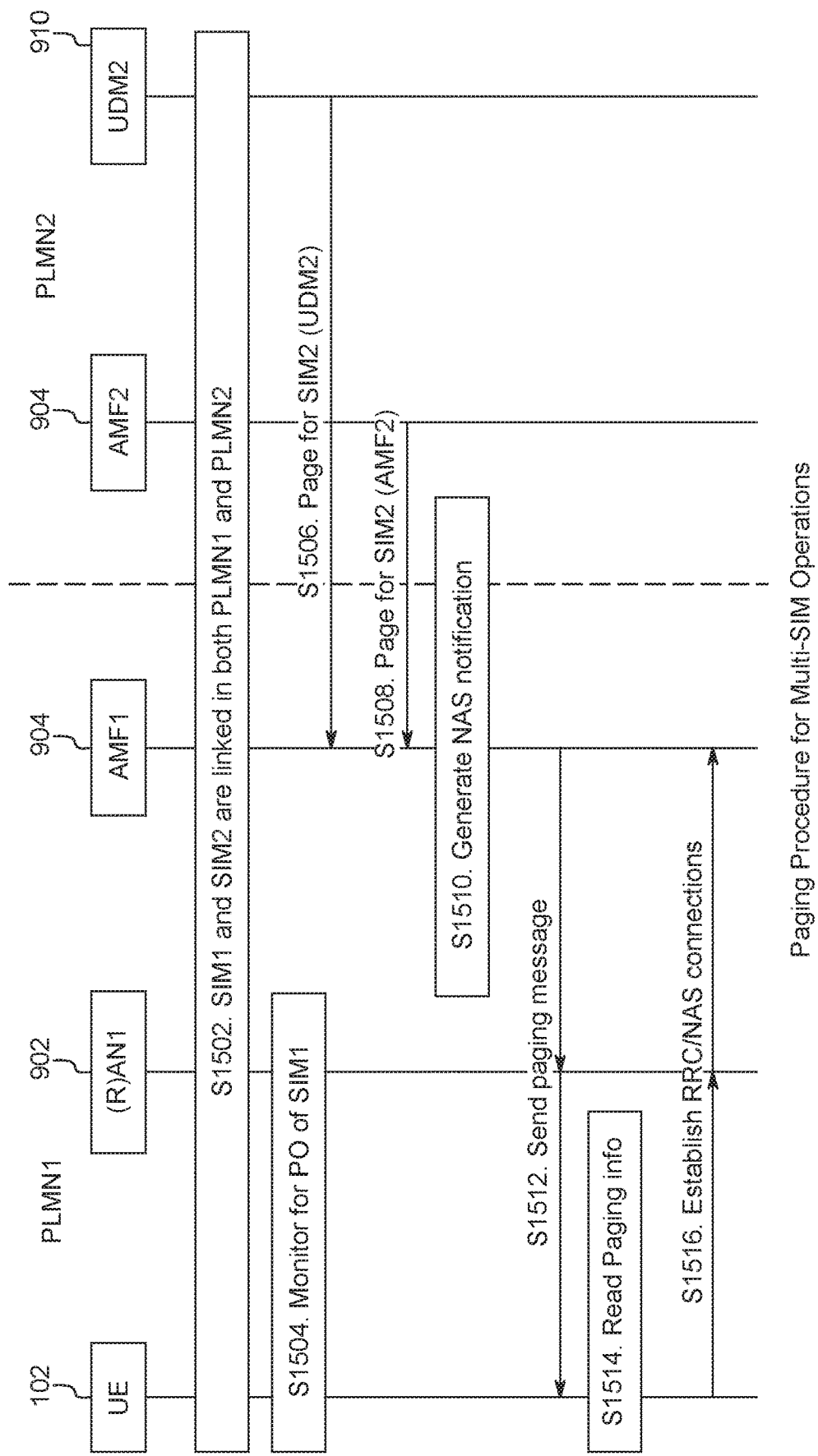
FIG. 15 shows a paging method for multi-SIM operations in accordance with an exemplary embodiment.

After the UE registers and links the registration states of SIM1 and SIM2 to the corresponding PLMNs, paging requests associated with either SIM will be sent to the UE on the active PLMN. Within each PLMN, the registration state for each SIM may be saved and linked together to inform the PLMN that the SIMs belong to the same UE. FIG. 15 shows an example of a page that originates in PLMN2, the inactive PLMN, and received by the UE through PLMN1, the active PLMN. Within PLMN1, the registration state for SIM1 is RM-REGISTERED and the registration state for SIM2 is RM-INACTIVE (or the "Inactive Registration" sub-state or mode of RM-REGISTERED). In addition, PLMN1 may maintain temporary identifier mappings between SIMs to be able to forward paging requests from PLMN2 to the UE.

Step S1502: UE has performed either Partial Registration or Indirect Registration for SIM2 with PLMN2 in order to have pages for SIM2 to be forwarded to PLMN1 when the UE's RM state with PLMN2 is RM-INACTIVE. UE is in RM-REGISTERED and CM-IDLE with PLMN1. The UE may provide multi-SIM assistance information to the PLMN of each of the SIM to configure the PLMN of the user's preference for multi-SIM operations. Multi-SIM assistance information will be described in more details hereinafter.

Step S1504: UE monitors for paging occasions associated with SIM1 or SIM2; e.g. if the UE had been provided with a temporary identifier for SIM1 and another temporary identifier for SIM2 from the AMF in PLMN1. Note the AMF may have assigned the temporary identifiers in such a way that the paging occasions calculated from each identifier overlap at the same time, which minimizes the time the UE needs to monitor for paging occasions. As a result, the UE needs to only monitor for one paging occasion which applies to both SIMs. For cases where there are more than two SIMs, the AMF may have assigned the temporary identifiers such that the paging occasions do not collide with each other and may be in close proximity of each other. In these cases, the UE may have to monitor for multiple paging occasions but is still able to receive pages for all SIMs without paging collisions. Alternatively, the AMF may assign the same temporary identifier for all SIMs associated with the UE so the UE will only need to monitor for one paging occasion.

Step S1506: If SIM2 was registered with Partial Registration, a paging request originates in PLMN2 for SIM2 in UDM2, e.g. from a voice or IMS call associated with SIM2. UDM2 sends the paging request to the UE through AMF1 in step S1506 and identifies the page is associated with the temporary identifier assigned for SIM2 from PLMN2. The temporary identifier was provided to the UE at the conclusion of the Partial Registration procedure. In addition, service prioritization information may be included in the paging request to inform the UE what the page is for and to help the UE decide whether to switch to PLMN2. The service prioritization information may contain a service type and additional information that identifies the source of the data the UE is being page for. The service type may be voice call, SMS message, other data such as from an application, control plane signaling, emergency messages, emergency callback, mobile terminated exception data, etc. The additional information may be the phone number of the caller or SMS message, a PDU session ID, slice instance ID, or an application ID associated with the data. Alternatively, the additional information may be prioritization levels configured by the user of the multi-SIM UE. The paging request may be encapsulated in an encrypted NAS container so that only the UE can decrypt and may contain the contents of a NAS notification generated for SIM2 by PLMN2. The temporary identifier and possibly the service type of the service prioritization information may be unencrypted to allow PLMN1 to identify which UE to forward the NAS container to and to provide the UE some indication of what the page is for. The contents of the NAS container in the paging request may also contain an SMS message that may be sent to the UE without having the UE connect to PLMN2 to retrieve the message. If multi-SIM assistance information was provided to PLMN2, PLMN2 may be able to determine whether to page the UE. For example, if the service prioritization information associated with the page was not configured to be of importance to the user as reflected in the multi-SIM assistance information, PLMN2 would not send the paging message shown in step S1506. In some cases, PLMN2 may be configured to forward a paging request message which includes only a UE identifier and the service prioritization information. An example would be that a user has configured that all paging messages should be filtered by the active PLMN and hence, all inactive PLMNs should forward paging requests with only information needed by the active PLMN to filter the paging requests.

Step S1508: Alternatively, and in the case that SIM2 was registered with Indirect Registration, AMF2 may receive a downlink data notification for SIM2 and forward a page to AMF1. The page may include the temporary identifier associated with SIM2 from PLMN2 as well as the service type of the service prioritization information that can inform the UE what the page is for and which the UE can use to determine whether to switch to PLMN2. The temporary identifier was provided to the UE at the conclusion of the Indirect Registration procedure. Similar to step S1506, the paging request may contain an encrypted NAS container with service prioritization information and also an SMS message. Similar to step S1506, PLMN2 may use the multi-SIM assistance information to determine whether to forward the paging message to PLMN1 and what information to include in the forwarded paging message.

Step S1510: AMF1 processes the paging request from either step S1506 or step S1508 and generates a NAS notification to the UE. The NAS notification may contain the temporary identifier for SIM2 and any service prioritization information that was provided. This notification may contain the encrypted NAS container received from steps S1506 or S1508 so only the UE can decrypt the container and the SMS message if one was provided. For the case the UE is in CM-IDLE state, AMF1 generates a paging request message to page the UE. Step S1512: AMF1 sends a page to the UE through RAN1 with the temporary identifier associated for SIM2. In other words, and as an example, the ue-Identity of the PagingRecord information element of the Paging message is set to the temporary identifier associated with SIM2 from PLMN2. The temporary identifier used may be any of the identifiers specified in step S1504. In addition, the PagingRecord information element may be enhanced to provide service prioritization information sent by AMF2 in steps S1506 or S1508. The service prioritization information may include the service type (e.g. voice or IMS call, SMS message, other data for PDU session, control plane signaling, emergency messages, emergency callback, mobile terminated exception data, etc.) and other information such as PDU Session ID or Slice instance ID to further inform the UE what the page is for. For the case in which the UE is in CM-CONNECTED state, AMF1 sends the NAS notification from step S1510 to the UE rather than the paging message. The NAS notification will contain the same information as that of the paging message that is used to generate the paging message if the UE is in CM-IDLE. Note that AMF1 will notify the RAN node to page the UE on the paging occasion associated with SIM1 but include paging information associated with SIM2 received from PLMN2. In the case that AMF1 had assigned a separate temporary identifier for SIM2, AMF1 may notify the RAN node to page the UE using the AMF1 assigned temporary identifier for SIM2 and the PagingRecord information element will contain the AMF1 assigned temporary identifier for SIM2. If AMF1 had assigned the same temporary identifier for all SIMs in the UE, this temporary identifier will be used to page the UE. Step S1514: The UE reads the paging message and determines that the page is for SIM2 based on the temporary identifier in the ue-Identity information element of the paging message. The ue-Identity information element may contain the temporary identifier assigned for SIM2 by PLMN2 or one of the AMF1 assigned temporary identifiers. If the temporary identifier is shared among all the SIMs, the UE may need to perform a Service Request procedure to find out to which SIM the page applies to. The paging message may also contain an indicator that informs the UE to perform a Service Request procedure to retrieve more information of what to do next. Absent the indicator, the UE may be configured to automatically perform the Service Request upon determining the page is for the UE. If the UE was in CM-CONNECTED, the NAS notification is processed and the UE makes a determination of what to do next by evaluating the service prioritization information. The UE may also process the SMS message if one was provided in the NAS container and present the message to the user. Thus, the UE does not need to connect to PLMN2 to retrieve the SMS message.

Step S1516: If UE is in CM-IDLE, the UE establishes RRC connection with RAN1 for SIM1. The UE then performs a Service Request procedure with the core network to establish NAS connection. The Service Request response may provide the UE more information on what to do next and contain the temporary identifier for SIM2 from PLMN2 and the service prioritization information. Upon evaluating the service prioritization information, the UE may decide to perform a SIM switch procedure to complete processing the page and receive the data associated with the page from PLMN2. If an SMS message was provided in the NAS container, the UE may present the message to the user and not need to connect to PLMN2 to retrieve the SMS message.

FIG. 15 shows the case in which the UE has an active registration with PLMN1, an inactive registration with PLMN2, and may receive paging requests for SIM2 forwarded from PLMN2. Conversely, the UE may be actively registered with PLMN2, have an inactive registration with PLMN1, and may receive paging requests forwarded from PLMN1. The requirement for forwarding paging requests from an inactive PLMN where the UE has an inactive registration with is that the UE performs either Partial Registration or Indirect Registration with the inactive PLMN.

The service prioritization information may encompass service types associated with services the core network provides the UE for receiving downlink data, such as voice or IMS calls, SMS messages, other data (e.g. mobile terminated data such as internet data), control plane signaling, emergency messages, emergency callback, mobile terminated exception data, etc. The service type prioritization information may also be associated with prioritized categories specifying the source of such services, e.g. PDU session IDs, slice instance IDs, application IDs, calls or messages from family, friends, or service providers, etc. Alternatively, the additional information may be prioritization levels configured by the user of the multi-SIM UE. The resulting enumerations combining the service types with the prioritized categories may be presented in the PagingRecord information element of the Paging message to give the UE additional information on which to make the switching decision. Alternatively, the service type may determine what paging channels are used to page the UE. Furthermore, the service prioritization information may be retrieved by the UE in response to receiving a paging request. This service type prioritization information may be compared to the Service Prioritization List found in Table 2 to help the UE determine whether to make a switch to the services provided by the corresponding PLMN.

The multi-SIM paging operation describes the case when the UE is in CM-IDLE with the active PLMN. However, if the UE is in CM-CONNECTED, a different mechanism is required. In that case, the active PLMN may send the UE a NAS notification when the UE is in CM-CONNECTED state to inform the UE there is pending data for the inactive SIM. This NAS notification may provide the same information as that found in the paging message from PLMN2. In fact, this NAS notification may be used as the triggering event that pages the UE when the UE is in CM-IDLE state. In other words, whenever there is a paging request for the inactive SIM, the active PLMN may send a NAS notification to the UE in CM-CONNECTED state. If the UE is in CM-IDLE state, then the NAS notification results in a page to the UE.

Figure 28:
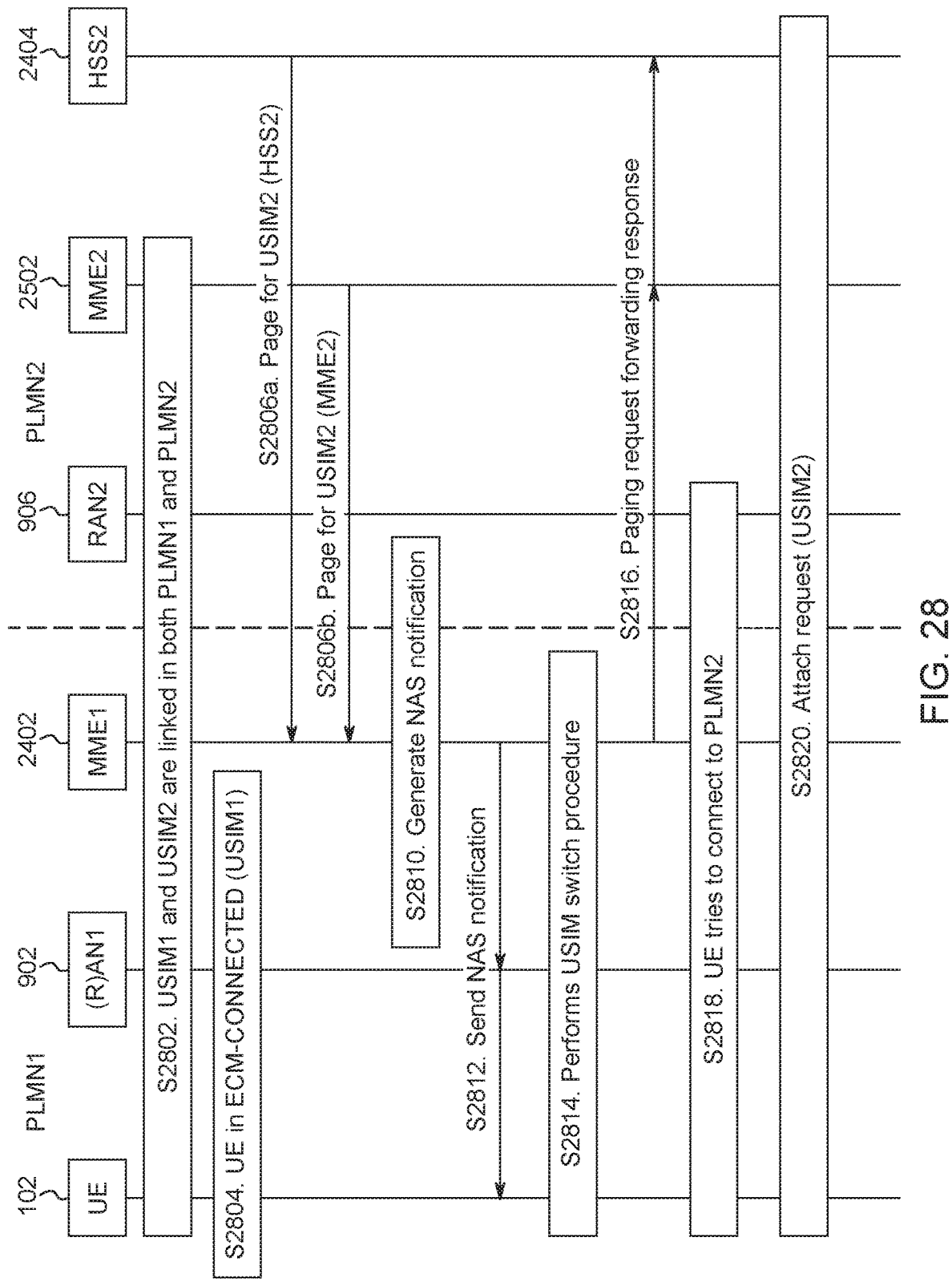
FIG. 28 shows a method of page request forwarding for a UE in ECM-CONNECTED state in accordance with an exemplary embodiment.

The multi-SIM paging operations is similar in LTE. As previously mentioned, paging request forwarding allows a MUSIM UE to receive paging requests for secondary SIMs even though the UE is not actively monitoring for paging occasions associated with those secondary SIMs. This feature is enabled through the successful execution of the aforementioned attach procedures. In the scenario shown in FIG. 28, a UE is actively communicating with PLMN1 using the primary SIM and there is data available for a secondary SIM on PLMN2. PLMN2 will forward a paging request for the secondary SIM to PLMN1 and PLMN1 will notify the UE that there is data for SIM2 on PLMN2. FIG. 28 shows this scenario while the UE is in ECM-CONNECTED state with PLMN1 for SIM1.

Step S2802: SIM1 and SIM2 are installed in the UE with SIM1 being the primary SIM and SIM2 being the secondary SIM. The UE has executed either a partial attach or an indirect attach with PLMN2 for SIM2 and paging request forwarding is enabled for SIM2. The EMM state in the UE for SIM1 is EMM-REGISTERED and for SIM2 is EMM-INACTIVE (or "Inactive Registration" sub-state or mode of EMM-REGISTERED). The UE may provide multi-SIM assistance information to the PLMN of each of the SIM to configure the PLMN of the user's preference for multi-SIM operations. Multi-SIM assistance information will be described in more details hereinafter.

Step S2804: The UE is in ECM-CONNECTED state for SIM1 and is receiving data services from PLMN1.

Step S2806: Data is available for SIM2 on PLMN2. If the UE had previously performed partial attach, then the HSS in PLMN2 forwards a paging request to the MME in PLMN1 in step S2806a. If the UE had previously performed indirect attach, then the MME in PLMN2 forwards a paging request to the MME in PLMN1 in step S2806b. The forwarded paging request indicates that there is data for the UE on PLMN2 and may include the temporary identifier assigned to SIM2, an identifier such as the PDU session ID, and/or application ID associated with the data for the page, and additional information such as the service category that indicates what the page is for. The paging request may contain the contents of the NAS notification generated for SIM2 by PLMN2 and be encapsulated in an encrypted NAS container so that only the UE can decrypt. The temporary identifier and possibly the service category may be unencrypted to allow PLMN1 to identify which UE to forward the container to and to provide an indication of the service category for the page. The contents of the NAS container in the paging request may also contain an SMS message that may be sent to the UE without having the UE connect to PLMN2 to retrieve the message. If multi-SIM assistance information was provided to PLMN2, PLMN2 may use the information to determine whether to forward the paging message to PLMN1 and what information to include in the forwarded paging message.

Step S2810: The MME in PLMN1 generates a NAS notification containing the encrypted NAS container from the paging request received in step S2806.

Step S2812: The MME in PLMN1 sends the NAS notification to the UE. The NAS notification contains the encrypted NAS container sent from PLMN2 that informs the UE that there is data available for SIM2. The information may include the temporary identifier for SIM2, the service category associated with the data, and other information such as PDU session ID and/or application ID for the data. If an SMS message was provided in the NAS container, the UE may present the message to the user and therefore, the UE is not require to connect to PLMN2 to retrieve the SMS message.

Step S2814: The UE examines the service category to check if the UE should switch to PLMN2 to retrieve the data. The service category may be classified as voice calls, SMS messages, or other data (e.g. application data), control plane signaling, emergency messages, emergency callback, mobile terminated exception data, etc. The UE determines that the provided service category information requires that a SIM switch request be executed and proceeds to send the request to the MME in PLMN1. This request may be a registration update request or an enhanced TAU request in which the UE provides a SIM Switch indication to notify PLMN1 that the UE would like to suspend the registration of SIM1 (e.g. set the UE state for SIM1 to EMM-INACTIVE). If the request is granted, the MME in PLMN1 sets the EMM state for SIM1 to EMM-INACTIVE (or enable the "Inactive Registration" sub-state or mode of EMM-REGISTERED state), activates paging request forwarding for SIM1, and saves all UE contexts managed by PLMN1 including security contexts and existing PDN connections. Upon receiving the registration update or TAU accept response, the UE also sets the EMM state internally in the UE. Note that the SIM switch procedure may be initiated by a user through a GUI, an application via an API, or through policies in the UE for multi-SIM operations.

Step S2816: The MME in PLMN1 sends a paging request forwarding response to either the MME or HSS of PLMN2 depending on the source of the original paging request from step S2806. The response may inform the MME or HSS of PLMN2 that the UE has decided to perform a SIM switch procedure and will connect to PLMN2 to complete processing the page. The MME in PLMN1 may also notify the MME of PLMN2 that it has enabled paging request forwarding for SIM1. Alternatively, the response may include an indication that acknowledges the page was received but the user is not currently interested in connecting to PLMN2 to retrieve data for the page. This may occur if the user is in the middle of an important call and do not want to be interrupted. The user may provide this indication through a GUI on the UE.

Step S2818: Then the UE performs PLMN selection, reads System Information, and performs cell selection for PLMN2 to try to connect to PLMN2. The UE may be configured to collect cell measurement information during this process to provide to the RAN node of PLMN2 upon successful connection.

Step S2820: If the UE is successful in connecting to PLMN2, the UE sends a request, e.g. an attach request or service request, to update the registration state for SIM2 and provides the temporary identifier assigned to SIM2 from one of the attach procedures previously executed. In addition, the UE may include the identifier sent in step S2806 to indicate the data associated with the page from step S2806. If successful, the request will transition the EMM state for the UE in MME2 to EMM-REGISTERED (or disable the "Inactive Registration" sub-state or mode of EMM-REGISTERED) and allow the UE to retrieve the data associated with the paging request sent in step S2806. The UE also transitions the EMM state saved internally to EMM-REGISTERED (or disable the "Inactive Registration" sub-state or mode of EMM-REGISTERED) upon receiving the response. The UE may also send the cell measurements obtained from step S2820 to the RAN node of PLMN2. These measurements may be used to assist with cell planning for the operator of PLMN2.

Figure 29:
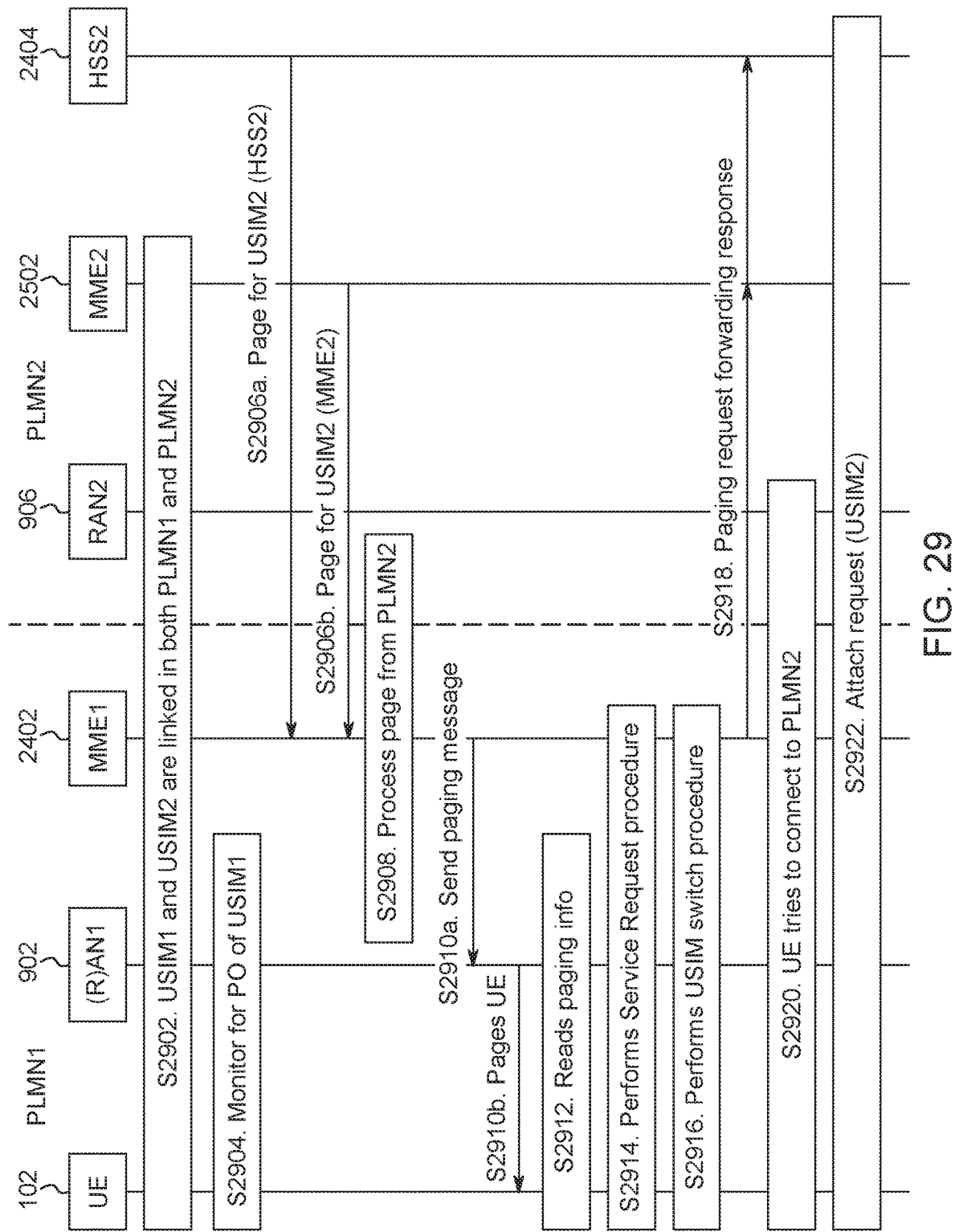
FIG. 29 shows a method of page request forwarding for a UE in ECM-IDLE state in accordance with an exemplary embodiment.

While FIG. 28 shows the paging request forwarding being sent when the UE is in ECM-CONNECTED state for SIM1 in PLMN1, FIG. 29 shows the same scenario but with the UE in ECM-IDLE state with PLMN1. In other words, the ECM state in both the UE and the MME of PLMN1 is ECM-IDLE. When in this state, the UE monitors for paging information on paging occasions associated with a temporary identifier assigned to the UE during the attach procedure.

Step S2902: SIM1 and SIM2 are installed in the UE with SIM1 being the primary SIM and SIM2 being the secondary SIM. The UE has executed either partial attach or indirect attach with PLMN2 for SIM2 and paging request forwarding is enabled for SIM2. The EMM state in the UE for SIM1 is EMM-REGISTERED and for SIM2 is EMM-INACTIVE (or "Inactive Registration" sub-state or mode of EMM-REGISTERED). The UE may provide multi-SIM assistance information to the PLMN of each of the SIM to configure the PLMN of the user's preference for multi-SIM operations. Multi-SIM assistance information will be described in more details hereinafter.

Step S2904: Since the UE is in ECM-IDLE state, the UE is monitoring for paging occasions associated with SIM1 and SIM2 in order to receive paging requests from both SIMs. Note that the UE may have been provided with a temporary identifier for SIM1 and another one for SIM2 from the MME in PLMN1. Therefore, the MME may have assigned the temporary identifiers in such a way that the paging occasions calculated from each identifier overlap at the same time, which helps minimize the time the UE needs to monitor for paging requests. As a result, the UE only needs to monitor for one paging occasion. For cases where there are more than two SIMs, the MME may have assigned the temporary identifiers such that the paging occasions do not collide with each other. In these cases, the UE may have to monitor for multiple paging occasions but is still able to receive pages for all SIMs without encountering paging collisions. In yet another case, the MME may have assigned the same temporary identifier for all SIMs in the UE and this identifier will be used to compute the paging occasion, thus minimizing the number of paging occasions the UE has to monitor. In this case, the UE needs to only monitor one paging occasion and is able to receive pages for all SIMs installed in the UE.

Step S2906: Data is available for SIM2 on PLMN2. If the UE had previously performed partial attach, then the HSS in PLMN2 forwards a paging request to the MME in PLMN1 in step s2906a. If the UE had previously performed indirect attach, then the MME in PLMN2 forwards the paging request to the MME in PLMN1 in step S2906b. The forwarded paging request indicates that there is data for the UE on PLMN2 and may include the temporary identifier assigned to SIM2 from PLMN2, an identifier such as the PDU session ID and/or application ID associated with the data for the page, and additional information such as the service category that indicates what the page is for. The paging request may contain the contents of a NAS notification generated for SIM2 by PLMN2 and be encapsulated in an encrypted NAS container so that only the UE can decrypt. The temporary identifier and the service category may be unencrypted to allow PLMN1 to identify which UE to forward the container to and to provide an indication of the service category for the page. The contents of the NAS container in the paging request may also contain an SMS message that may be sent to the UE without having the UE connect to PLMN2 to retrieve the message. If multi-SIM assistance information was provided to PLMN2, PLMN2 may use the information to determine whether to forward the paging message to PLMN1 and what information to include in the forwarded paging message.

Step S2908: The MME in PLMN1 processes the information from the paging request received in step S2906.

Step S2910: The MME in PLMN1 sends a paging message to the RAN node in step S2910a with the temporary identifier assigned to the UE for SIM2 by the MME in PLMN1. The temporary identifier used may be any of the identifiers specified in step S2904. The RAN node will then page the UE in step S2910b on a paging occasion that the UE is monitoring for. Since the paging occasion for both SIM1 and SIM2 are the same, the UE will receive the page even though it is for SIM2. The paging message may also include service prioritization information to inform the UE what the page is for.

Step S2912: The UE then reads the paging report and determines that the page is for SIM2 base on the presence of the temporary identifier assigned to SIM2 and the service prioritization information. If the temporary identifier is shared among all the SIMs, the UE may need to perform a Service Request procedure to find out to which SIM the page applies to. The paging message may also contain an indication that informs the UE to perform a Service Request procedure to retrieve more information of what to do next. Absent the indication, the UE may be configured to automatically perform the Service Request upon determining the page is for the UE.

Step S2914: The UE performs a Service Request procedure to retrieve more information of what to do next. Upon performing the SR procedure, the MME in PLMN1 may provide information from the forwarded paging request received from PLMN2 to the UE. This information may include the temporary identifier associated with the page, the service category for the page, and other information received from step S2906.

Steps S2916-S2922: The UE executes steps S2814-S2820 from FIG. 28 to complete processing the page, attach to PLMN2, and receive the data associated with the paging request.

An alternative to step S2910a of FIG. 29 is for the MME of PLMN1 to send the paging request to the RAN node with the temporary identifier of SIM1 instead of the temporary identifier for SIM2. In this alternative approach, the paging information would contain the temporary identifier of SIM1 with an indication that informs the UE to perform a service request to get more information on what to do next. When the UE performs the service request procedure, the MME of PLMN1 provides information that the page was for SIM2 and any additional information such as the service category of the page. This alternative approach may be used if the MME of PLMN1 is not able to provide a temporary identifier for SIM2 that aligns the paging occasions of both SIM1 and SIM2 together. This is more difficult for the case where more than two SIMs are in use. Alternatively, the MME of PLMN1 may assign the same temporary identifier for use when paging all SIMs installed in the UE. In this case, the UE needs to only monitor for one paging occasion and performs a Service Request procedure to find out to which SIM the page is for. The MME manages this by linking the registration states of all SIMs for the UE together and assigns the same temporary identifier for use in paging the UE regardless of SIM.

The paging request forwarding response shown in step S2918 of FIG. 29 may be sent without performing a SIM switch procedure for cases in which the UE does not want to respond to the page. This may occur when the user is in the middle of an important call and do not want to be interrupted. The user may provide this indication through a GUI on the UE. For these cases, the paging request forwarding response is sent after the UE performs the service request procedure in step S2914 of FIG. 29 instead of after step S2916. The user may provide an indication that acknowledges the page was received but the user is not currently interested in connecting to PLMN2 to retrieve data for the page.

Figure 40:
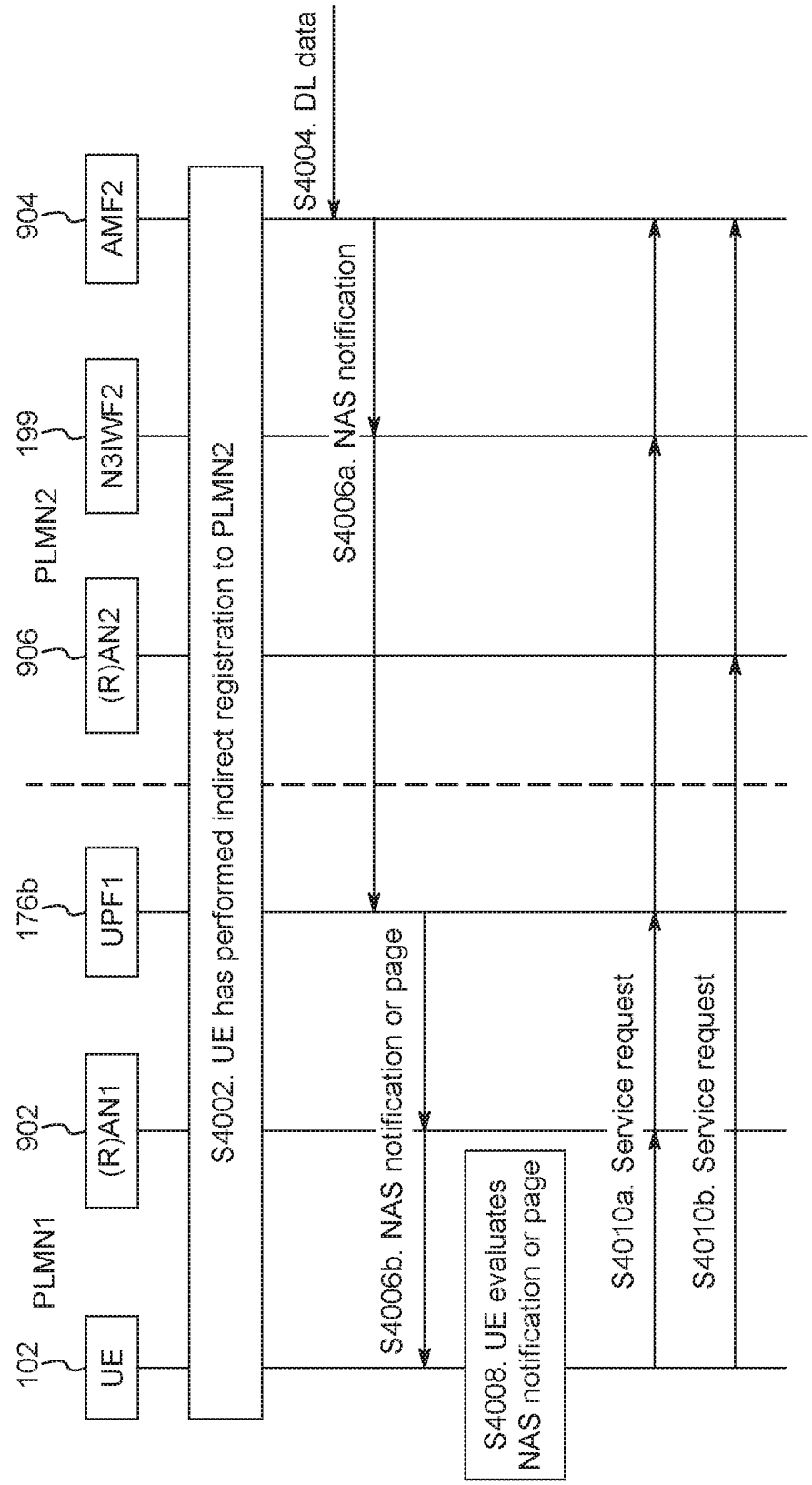
FIG. 40 shows a method of a multi-SIM UE receiving a NAS notification from PLMN2 for SIM2 over the user plane of PLMN1 in accordance with an exemplary embodiment.

The paging request forwarding may also be sent over the user plane if the UE had performed indirect registration over the user plane. FIG. 40 shows an example of a multi-SIM UE receiving a NAS notification from PLMN2 for SIM2 over the user plane of PLMN1. The UE had already performed indirect registration with PLMN2 for SIM2 over the user plane of PLMN1 and downlink data arrives at AMF2 for SIM2.

Step S4002: UE has performed indirect registration with PLMN2 for SIM2 over the user plane of PLMN1. The indirect registration enables PLMN2 to forward paging requests for SIM2 to the UE over the user plane of PLMN1. The UE may provide multi-SIM assistance information to the PLMN of each of the SIM to configure the PLMN of the user's preference for multi-SIM operations. Multi-SIM assistance information will be described in more details hereinafter. Step S4004: Downlink data is available for SIM2 on PLMN2 and AMF2 is notified. AMF2 may evaluate available multi-SIM assistance information provided by the UE to determine whether the downlink data meets the paging filter criteria. If the criteria is met, AMF2 generates a NAS notification to send to the UE. Otherwise, AMF2 returns a response to the source of the downlink data notification that the UE is not interested in receiving the data at this time or that the UE is not currently available. The response may indicate that the data should be buffered. The NAS notification may include a PDU session ID associated with the downlink data or an SMS message. Other events that may cause AMF2 to generate a NAS notification to the UE may be control plane signaling of policy updates AMF2 would like to send to the UE. This may include reminders for performing periodic registration or TAU updates, updates to URSP rules, new timer values for the UE to use, how long the UE has to respond to the notification, etc. Step S4006: AMF2 sends the NAS notification through N3IWF2 to the UE over the user plane of PLMN1 in step S4006a. Depending on the connection management state of the UE, PLMN1 may send a NAS notification to the UE as a result of receiving the NAS notification from PLMN2 or PLMN1 may page the UE if the UE is in CM_IDLE state. To PLMN1, the NAS notification from PLMN2 is mobile terminated data for the UE. Note that the NAS notification or the page sent by PLMN1 in step S4006b is associated with SIM1.

Step S4008: The UE evaluates the NAS notification received from PLMN1. Note that this NAS notification contains information sent by PLMN2 in step S4006a. The NAS notification may contain service prioritization information to help the UE identify the service type that is associated with the data from which the NAS notification was generated for in step S4006a.

Step S4010: The UE makes a service request in order to receive the Mobile Terminated data that caused the page. If the UE determines that the service prioritization information in the NAS notification from PLMN2 sent in step S4006a is of importance, the UE will then perform a service request to PLMN2 using one of two mechanisms. The first mechanism is for the UE to continue using the user plane of PLMN1 to send the service request in response to the NAS notification received from PLMN2. This mechanism may be used by the UE if the UE would like to remain connected to PLMN1 and receive the data for SIM2 over the user plane of PLMN1. The second mechanism is for the UE to switch connections to PLMN2 and establish connectivity with PLMN2. The second mechanism may be used by the UE if the UE is not currently receiving service on PLMN1 and would like to retrieve data associated with the NAS notification sent from PLMN2 and also continue to receive service from PLMN2 thereafter, e.g. to make a call using SIM2.

SIM Switch Procedure

Figure 16:
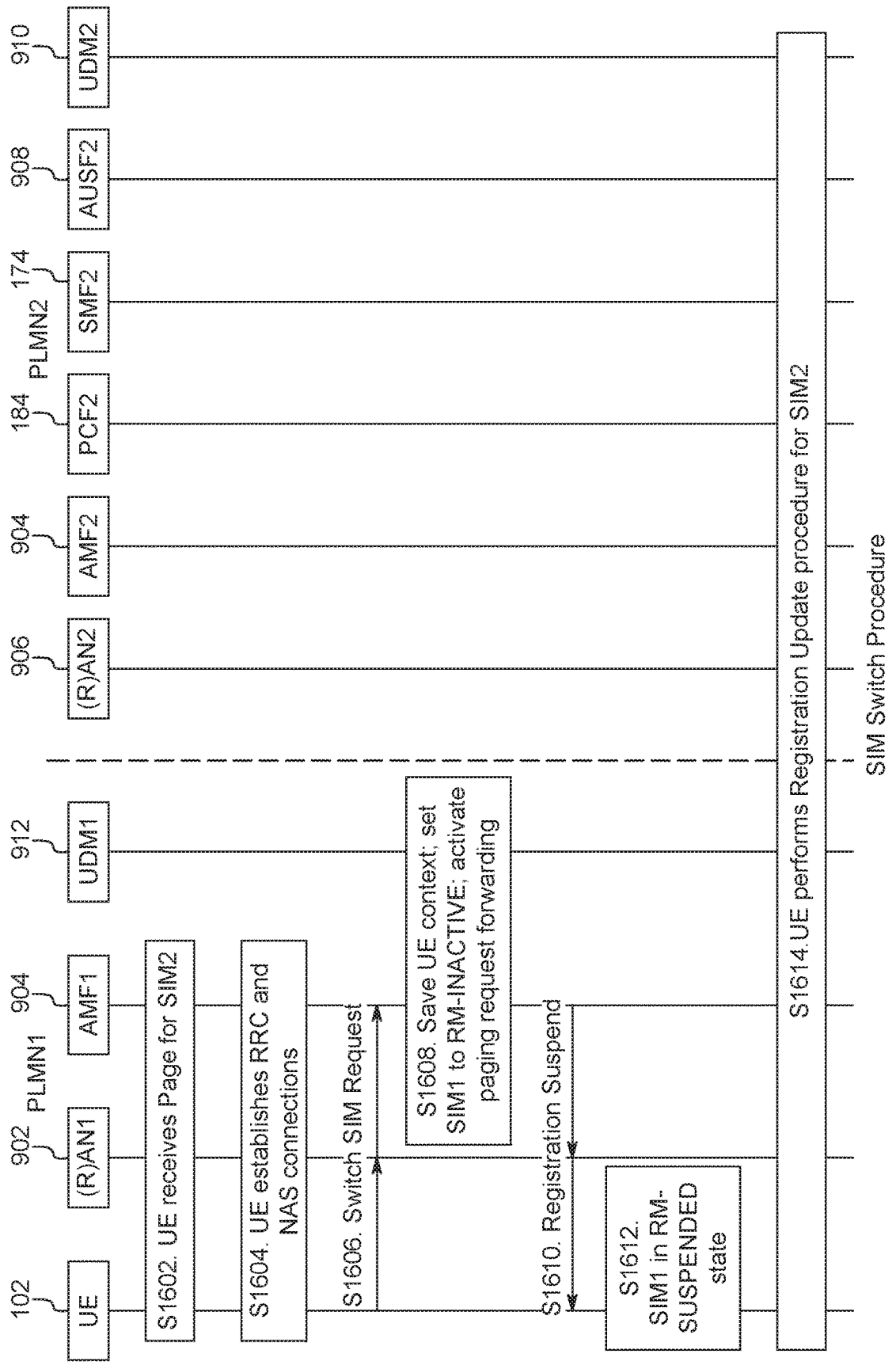
FIG. 16 shows a SIM switch method in accordance with an exemplary embodiment.

If a UE receives a page or NAS notification for the SIM of an inactive PLMN and the UE decides to retrieve data associated with the page, the UE can perform a SIM Switch procedure to notify the active PLMN to suspend the UE's registration state and allow the UE to establish communications with the inactive PLMN. The successful execution of the SIM Switch procedure will transition the UE's registration state for the active SIM from RM-REGISTERED to RM-INACTIVE. Once in this state, the core network will preserve all UE contexts including existing PDU sessions and slice allocations to allow the UE to quickly transition back to the RM-REGISTERED state. At this point, the UE will perform a Periodic Registration Update to the inactive PLMN and transition its RM state with the inactive PLMN from RM-INACTIVE to RM-REGISTERED. The UE then can retrieve whatever data that was associated with the page or NAS notification. FIG. 16 shows the SIM Switch procedure performed by a UE switching from PLMN1 to PLMN2 due to receiving a paging message for SIM2. Note that the SIM switch procedure shown in FIG. 16 uses 5G terms but the procedure may be applied to LTE systems as well.

Step S1602: UE receives a Paging message as described in FIG. 15 and determines the page is for SIM2 based on the ue-Identity field of the PagingRecord information element. The UE may not know to which SIM the page is for if the temporary identifier is shared among the SIMs in the UE. In that case, the UE collects this information in step S1604 after performing a service request procedure. In addition, the UE is informed the page corresponds to a voice or IMS call based on a new service prioritization field in the PagingRecord information element. The UE is configured to prioritize voice or IMS calls and decides to perform a SIM Switch procedure. An alternative is a user initiates the SIM Switch procedure manually via a GUI as shown in FIG. 17. The paging message may also correspond to an SMS message or notification of the availability of downlink data for SIM2.

Step S1604: UE establishes both RRC and NAS connections in order to be able to communicate with PLMN1. The UE may execute the service request procedure to retrieve information on which SIM the page is for and possibly a service category for the page. The UE may retrieve other information from the encrypted NAS container such as PDU session ID, slice instance ID, and/or application ID associated with the data for the page. The NAS container may also include SMS message(s) for the page. Based on this information, the UE decides to perform a SIM switch procedure. The decision may be triggered by the user through a GUI on the UE or possibly by an application or policy on the UE.

Step S1606: Then the UE performs a SIM Switch Request procedure in which the Registration Type is set to SIM Switch or a SIM Switch indicator is included in the request. The SIM Switch procedure may be incorporated as a Periodic Registration Update with a SIM switch indication. This request is to inform PLMN1 that the UE would like to suspend its registration state and connect to PLMN2 to retrieve data associated with the page or to use services provided by PLMN2.

Step S1608: AMF1 processes the request and updates the RM state of SIM1 to RM-INACTIVE. All UE contexts managed by PLMN1 including existing PDU sessions will be preserved until the UE performs a Registration Update to transition back to the RM-REGISTERED state. The paging request forwarding is activated in UDM1 912 and/or AMF1 904 appropriately depending on whether Partial or Indirect registration was performed previously.

Step S1610: AMF1 returns a Registration Suspend message to the UE with an indication that the UE's RM state for SIM1 has been changed to RM-INACTIVE. Alternatively, the message may be a Registration Deactivate Accept message. The message may include a Registration Timer value to indicate to the UE the duration PLMN1 will maintain the RM state in RM-INACTIVE for SIM1.

Step S1612: UE transitions its RM state from RM-REGISTERED to RM-INACTIVE for SIM1 and notes the Registration Timer value if one was provided. In the absence of a Registration Timer value, the UE may use the value provided in an internal configuration within the UE Policy or configured by a user in a GUI.

Step S1614: UE performs PLMN selection, reads System Information, and performs cell selection for PLMN2. Then the UE performs Registration Update procedure for SIM2 and may include a SIM switch indication. The RM state for SIM2 within the UE will transition from RM-INACTIVE to RM-REGISTERED upon the reception of a Registration Accept message and the UE will be able to receive the voice or IMS call from PLMN2.

Management of Registration Timers for Inactive SIMs

Figure 30:
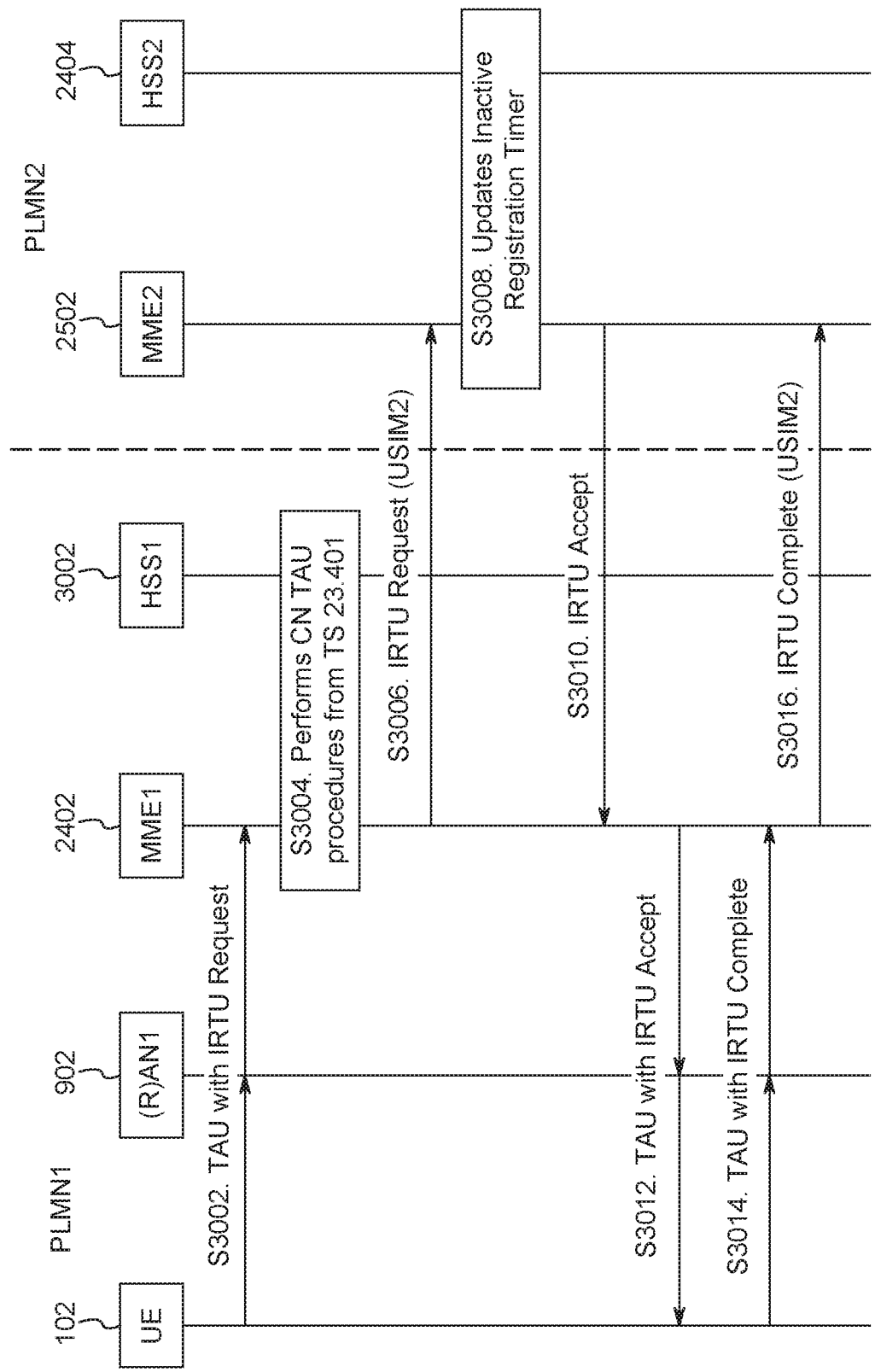
FIG. 30 shows a method of inactive registration timer update in accordance with an exemplary embodiment.

After the attach procedure is successfully executed for the secondary SIMs, the UE may need to periodically inform the corresponding PLMN to update the registration timer in order to keep the EMM state in EMM-INACTIVE (or "Inactive Registration" sub-state or mode of EMM-REGISTERED). To do this, the UE may request to update the registration timers on the secondary PLMNs through the active PLMN rather than disconnecting from the active PLMN and connecting to the secondary PLMNs to perform the inactive registration timer update request. The UE may execute a single registration timer update request, which may be an enhanced TAU request, that combines the update of the registration timers in both the active PLMN and the secondary PLMNs as shown in FIG. 30 for the two SIM case. Alternatively, the UE may request the active PLMN to forward an Inactive Registration Timer Update (IRTU) request to secondary PLMNs separately if there are activities on the active PLMN that does not require a registration timer update. Note that the procedure shown in FIG. 30 is for LTE systems and the procedure may be applied to 5G systems as well.

Step S3002: The UE sends a TAU request to the MME of PLMN1 to update the registration timer maintained in PLMN1 for SIM1. The request may include the temporary identifier assigned to SIM1 by PLMN1, a multi-SIM indicator, the temporary identifier assigned to SIM2 by PLMN2, and other parameters of a TAU request. This indicates to the MME in PLMN1 to not only update the registration timer for SIM1 in PLMN1 but also to forward an IRTU request to PLMN2 for SIM2. Note the multi-SIM indicator may be integrated into an existing parameter such as Preferred Network behavior as described above.

Step S3004: The MME of PLMN1 performs the TAU request for SIM1 and may assign a new temporary identifier to the UE for SIM1. HSS1 3002 can also be involved in this step.

Step S3006: In addition, the MME of PLMN1 sends an IRTU request to the MME of PLMN2 to update the registration timer for SIM2. This IRTU request may include the multi-SIM indicator and the temporary identifier assigned to SIM2 by PLMN2. Note also that the MME of PLMN1 may provide location information for the last visited TAI parameter to convey the whereabouts of the UE so PLMN2 can track the UE. Note that the IRTU request may be realized as a TAU request or it may be a standalone request.

Step S3008: The MME of PLMN2 performs an IRTU request for SIM2 and updates UE contexts for SIM2 with information provided in step S3006.

Step S3010: An IRTU Accept response is returned to the MME of PLMN1 with the status of the request and a new temporary identifier such as a GUTI may be assigned to the UE for SIM2. A new timer value and other location dependent information such as an updated TAI list may also be provided. In 5GS, new UE policies may be provided in the response to the UE. PLMN2 may also provide an indication that the registration state for SIM2 is no longer valid and that the UE may need to re-register to PLMN2. This information may be provided within an encrypted NAS container so only the UE can decrypt.

Step S3012: The MME of PLMN1 aggregates the TAU Accept message with the IRTU Accept message and returns them to the UE. The response may include the encrypted NAS container with information returned from PLMN2.

Step S3014: If a new temporary identifier was assigned to either SIM1 or SIM2, the UE returns a TAU with IRTU Complete message to the MME of PLMN1.

Step S3016: If a new temporary identifier was assigned to SIM2, the MME of PLMN1 forwards the IRTU Complete message received from the UE to the MME of PLMN2.

Providing Cell Measurements Obtained from SIM Switch Procedure

Figure 31:
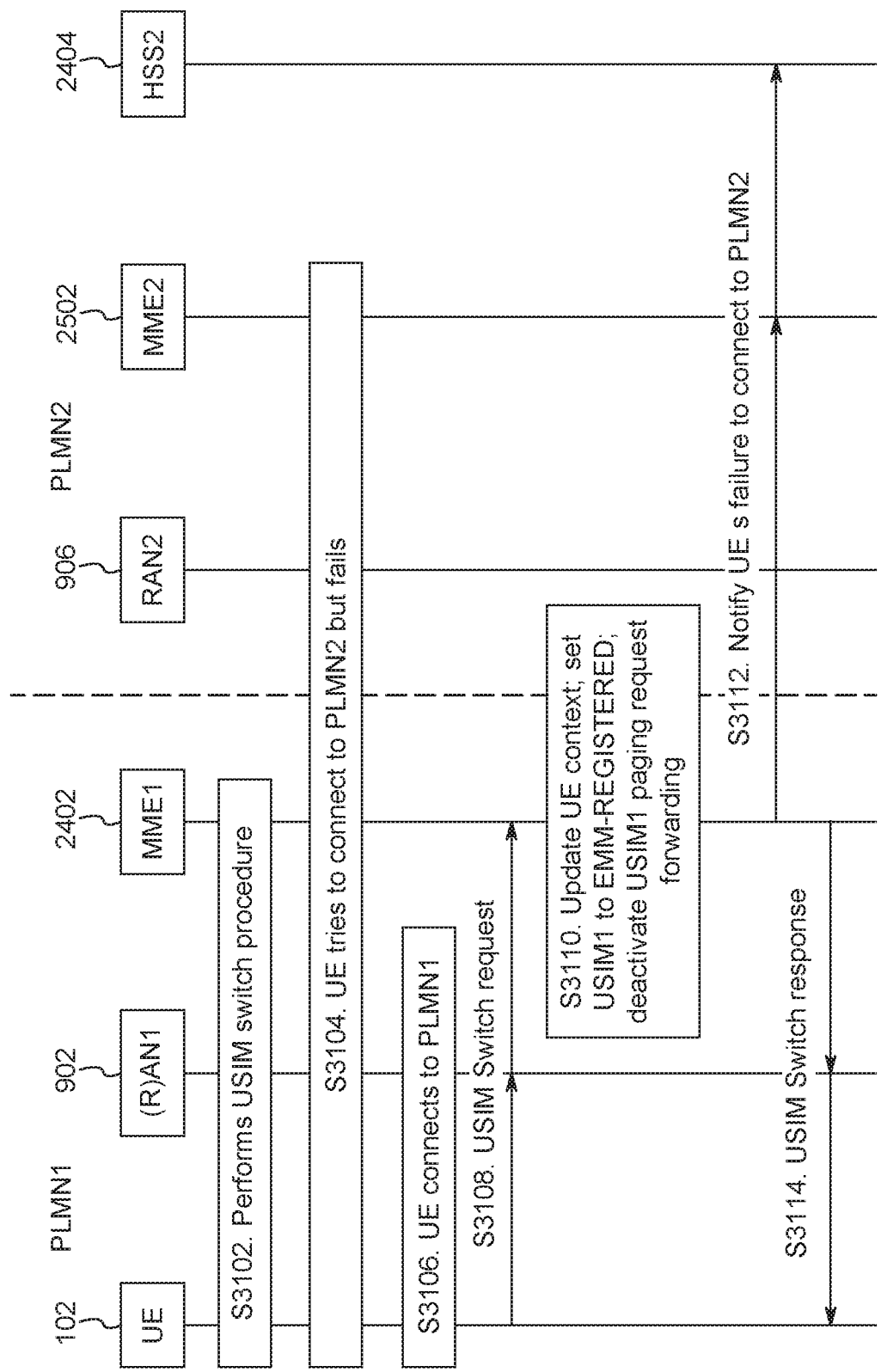
FIG. 31 shows a method of an error case resulting from a SIM switch in accordance with an exemplary embodiment.

There may be times when the UE attempts to perform a SIM switch procedure with an inactive PLMN and the UE is unable to establish connectivity with a cell of the inactive PLMN. The cell of the inactive PLMN may be overloaded or the UE may be in an area where there is a coverage hole for the inactive PLMN. In these cases, the UE may proactively provide measurements found in Minimization of Drive-Tests (MDT) reports to the inactive PLMN through the active PLMN that may be used to improve cellular coverage. The measurements may be further sent to an NWDAF in the inactive PLMN for use in analytics. FIG. 31 shows a case in which a SIM switch procedure fails for connecting to PLMN2 and the UE reconnects with PLMN1 to provide cell measurements and a cause code that are forwarded to PLMN2. The forwarding of the cell measurements and the cause code may signal that the UE is unable to process the page further.

Step S3102: After receiving a page or NAS notification, a UE performs a SIM switch procedure to disconnect from PLMN1 and tries to connect to PLMN2. The UE may be configured to collect cell measurements while performing cell selection to try to connect to PLMN2. These measurements may then be saved and provided to PLMN2 at a future time to help characterize the signal strengths of various cells belonging to PLMN2.

Step S3104: The UE tries to connect to a cell belonging to PLMN2 but the connection fails, possibly due to the cell being overloaded, the cell has a relatively low signal power that makes it difficult to maintain the connection, or even that there are no nearby cells that provides coverage to the UE. At the same time, the UE collects cell measurements during this process and the UE may be provided with a cause code from the RAN2 node 906 of why the UE failed to connect to the cell. For the case there is no available cell, the UE may be configured with a cause code indicating so. Note also the failure may originate from the MME and a corresponding cause code may be returned to the UE from the MME.

Step S3106: Unable to connect to a cell belonging to PLMN2, the UE reconnects to a cell belonging to PLMN1.

Step S3108: The UE then sends a SIM switch request to the MME of PLMN1 and provides the cell measurements collected for cells of PLMN2. These measurements may be provided within an encrypted NAS container so only PLMN2 can decrypt. An indication may be provided to inform the MME of PLMN1 that there is data to forward to the MME of PLMN2. The cause code may also be provided as the reason the UE was not able to connect to a cell belonging to PLMN2. This cause code may be used to inform PLMN2 that the UE tried to complete processing a page request but was unable to establish connection with a cell of PLMN2. In addition, the identifier that was provided by PLMN2 in step S2806 of FIG. 28 to associate with the page may be included to inform PLMN2 that the UE was unable to retrieve data belonging to this page.

Step S3110: The MME of PLMN1 processes the SIM switch request to reenables the UE context stored in the MME for SIM1, set the EMM state to EMM-REGISTERED (or disable the "Inactive Registration" sub-state or mode of EMM-REGISTERED state), and deactivate paging request forwarding for SIM1.

Step S3112: The MME in PLMN1 forwards the encrypted NAS container obtained from the UE to the MME in PLMN2 with the cause code and the identifier received in step S2806 of FIG. 28 that associates with the page. This step is conditional, and only occurs when the UE had previously performed indirect attach for SIM2 with PLMN2.

Step S3114: A response is returned to the UE indicating the status of the SIM switch with PLMN1 for SIM1. The response may indicate a status of the forwarding of the cell measurements and the cause code to PLMN2.

Interworking with Multi-SIM UEs

Figure 32:
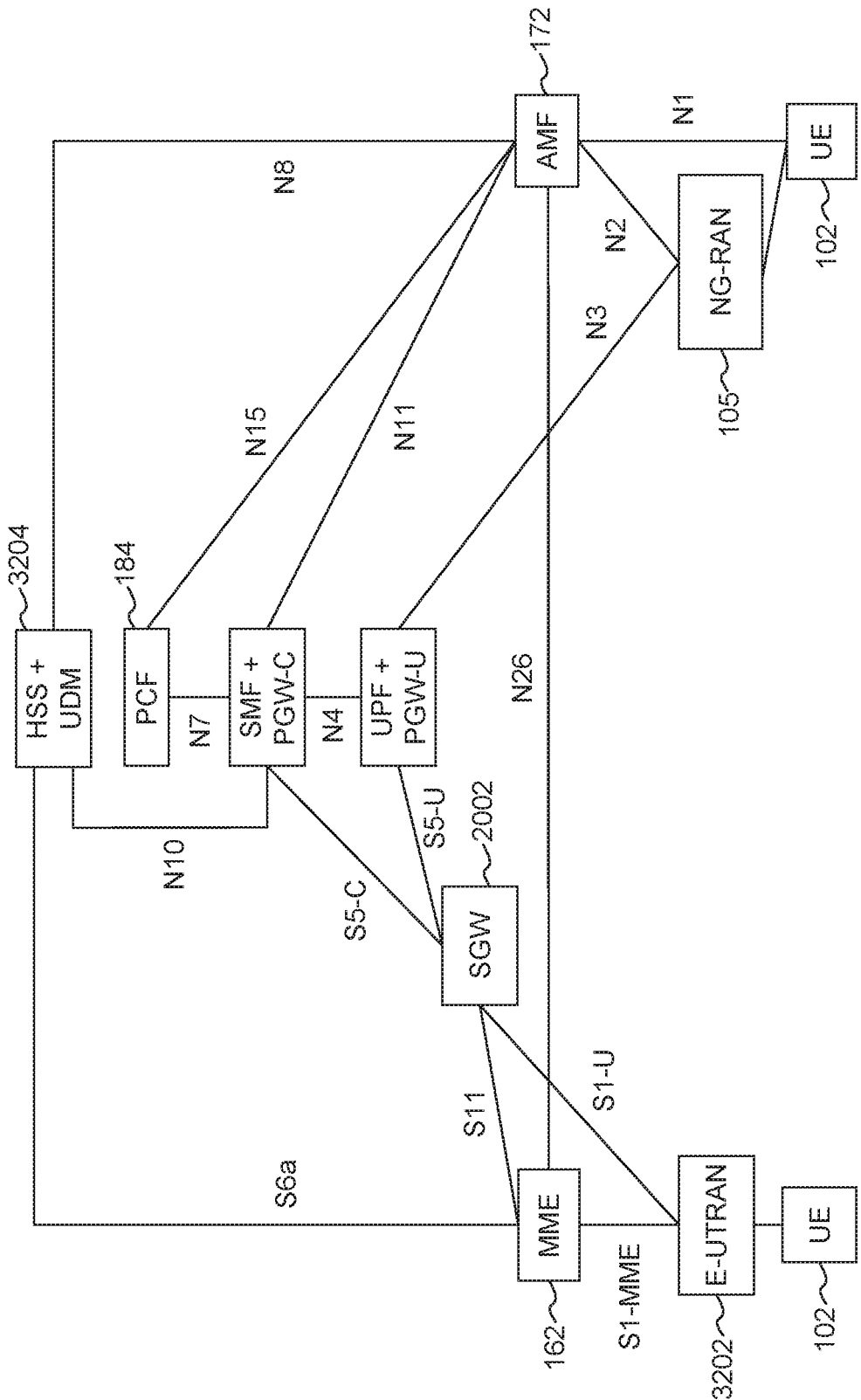
FIG. 32 shows the non-roaming architecture for interworking between 5GS and EPS in accordance with an exemplary embodiment.

A multi-SIM UE may support connectivity to both LTE and 5GS networks. It should be appreciated that the enhancements proposed herein may to applied to interworking scenarios involving a UE switching between LTE and 5G and from 5G back to LTE. FIG. 32 shows the non-roaming interworking architecture between 5GS and EPS where the N26 interface connects an MME in LTE with an AMF in 5G. In addition, the HSS+UDM 3204 connects with the MME and AMF respectively over the interfaces S6a and N8. These interfaces may be used to support the attach procedures as well as the paging request forwarding function that are proposed herein.

Multi-SIM Impacts to 5G UE Policy

Currently, the UE Policy stored in the UE encompasses the ANDSP and URSP policies to assist the UE in making access network and user route selection decisions, respectively. The UE Policy is delivered to the UE by the PCF via the AMF and NAS messaging. In order to support multi-SIM UEs, it is proposed that a new policy type be introduced to the UE policy—the multi-SIM policy. This new policy will define aspects of UE operations with multi-SIM capabilities. An example of a proposed multi-SIM policy is shown in Table 2.

TABLE 2

| | New Multi-SIM Policy in UE Policy | | | | |
|---|---|---|---|---|---|
| Information name | Description | | Category | PCF permitted to modify in a UE context | Scope |
| SIM Identifier | An identifier for the SIM such as ICCID, IMSI, or SUPI. | | Mandatory | No | UE context |
| Temporary Network Identifiers | A temporary identifier assigned to the SIM by the CN used for identifying paging requests. | | Mandatory | Yes | UE context |
| PLMN ID | An identifier for a network operator associated with this configuration | | Mandatory | No | UE context |
| PLMN Name | Human readable name given to the operator | | Optional | Yes | UE context |
| UE radio capability | Identifies the radio capability of the UE: single Rx, Tx; dual Rx, single Tx | | Optional | No | UE context |
| Registration Timer | Timer used to configure the UE to perform the SIM Switch procedure automatically. | | Optional | Yes | UE context |
| Service Prioritization List | A list of service types and prioritization categories the UE uses to make determination on switching service to this PLMN. The user of the multi-SIM UE configures this list to inform the UE on how to process multi-SIM traffic, e.g. which SIM is the primary SIM and which SIM(s) are secondary SIMs. | | Optional | No | UE context |
| Multi-SIM assistance information | Information provided by a UE or via operator network configuration that the network uses to assist in multi-SIM operations, including assisting with avoiding paging collisions. | | Optional | Yes | UE context |
| Enable paging request filtering | Flag to enable PLMN to filter paging requests—this enables a UE to control which PLMN is allowed to filter paging requests. | | Optional | No | UE context |

TABLE 2-continued

New Multi-SIM Policy in UE Policy

| Information name | Description | Category | PCF permitted to modify in a UE context | Scope |
|---|---|---|---|---|
| Maximum number of SIMs | The maximum number of SIMs supported by current operator. | Optional | Yes | UE context |
| Dual RM-REGISTERED support | An indicator showing if the current PLMN supports multi-SIM operations in which two SIMs may be in RM-REGISTERED state. This feature allows the active PLMN to route traffic from an inactive PLMN to the UE in addition to the traffic provided to the UE by the active PLMN. | Optional | Yes | UE context |
| PLMN List | A list of PLMNs that the UE may register to for multi-SIM operations. Associated with each PLMN may be an indicator of which registration type (partial or indirect) the PLMN supports for multi-SIM operations. | Optional | Yes | UE context |

Some of the information in the multi-SIM policy may be pre-provisioned to or determined by the UE, configured by the user via a GUI, obtained by the UE from the core network, or a combination thereof. A new multi-SIM policy may be created manually by the user or dynamically by the UE for each SIM that is installed. The list of multi-SIM policies may then be presented in a GUI as shown in FIG. 17.

Alternatively, the multi-SIM policy may be created by the core network after a UE successfully registers to the PLMN. The multi-SIM policy that the PCF sends to the UE may be PLMN based. In other words, a PCF in each PLMN that the UE communicates with may send the UE the multi-SIM policy. Then as the UE registers to other PLMNs, new multi-SIM policies are added to the UE's policy and the GUI shown in FIG. 17 may summarize all PLMNs the UE is registered to. The user can then assign priorities to each PLMN and manually configure other parameters associated with that PLMN. The reception of a new multi-SIM policy may trigger the UE to attempt a partial or indirect registration procedure as described earlier in the disclosure.

The UE may provide the radio capability of the UE to the core network to assist the network with improving multi-SIM operations. Having knowledge of the radio capability of the UE may enable the core network to adjust the paging strategy used to ensure the UE is able to receive paging requests while also minimizing the use of network and paging resources. A UE may have single Rx, single Tx capability which indicates the UE is only able to receive downlink signaling for one SIM at a time and is able to send uplink signaling to the network for one SIM at a time. A UE with dual Rx, single Tx capability is able to receive downlink signaling from up to two SIMs at a time but is only able to send uplink signaling for one SIM at a time. The core network may provision to a UE a multi-SIM policy based on the radio capability of the UE during registration. This may help ensure consistent network operations for multi-SIM UEs and help the network manage paging resources more efficiently. For example, the network may adapt paging occasions for single Rx UEs by sending the UE paging region information for a particular SIM. Upon receiving the paging region information, the UE may compare the received paging region with the paging region of another SIM to determine if a potential paging collision may exist. If a potential paging collision exists, then the UE may request from the core network another paging occasion for the SIM.

Instead of the UE radio capability being included as part of the multi-SIM policy, it may be a separate indicator that is provided by the UE to the core network during registration. The presence of this indicator allows the core network to manage paging occasion allocation based on the radio capability of the UE. For dual Rx capable UE, the core network may assign temporary identifiers associated with random paging occasions. For single Rx capable UE, the core network may use multi-SIM assistance information as described hereinafter to adapt paging occasions of different SIMs to avoid paging collisions.

Within the multi-SIM policy, the Service Prioritization List may be configured by the user of a multi-SIM UE to indicate the priority of multi-SIM traffic such as which is the primary SIM, what types of services are of higher priority and the network should page the UE, what types of services are lower priority and the network should not page the UE, a time duration, location information, etc. in which the UE should prioritize traffic from a particular SIM, etc. The multi-SIM assistance information utilizes the user preferences from the service prioritization list and provides additional information to assist the core network in how to enhance or optimize network operations for multi-SIM UEs. The assistance information may inform the core network which traffic is of importance to the UE and hence to page the UE, which traffic is not of importance to the UE and should be ignored by the network by not paging the UE, how the network can assign new temporary identifiers to avoid paging collisions and what parameters to use when assigning the new parameters, how long to enable the filtering of paging requests by the core network, etc.

The information presented in the service prioritization list may be used to assist the UE in making a determination on what to do upon the receipt of service type information in the paging request. The service type information may provide high level information such as a voice call, SMS message, other data, control plane signaling, emergency messages, emergency callback, mobile terminated exception data, etc. The UE may check if the service type provided in the paging request matches the service type in the service prioritization list. If there is a match, the UE may decide to perform a SIM switch procedure to retrieve the data associated with the page. However, if the service type provided in the paging request is not found in the service prioritization list, then the UE may respond to the page that it is currently busy and may also enable paging request filtering.

In some cases, the UE may want more granular information of what the page is for in order to make a better decision. For example, a phone call from a family member or a close friend is of more interest to the user than a call from a telemarketer or from a robo-caller. Thus, prioritization level information may be included in the service prioritization list to specify finer granularity of services the user is interested in. This information may be provided by user configuration via a GUI upon initial install of the multiple SIMs in the UE. The user may group users such as family members, friends, work colleagues, acquaintances, contractors, etc. and assign priority to only certain groups, e.g. family and friends. Alternatively, the groups may organize priority levels as numerical such as levels 1, 2, 3, etc.

The service prioritization list may comprise both a service type category and a service prioritization level as shown in Table 3 to enable a UE to determine whether a page is of importance to the user. Service type category may consist of voice call, SMS message, other data, control plane signaling, emergency signaling, emergency callback, mobile terminated exception data, etc. There may be different priorities for each of the service type. For example, there may be levels such as level 1, 2, and 3 assigned to voice calls and SMS messages to specify whether calls are from user's family and friends, from user's contacts, or for calls from sources not is user's contacts. Similarly, there may be high and low levels assigned to other data and control plane signaling for the UE and other indications to describe emergency signaling. There may exist one level such as in the case of emergency callback and mobile terminated exception data. Both these cases may refer to cases where the core network has important data for the UE.

TABLE 3

Service Prioritization List Information

| Service Type Category | Service Prioritization Level |
| --- | --- |
| Voice call | Level 1: Source found in favorite contacts |
| SMS message | Level 2: Source found in contacts list |
| | Level 3: Source not found in contacts list (all sources) |
| Other data | High: Data is important; minimize interruptions |
| Control plane signaling | Low: Data is not important; interruptions are tolerable |
| Emergency signaling | Natural disasters |
| | Predatory warnings |
| Emergency callback | One level |
| Mobile terminated exception data | One level |

As previously described, service type category and service prioritization level may be included in the paging message the UE receives. The UE, using the user configured service prioritization list, is then able to use the service type category and prioritization level to make a determination of whether the data associated with the page is of interest to the user and to help the UE decide how to respond to the page. For example, the UE may decide the data associated with the page is important to the user and decide to perform a SIM switch procedure. Conversely, the UE may decide the data is not as important to the user and inform the PLMN that the UE is busy or can't be reached. In other cases, the UE may present the service type and prioritization level information to the user via a GUI and let the user decide how to continue forward.

Some of the service prioritization levels may not be readily available to the network prior to UE registration, such as the prioritization levels for voice calls and SMS messages. The population of these levels with the appropriate contacts may be provided by the UE to the network via an application server after UE registration. This may be done through an API that is exposed to the application server to allow the user to configure the different priority levels as indicated in Table 3. Alternatively, the user may provide this information dynamically in a service request procedure or over the user plane by tagging services with the appropriate levels. For example, a GUI may prompt the user after a voice call what priority level to associate the phone number with. The UE may then signal over the user plane the indicated priority level of the voice call to the core network.

Once a user has configured the service prioritization list, the UE may utilize the user preferences to derive multi-SIM assistance information for the multi-SIM policy to provide to the core network. The multi-SIM assistance information may provide the core network with a set of service types and priorities on which to filter pages to a UE in order to minimize wasting network and paging resources. In addition, other information in the multi-SIM assistance information may be provided to request different paging occasions the UE monitors on between the installed SIMs to better avoid paging collisions. The assistance information may be configured by network policies that are sent to the UE and will be described in more detail hereinafter.

The multi-SIM assistance information may be provided to the core network initially during registration or as needed whenever the UE detects a need to inform the core network of such information. For example, when the user of a UE requests to use a service for a particular SIM for a certain duration such as an important voice call, the UE may provide the multi-SIM assistance information in a service request or in a registration update request. The assistance information may then be used by the core network to filter pages for services not of interest to the user and only page the UE for more important services. Likewise, after the user finishes the voice call, the UE may remove or disable the assistance information to enable the core network to page the UE for all services.

Figure 41:
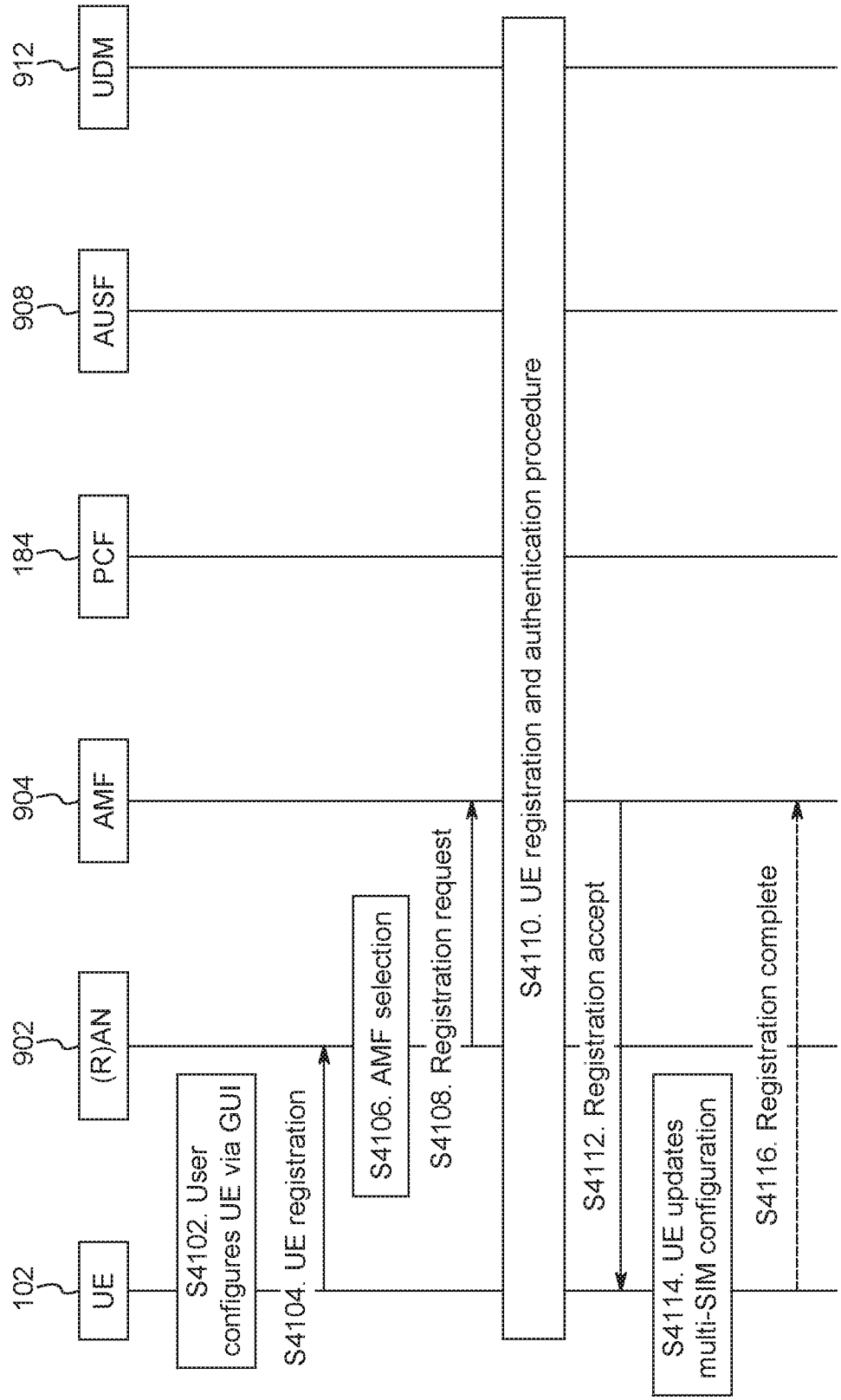
FIG. 41 shows a method in which a multi-SIM UE provides user configuration to the core network with preferences of how the user wants the UE to behave for multi-SIM operations in accordance with an exemplary embodiment.

FIG. 41 shows an example of how a multi-SIM UE provides user configuration to the core network with preferences of how the user wants the UE to behave for multi-SIM operations. After installing multiple SIMs into the UE and powering on the UE, a GUI prompts the user to configure preferences for the UE to follow. When the user finishes the configuration, the UE performs registration for each of the SIMs installed in the UE. FIG. 41 shows the registration of one of the SIMs and how the user configurations are sent to the core network in the form of the multi-SIM policy.

Step S4102: A user installs multiple SIMs in a UE and upon power up, the UE prompts the user via a GUI to configure information for multi-SIM operations. The information provided by the user may be used to specify the user's preferences for how the UE manages multi-SIM operations on the UE. These preferences may be captured in the service prioritization list of the multi-SIM policy shown in Table 2. The UE may then add the user preferences to the multi-SIM policy and provide the policy to the CN to enable the enhanced handling of multi-SIM traffic. In addition, the UE may provide information that it may have access to, such as SIM identifier, PLMN ID and name, UE radio capability, maximum number of SIMs, and PLMN list to derive the multi-SIM policy.

Step S4104: After the user has configured the service prioritization list, the UE sends a registration request to the RAN node with the multi-SIM policy shown in Table 2 that includes a multi-SIM indicator and the multi-SIM assistance information that incorporates the user configuration. The multi-SIM indicator and multi-SIM assistance information may also be included in the access stratum message so that the RAN node can read the indication and information and consider them during AMF selection.

Step S4106: The RAN node then selects an AMF that supports multi-SIM UEs based on the presence of the multi-SIM indicator.

Step S4108: The RAN node forwards the registration request to the selected AMF with the multi-SIM indicator, the multi-SIM assistance information, and the rest of the informational elements of the multi-SIM policy.

Step S4110: The AMF performs the UE registration and authentication procedure from TS 23.502 [2]. During this process, the AMF and PCF may provide additional information to the multi-SIM policy. The AMF may provide the Temporary Network Identifier(s) and the Registration Timer values while the PCF may provide whether the network supports Dual RM-REGISTERED operations. The Dual RM-REGISTERED support indicates the network is able link multiple SIMs from the UE together and offer optimizations of multi-SIM operations. For example, the network may be able to re-assign a temporary UE identifier to change the associated paging occasion if a UE request for such a change. The support may also include forwarding paging request from one SIM to the paging occasion of another SIM and other multi-SIM enhancements as described in this disclosure.

Step S4112: The AMF returns a registration accept response to the UE and includes the updates to the multi-SIM policy that were made in step S4110.

Step S4114: The UE updates the multi-SIM configuration internally based on the updated multi-SIM policy received from step S4112. The UE may present the policy to the user via a GUI showing all the updates to the multi-SIM policy and prompt the user to acknowledge the updated policy.

Step S4116: If the user was prompted and acknowledged the multi-SIM policy, the UE may return a registration complete message to the AMF. If the UE detects that there may be a possibility of paging collision between multiple SIMs based on the paging occasions of each SIM, the UE may return an indication in the registration complete message to request the AMF assign a new temporary identifier that corresponds to a different paging occasion to avoid the paging collision. The UE may provide other multi-SIM assistance information as described hereinafter to assist the AMF with assigning the new temporary identifier.

Note that the inclusion of the multi-SIM policy may be provided during any of the registration procedures, whether it is initial registration, periodic registration update, partial registration, indirect registration, etc. For cases in which the UE cannot provide the entire multi-SIM policy to the network, components of the multi-SIM policy such as the multi-SIM assistance information may be provided separately to the core network. In addition, the multi-SIM assistance information may be signaled to the core network at any time the UE wants to request special handling of multi-SIM traffic. This may include adding the multi-SIM assistance information to a service request or a PDU session establishment or modification procedure. The multi-SIM assistance information may be provided during a SIM switch procedure to inform the core network on how to filter paging requests for the time that the UE is absence from the network.

For LTE, the multi-SIM assistance information may be realized as context information maintained internally in both the UE and the MME. Table 4 shows an example of adding service prioritization list and multi-SIM assistance information to the information storage of the UE stored internally as UE context. These information may be included in the attach procedure when the UE initially registers to the core network or they may be provided as needed in a service request to dynamically enable paging request filtering. Similarly, the MME may store the assistance information in the mobility management context for each multi-SIM UE. If necessary, some of the multi-SIM assistance information may be stored in the HSS as well.

TABLE 4

Multi-SIM Assistance Information added to UE Context for LTE

| Field | Description |
| --- | --- |
| IMSI | IMSI (International Mobile Subscriber Identity) is the subscriber's permanent identity. |
| EMM State | Mobility management state EMM-REGISTERED, EMM-DEREGISTERED. |
| GUTI | Globally Unique Temporary Identity. |
| ME Identity | Mobile Equipment Identity—(e.g. IMEI/IMEISV) Software Version Number. |
| Tracking Area List | Current Tracking area list. |
| last visited TAI | A TAI which is contained in the TA list the UE registered to the network and which identifies the tracking area last visited by the UE. |
| Selected NAS Algorithm | Selected NAS security algorithm. |
| Selected AS Algorithm | Selected AS security algorithms. |
| eKSI | Key Set Identifier for the main key $K_{ASME}$. Also indicates whether the UE is using security keys derived from UTRAN or E-UTRAN security association |
| $K_{ASME}$ | Main key for E-UTRAN key hierarchy based on CK, IK and Serving network identity. |
| NAS Keys and COUNT | $K_{NASint}$, $K_{NASenc}$, and NAS COUNT parameter. |
| Temporary Identity used in Next update (TIN) | This parameter is used internally by the UE to memorise which temporary ID it has to indicate in the Attach Request and RAU/TAU Request as specified in clause 4.3.5.6. |
| UE Specific DRX Parameters | Preferred E-UTRAN DRX cycle length |
| Active Time value for PSM | UE specific Active Time value allocated by MME for power saving mode handling. |
| Extended idle mode DRX parameters | Extended idle mode DRX parameters received from the MME. |
| Allowed CSG list | The Allowed CSG list, which is under both user and operator control, indicates the list of CSG IDs and the associated PLMN where the UE is a member. |
| Operator CSG list | The Operator CSG list, which is under exclusive Operator control, indicates the list of CSG IDs and the associated PLMN where the UE is a member. |

TABLE 4-continued

Multi-SIM Assistance Information added to UE Context for LTE

| Field | Description |
| --- | --- |
| Service Gap Time | Used to set the Service Gap timer for Service Gap Control (see clause 4.3.17.9). |
| Service Prioritization List | A list of service types and prioritization categories the UE uses to make determination on switching service to this PLMN. |
| Multi-SIM assistance information | Information provided by a UE that the network uses to assist in avoiding paging collisions. |
| *For each active PDN connection:* | |
| APN in Use | The APN currently used. This APN shall be composed of the APN Network Identifier and the default APN Operator Identifier, as specified in TS 23.003 [9], clause 9.1.2. |
| APN AMBR | The maximum aggregated uplink and downlink MBR to be shared across all Non-GBR bearers, which are established for this APN. |
| Assigned PDN Type | The PDN Type assigned by the network (IPv4, IPv6, IPv4v6, Non-IP or Ethernet). |
| IP Address(es) | IPv4 address and/or IPv6 prefix |
| Header Compression Configuration | ROHC configuration and context(s) for IP header compression for Control Plane CIoT EPS Optimisation. |
| Default Bearer | Identifies the default bearer within the PDN connection by its EPS Bearer Id. The default bearer is the one which is established first within the PDN connection. |
| WLAN offloadability | Indicates whether the traffic associated with this PDN Connection is allowed to be offloaded to WLAN using the WLAN/3GPP Radio Interworking feature or if it shall be kept on 3GPP access (see clause 4.3.23). The indication may contain separate values per RAT (E-UTRA and UTRA). |
| APN Rate Control | The APN-Rate-Control limits the maximum number of uplink packets and the maximum number of additional exception report packets per a specific time unit (e.g. minute, hour, day, week) for this APN. It includes an indication as to whether or not Exception reports may still be sent when the limit has been met. |
| Serving PLMN-Rate-Control | The Serving PLMN-Rate-Control limits the maximum number of NAS Data PDUs per deci hour sent uplink using the Control Plane CIoT EPS Optimisation for a PDN connection. |
| *For each EPS Bearer within the PDN connection* | |
| EPS Bearer ID | An EPS bearer identity uniquely identifies an EPS bearer for one UE accessing via E-UTRAN. |
| TI | Transaction Identifier |
| EPS bearer QoS | GBR and MBR for GBR bearer. |
| TFT | Traffic Flow Template. |

Multi-SIM UE Support for MNOs with No Coordination

While the solutions mentioned earlier in this disclosure address paging collisions incurred with two or more SIMs, the solutions do require some coordination between MNOs. In some deployments, the MNOs may not have any coordination with each other, e.g. there is no signaling between network functions of different MNOs such as between AMFs or MMEs of different MNOs. For these cases, other solutions are proposed hereinafter to address the issue of paging collisions faced by multi-SIM UEs. Note though that certain aspects of described solutions mentioned earlier may be applicable to the no MNO coordination case considered hereinafter. For example, the solution of the core network assigning temporary identifiers to multiple SIMs in the UE whose paging occasions are aligned still applies. This will be elaborated when re-introducing the multi-SIM indicator presented below. Solutions described below are also applicable to the case where there is MNO coordination. As an example, the paging criteria described below may also be used in the registration procedure for the case where there is MNO coordination. The paging criteria may be used by the core network to determine whether to page a UE after receiving a forwarded paging request. Finally, it is expected that although the following solutions are described for 5GS, they may apply also to LTE systems with the relevant changes to the network entities, procedure names, etc.

Even though there is no coordination between MNOs, it is still advantageous for the network to be aware of multi-SIM UEs in order to avoid degrading network performance for when the UE is switching communications to another MNO after communicating with the current MNO. As previously described, network operations are based on timers and algorithms that rely on knowledge of the UE's state in order to operate efficiently. When the network is not aware of what the UE is doing, these timers and algorithms do not work as intended, which degrades network performance. Thus, it is equally important that a multi-SIM UE informs the network of its capability when registering to the network and also when it will be temporarily unavailable, e.g. when the UE decides to switch connection to another MNO. Temporarily unavailable in this context refers to the fact that the UE is planning to switch to another MNO and will not be able to monitor for paging occasions. Thus, the UE is temporarily unavailable until it switches back to the current MNO. The following solutions address the scenario where no MNO coordination exists and will focus on how the UE can assist in minimizing the occurrence of paging collisions. Note that certain aspects of the solutions may apply to the single MNO case where both SIMs belong to the same MNO and other aspects may apply to the dual Rx, single Tx capable UEs.

UE Registration and Multi-SIM Assistance Information

The UE registration procedure to the core network configures certain parameters between the UE and the CN so the UE can receive services that require registration. There are several variants of the registration procedure, from initial registration, to mobility registration update, to periodic registration update, and to emergency registration. These procedures provide information to the CN to configure parameters both the UE and the CN use to communicate with each other. For example, the DRX parameters help define the discontinuous reception cycle in which the UE is on for a certain duration to monitor for paging requests and off for some other duration to help preserve battery power.

Certain additional parameters are proposed to add to the registration procedures such that the UE may provide information to the core network to assist in avoiding paging collisions. These new parameters are summarized in the list below and may be grouped together and referred to as multi-SIM assistance information. The multi-SIM assistance information may be provided to the core network during a registration procedure to enable the core network to better handle multi-SIM traffic by adjusting the paging strategy to minimize wasting network and paging resources especially for the times the UE is in a suspended registration state.

- Paging Criteria: Criteria that specifies certain conditions the network use to page the UE when the conditions or events are met for paging. The UE may derive the paging criteria based on the user configuration found in the service prioritization list and the paging criteria may consist of a list of service type categories and priority levels. The UE provides this parameter to the network of the criteria to use when trying to page the UE. This criteria may be provided by the UE to trigger the CN to filter sending certain pages for the times the UE may not be actively monitoring for POs due to being connected to another MNO to serve another SIM. For example, the service category described above may be used for the paging criteria the UE configures the network to filter which paging request to send. If additional information is provided, such as user phone numbers, PDU session IDs, and application IDs, the filter may be more granular. Examples may include, for example, a phone call with associated phone number, a text message associated with a user, or other data (e.g. internet data) traffic associated with a PDU session ID or application ID. Alternatively, the extra information may provide various priority levels for each service type. The criteria may be a white list that includes different combinations of service categories, e.g. calls from family, texts from family and best friend, and other data (e.g. internet data) from a certain PDU session ID. Based on these criteria, the core network would only page the UE when downlink data meets one or more of these criteria, thereby saving paging resources for data that does not interest the user. In addition, the paging criteria may include criteria such as time duration, location information, and UE state for when paging request filtering is applicable.
- Limit Paging Area: The UE may request to limit the paging area the CN sends paging messages to for the case the UE is connected to another MNO and is not able to respond to a page. The parameter may be specified such that the network only pages the UE within the last tracking area or registration area the UE was in. The parameter may even specify the number of times the network tries to page the UE before stopping the pages. This may help reduce wasting paging resources in cells of the network that are outside the current tracking or registration area of the UE. The CN may ascertain the tracking and registration area of the UE upon the receipt of a mobile registration update that includes this indication, which the UE may provide to indicate it may be switching connection to another MNO.
- Paging Occasion Separation: The UE may provide this parameter to configure the desired PO separation for the times the UE requests a new temporary identifier (and associated PO) based upon the detection of potential paging collisions. The UE may provide this parameter to request the network provide a new temporary identifier in which the associated PO is a certain distance in time, e.g. spacing based on number of paging frames, slots, etc., from the currently assigned PO or the parameter may represent descriptive enumerations such as "far apart," "close together," or "different" to give the network flexibility in assigning the temporary identifiers. A request for a "different" paging occasion may be an indication that the UE desires a paging occasion that occur with the same periodicity, but at a different time. Thus, it may be an indication that a different offset is desired.
- Number Missed Pages before Notification: The value determines a threshold of the number of times the CN detects a UE missed receiving a page before notifying the UE. The UE may configure this value during initial registration when the UE also notifies the CN that it is a multi-SIM device. Alternatively, the value may be an operator configuration, either through an operator policy or through a command received from the operator's operations and management application.
- Multi-SIM indicator: The UE may also provide a multi-SIM indicator similar to that described above but in this case, the resulting functionality may be different. In this scenario, the multi-SIM indicator may cause the CN to configure one or more of the above parameters and provision the UE with a new temporary identifier meeting those criteria. In cases where both SIMs belong to the same MNO, the registration request may also include an identifier for the other SIM, e.g. IMSI or 5G-GUTI, to inform the core network that the UE supports multiple SIMs and possibly provide certain network optimizations relating the registrations of the multiple SIMs. With the multi-SIM indicator and the identifier of the other SIM, the core network may be able to assign a temporary identifier for the current SIM whose paging occasion aligns with the paging occasion of the other SIM as described above. Thus, the paging occasions for both SIMs in the UE are aligned and the UE would only need to monitor for one paging occasion.
- Proposed temporary identifier: A UE may propose a temporary identifier using this parameter that it determines will avoid a paging collision with the PO of another SIM. Again, the UE may be able to propose a temporary identifier whose paging occasion aligns with the paging occasion of another SIM in the UE. Alternatively, the UE may propose part of a temporary identifier (e.g. the part that is used to calculate the paging occasion) and the network may assign the rest of the temporary identifier.

Figure 34:
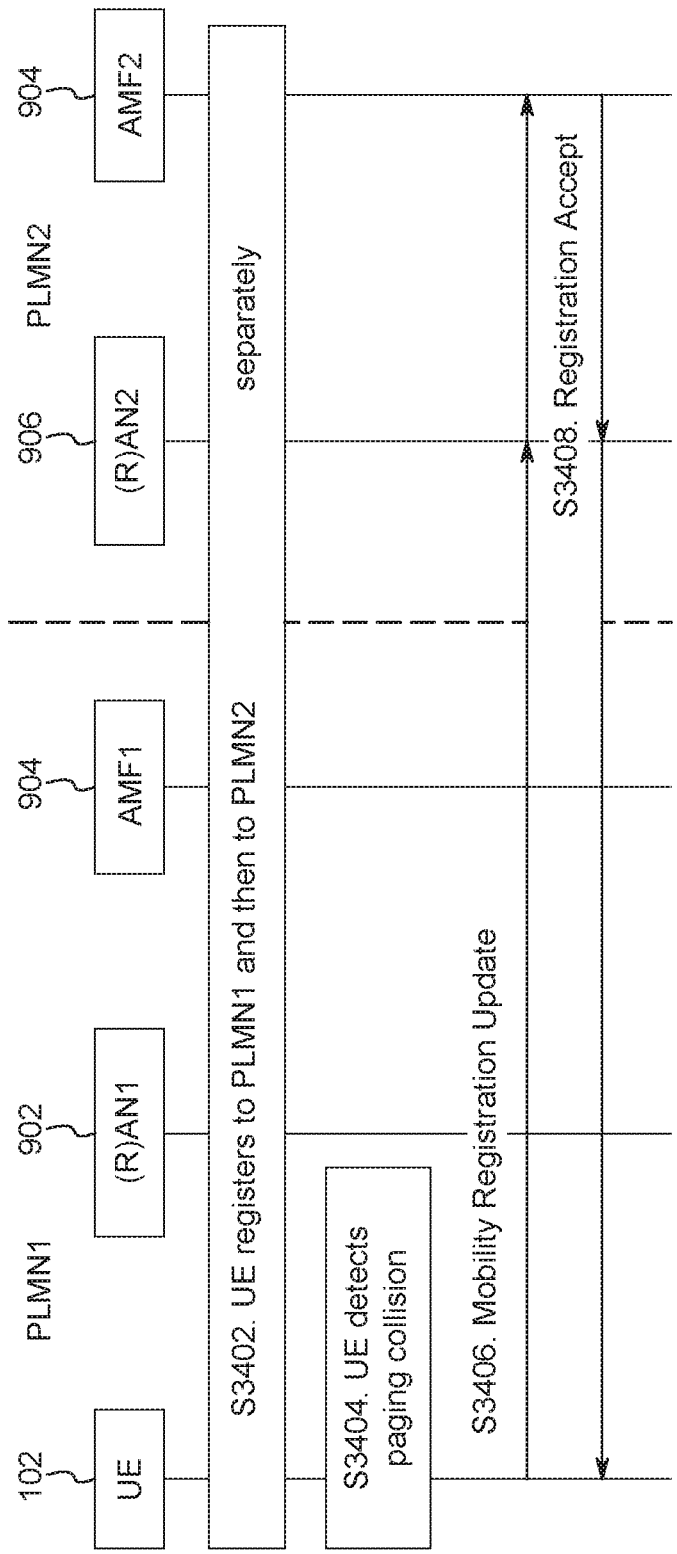
FIG. 34 shows a UE requesting the provisioning of a temporary identifier from the core network in accordance with an exemplary embodiment.

The UE may provide these parameters at initial registration to initialize parameters that the CN use when generating certain settings. Similarly, the UE may also include these parameters within e.g. a mobility registration update or a periodic registration update procedure, after the UE has determined a potential paging collision exists between the POs of the two SIMs and is requesting a new temporary identifier (and associate PO) from the CN. Although the descriptions have indicated that the UE provides the proposed parameters to the CN, it is understood that the parameters may also be configured by the CN, e.g. as part operator policy. FIG. 34 shows a UE requesting from the CN a new temporary identifier and the associate PO using the mobility registration update procedure. Note that the terms PLMN1 and PLMN2 are used to represent MNOs with no coordination to be consistent with other diagrams in this disclosure.

Step S3402: A multi-SIM UE first registers to PLMN1 and receives a temporary identifier for SIM1. The UE then registers to PLMN2 possibly after disconnecting from PLMN1. The UE receives a temporary identifier for SIM2.

Figure 35:
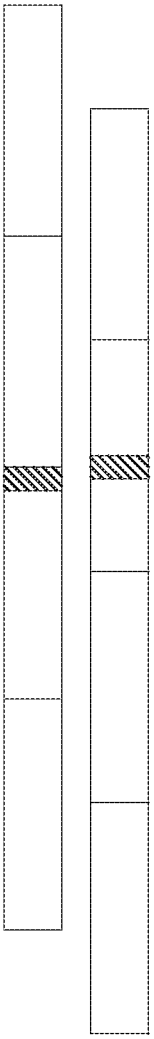
FIG. 35 shows a multi-SIM UE detecting paging collisions in accordance with an exemplary embodiment.

Step S3404: The UE uses the temporary identifiers to compute the paging occasions associated with each SIM. Based on the timing information the UE has for each PLMN, the UE detects that a paging collision may exist as shown in FIG. 35. Although the timing relationship between the PLMNs is asynchronous, the UE may be able to detect paging collisions by superimposing the two timing references together to obtain a single timing reference. FIG. 35 shows the paging frames associated with each PLMN and their paging occasions overlap even though their superframe timings are not aligned. Note that the POs may not necessarily need to overlap to cause a paging collision. If the PO is sufficiently close to each other, that may also cause a paging collision as the UE does not have enough time to switch connections from one PLMN to another PLMN. Each time the UE has to perform this operation, there are certain latencies associated with the procedure, e.g. the UE has to tune the radios to the appropriate frequencies, perform cell search, PLMN selection, etc.

Step S3406: Once the UE detects that there is a possibility of paging collisions, the UE may then request one of the PLMNs for another temporary identifier which would generate a paging occasion different than the current one. The UE may send a mobility registration update and include the proposed parameters listed above, such as the PO separation. The UE may also configure the PLMN to only page the UE for certain data such as voice calls and SMS messages by using the paging criteria parameter. Additionally, the UE may configure the CN to limit the paging area to the last tracking area or registration area the UE was in contact with the CN to minimize wasting paging resources in other tracking or registration areas. The UE may also only include a multi-SIM indicator to let the CN provide a new temporary identifier which corresponds to another PO or even propose a new temporary identifier whose PO location is different than the current PO. The UE may have discovered the CN supports the multi-SIM feature as it was pre-provisioned with the information, received the information in a previous registration accept message such as information provided in a multi-SIM policy, or by reading system information.

Step S3408: The AMF returns a registration accept message that may include a new temporary identifier. The new temporary identifier may correspond to another PO that is in a different location than the previous PO. The UE in turn checks the timing of the new PO with the PO of another SIM to ensure there is no possibility of a paging collision. If the UE still detects a paging collision, the UE may repeat step S3406 to obtain another temporary identifier. This time, the UE may use different values of the parameters sent previously to try to obtain a temporary identifier with a different PO that doesn't cause paging collisions. Alternatively, the UE may propose a temporary identifier that it has determine will avoid paging collisions with the PO of the other PLMN.

The Paging Criteria may be provided by the UE upon one of the registration procedures to configure the CN to filter when to page the UE when the UE has activated the registration suspend timer, which is subsequently described in more details. This criteria may be sent during initial registration to statically configure the CN or during a mobility or periodic registration update procedure to dynamically configure the CN of the UE's preference in the CN filtering paging requests. Alternatively, the criteria may be provided in a service request when the UE wants to inform the network it is busy and to stop paging the UE for a certain duration. The criteria may be, for example, a white or black listing of service categories/prioritization that the UE wants the CN to filter when deciding to page the UE. The criteria may also include, for example, more granular information included in paging messages such as phone numbers, PDU session IDs, and application IDs.

The Paging Criteria may be used in UEs with dual Rx, single Tx capability to allow the CN to page the UE for important data the user may want to be paged for. This may reduce the overhead placed on the UE to respond to pages the UE may not be interested in. For example, in the business/personal subscription use case, users may want to only receive calls from their boss and fellow team members during the weekend and not receive calls from anyone else. The Paging Criteria may be set prior to the start of the weekend to only allow calls from those people only. Conversely, the user may want to preempt receiving pages and set the Paging Criteria to not page the UE for all traffic.

Request for Multiple Paging Occasions

Since the timing relationship between cells of different MNOs is asynchronous and may change from cell to cell, having a single PO may cause paging collision on one cell but not on another cell. For these cases, it may be better for the UE to be provisioned with multiple POs and allow the UE to listen on a PO that does not collide with the PO of another SIM. In this case, the UE may decide dynamically which of the multiple POs to listen to for paging requests based on its internal timing for each MNO. This option may be used in cases where the single PO case still results in paging collisions.

To request for multiple paging occasions, a UE may include a multi-PO indication in one of the registration requests such as the mobility registration update or the periodic registration update procedure. The indication may specify the number of desired temporary identifiers to be assigned to the UE or just simply a flag that the UE requests for multiple temporary identifiers and let the core network provision however many temporary identifiers to the UE. The UE may combine any of the other parameters described herein to assist the core network in assigning temporary identifiers that corresponds to the desired PO characteristics. For example, the Paging Occasion Separation parameter may be used to indicate the desired separation between the multiple POs.

Once the UE receives the temporary identifiers associated with the POs, the UE will decide which PO to monitor based on the PO it has for the other SIM. Therefore, as the UE moves from cell to cell and if the PO for either SIM shifts, the UE is able to dynamically decide which of the multiple POs to monitor to avoid paging collisions. Once the UE has responded to the page, the network may stop paging the UE on the other POs that was assigned to the UE. The UE may request multiple temporary identifiers from each MNO to give maximum flexibility to avoid paging collisions. For example, the UE may request two temporary identifiers each from MNO1 and MNO2 and request the desired PO separation that regardless of mobility, the UE will be able to avoid paging collisions among the four assigned POs.

The Limit Paging Area parameter may be used in conjunction with the request for multiple paging occasions to offset the paging resource overhead introduced by having multiple paging occasions. As previously described, the Limit Paging Area parameter may specify that the CN limit the area it pages the UE to the last known tracking or registration area of the UE. This parameter may be used to limit the paging escalation that may occur in which the CN broadens the area that it pages the UE if the UE does not respond to the pages. Since the UE is already requesting for multiple POs, adding the Limit Paging Area parameter may localized the paging overhead to a tracking or registration area the UE last communicated with the CN and thereby saving paging resources in other tracking and registration areas.

Simultaneous Pages on the Same Paging Occasion

For the case in which the SIMs belong to the same MNO and the CN has assigned temporary identifiers for the SIMs to correspond to the same PO, there may be cases where data is available simultaneously for both SIMs and the CN then pages the UE. During these cases, the paging record of the paging message will contain UE identifiers that matches those of the temporary identifiers for each of the SIMs. The issue arises for the UE of which SIM to complete processing the paging request for.

The issue can easily be addressed by enabling a UE in the response to the paging request to include in the service request that is sent to the CN a list of PDU session IDs that corresponds to both SIMs. To do this, it is proposed that a new parameter that contains an identifier for the other SIM as well as another List Of PDU Sessions To Be Activated parameter be included in the service request. The new parameter may be added to the existing parameter list for the service request procedure as to not interfere with existing operations. Therefore, the service request will provide information about one SIM using the existing parameters and information about a second SIM with the new parameter. The inclusion of multiple instances of this new parameter may be used to extend the support to multiple SIMs, where multiple refers to three or more SIMs. The benefit of adding the new parameter to the service request procedure is the saving of paging resources where the service request informs the CN to stop paging the UE for data associated with two or more SIMs.

For a more integrated solution, the temporary identifier and the list of PDU sessions to be activated may be combined together and a list of the combinations may be specified in the service request procedure. In this case, the new parameter may be thought of as a list of key-value pairs; the key part containing the temporary identifier associated with a SIM and the value part containing the list of PDU sessions to be activated. This solution is more scalable as the list can be expanded to include as many SIMs as the UE supports without changing the structure of the message format.

Registration Suspend Timer

The operations of a multi-SIM UE may be programmed such that the UE periodically switch connections between PLMNs in order to serve each SIM installed in the UE. Using this operational mode as an example, it is proposed that the core network support a mechanism in which the UE can request a suspension of the registration timer the CN maintains for the UE's registration state. Instead of introducing a new registration state as described above, a new registration suspend timer may be introduced. The operation of the registration suspend timer may be mutually exclusive with that of the current registration timer. For example, when a UE requests to activate the registration suspend timer, the registration timer maintained by the CN is paused. This may occur when the UE performs a mobility registration update or a periodic registration update and includes a registration suspend indicator to activate the suspend timer. An alternative is the timer may have dual operational modes with an indicator to show which mode is in current operation.

Figure 36:
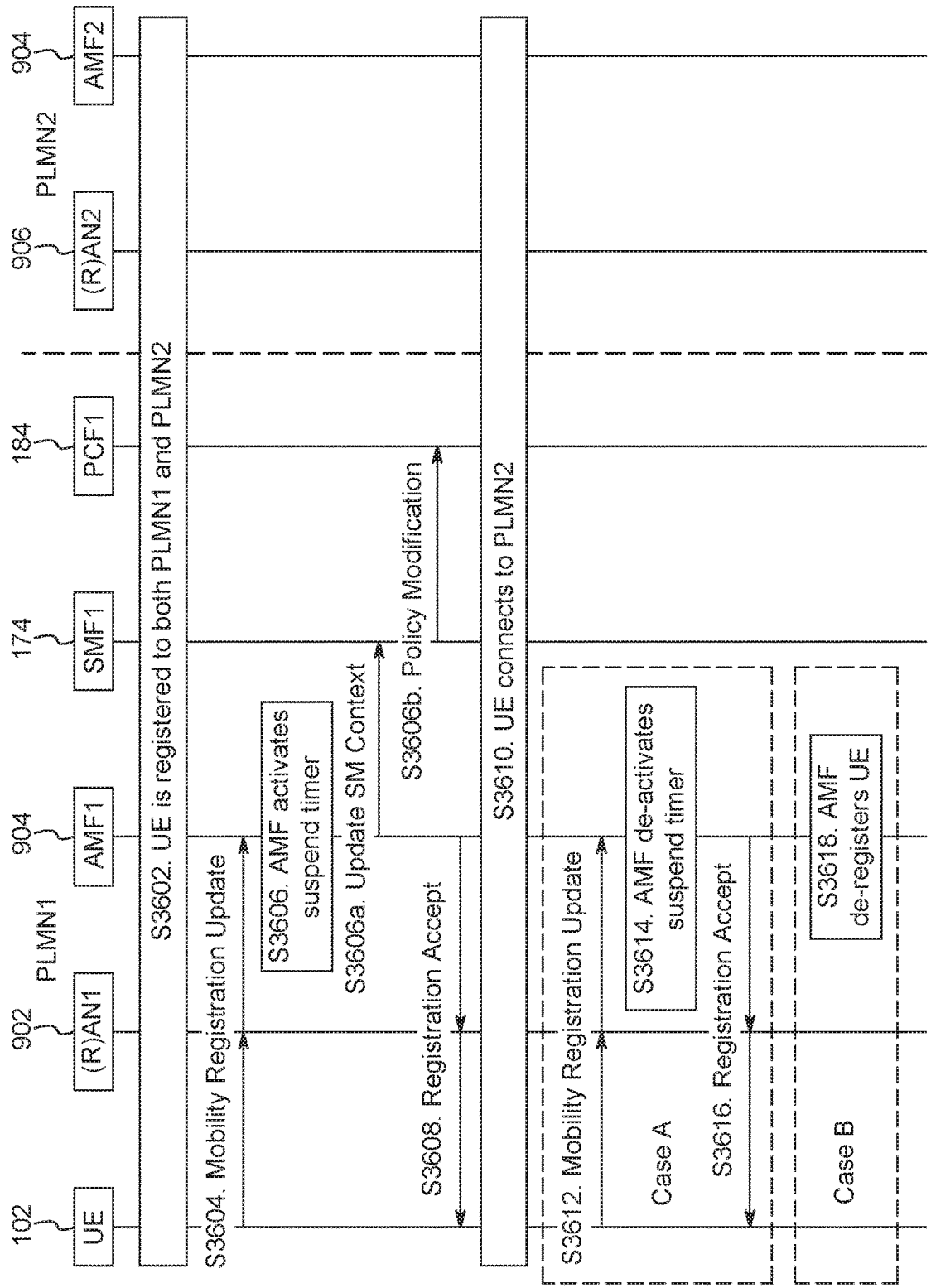
FIG. 36 shows a procedure to activate and deactivate the registration suspend timer in accordance with an exemplary embodiment.

The UE may provide a value to use for the registration suspend timer to reflect the periodic duration the UE is expected to connect to another PLMN. This value may be included in the mobility registration update or the periodic registration update to have the CN suspend the registration timer. Upon receiving this value, the CN may pause the registration timer and activate the registration suspend timer. Then after some time, the UE may return and deactivate the registration suspend timer and reenable the registration timer. FIG. 36 shows an example of this procedure of activating and deactivating the registration suspend timer.

Step S3602: A multi-SIM UE is registered to both PLMN1 and PLMN2. At the present time, the UE is actively communicating with PLMN1.

Step S3604: The operational programming logic of the UE decides to switch connections from PLMN1 to PLMN2. The UE sends either a mobility registration update or periodic registration update request to the AMF in PLMN1. This request includes an indication to activate the registration suspend timer or it may include the expiration time of the registration suspend timer. The value of the expiration time may be configured within the operational parameters of the UE, a policy maintained by the UE or configured by the core network, or some other operational metric programmed by the user through a GUI. The UE may also provide an indication to request the CN to queue any downlink data for the UE while the registration suspend timer is running.

Step S3606: Upon receiving the request, the AMF in PLMN1 may pause the registration timer and activate the registration suspend timer. The AMF may use the value provided by the UE to configure the expiration time of the registration suspend timer if one was provided. Alternatively, the AMF may use a value that has been configured by the operator of the core network. The AMF still maintains all existing contexts for the UE, including maintaining the UE's registration state, security contexts, and existing PDU sessions. However, with the activation of the registration suspend timer, the CN will not page the UE for downlink data until the UE has deactivate the registration suspend timer. If the UE had requested the CN queue up downlink data while the registration suspend timer is running and the CN is able to do so, the CN may enable such functionality by having the AMF provide this indication to an SMF to update any existing PDU sessions for the UE in step S3606a. The SMF then notifies the UPF(s) to buffer any downlink data destined for the UE, which is not shown in the figure. If a Policy Control Request Trigger is met, the SMF notifies the PCF of the conditions that have been met as shown in step S3606b. The condition may be that an AF has subscribed to be notified whenever a UE's registration state is suspended. This notification may cause the AF to not send the UE any data until the suspension is deactivated.

Step S3608: The AMF returns a registration accept message to the UE indicating the status of the request. If the request was granted and if the AMF had changed the registration suspend timer expiration value, the AMF includes the new value in the accept response. The AMF may also provide an indication of whether the UE's request was granted for the CN to queue up downlink data when the registration suspend timer is running. The UE starts a timer incorporating the value returned by the AMF or the value provided initially to track the remaining time the UE has before the CN will initiate de-registration procedure. In other words, the UE needs to deactivate the registration suspend timer maintained in the CN before the UE maintained timer expires so the UE's registration state remains in RM-REGISTERED. When the registration suspend timer is active, the UE's registration state is RM-REGISTERED and its connection state is CM-IDLE. However, the CN will not page the UE during this time.

Step S3610: The UE disconnects from PLMN1 and connects to PLMN2. Upon connecting to PLMN2, the UE may perform either a mobility registration update or a periodic registration update to de-activate the registration suspend timer maintained by the AMF in PLMN2. In the request, the UE may include an indication to deactivate the registration suspend timer or to set the expiration value to zero. The AMF in PLMN2 will then disable the registration suspend timer and reenable the registration timer. The expiration time for the registration timer may be reset at this time rather than continue from the previous value when it was paused. If the UE had requested the CN queue up downlink data previously, then the UE would receive those data upon the execution of a service request. The UE may maintain the connection with PLMN2 for as long as the user requires in order to use the services associated with SIM2. If the UE is in CM-IDLE state at the expiration of the operational timer, the UE may decide to disconnect from PLMN2 and reconnect to PLMN1.

Step S3612: For the case the UE decides to reconnect to PLMN1, the UE sends either a mobility registration update or a periodic registration update request to PLMN1 to deactivate the registration suspend timer and to reenable the registration timer. The UE may provide an indication or a zero value for the registration suspend timer expiration to trigger the deactivation of the registration suspend timer.

Step S3614: The AMF in PLMN1 deactivates the registration suspend timer and reenables the registration timer. The expiration time for the registration timer may be reset at this time rather than continue from the previous value when it was paused in step S3606.

Step S3616: Similar to step S3608, the AMF in PLMN1 returns a registration accept response with the status of the update request. The UE may start to receive queued downlink data if the request in step S3612 was a service request. If not, the UE may execute a service request to receive the queued downlink data after this step.

Step S3618: There may be cases where the UE is busy processing data associated with PDU sessions or is in the middle of a call that the UE remains connected to PLMN2. During these cases, the UE may remain at step S3610 for a time greater than the expiration time of the registration suspend timer and the deregistration timer. In these cases, the AMF in PLMN1 may deregister the UE for SIM1.

As part of the procedure to suspend the registration timer, the CN may also suspend paging the UE and buffer mobile terminated data for the UE. During this suspended period, the CN is aware the UE is not actively listening for paging requests and as a result, the AMF may queue up the paging requests and instruct the SMF to direct UPFs to buffer mobile terminated data for the UE as shown in step S3606a of FIG. 36. All established security contexts for NAS signaling and PDU sessions in the user plane are preserved as if the UE is in CM-IDLE state. In fact, during the suspension, the CN and the UE maintains RM-REGISTERED and CM-IDLE states for the UE. This suspend state is similar to the RRC_INACTIVE state but applied to a UE's registration and connection management states. Thus, the UE and CN can quickly reestablish communications after the UE switches back to using the SIM associated with the registration. This behavior may be triggered by the inclusion of the Paging Criteria parameter, described above, when the UE requests the activation of the registration suspend timer.

UE Request to Stop Paging

In certain cases, the UE may be busy using the services of one SIM and then receive a page for another SIM. The paging message may indicate what type of service caused the page. Rather than letting the network of the second SIM keep paging the UE, the UE may respond to the page with a service request message to inform the network that the UE is busy and to stop paging the UE. The Service Request Message may include, for example, an indication of what services the UE is currently performing on the other system (e.g. Emergency Services), what services it is willing to respond to on this current system, what services it is not willing to respond to on the current system, and a timer value indicating to the network when the network may attempt to page the UE again for the same type of service. Similarly, when the UE receives a NAS Notification that includes an indication that the UE should respond to a page and a paging cause, the UE may respond with a NAS Notification Response that includes an indication of what services the UE is currently performing on the other system (e.g. Emergency Services), what services it is willing to respond to on this current system, what services it is not willing to respond to on the current system, and a timer value indicating to the network when the network may attempt to page, or send a NAS notification to, the UE again for the same type of service. By the UE informing the network, paging resources may be saved and the network may be able to signal to the data source that the UE is busy, e.g. a voice call goes directly to voicemail instead trying to ring the UE. In IoT use cases, the information provided to the CN may be used to update the reachability status of the UE on an application server that is trying to reach the UE.

Figure 37:
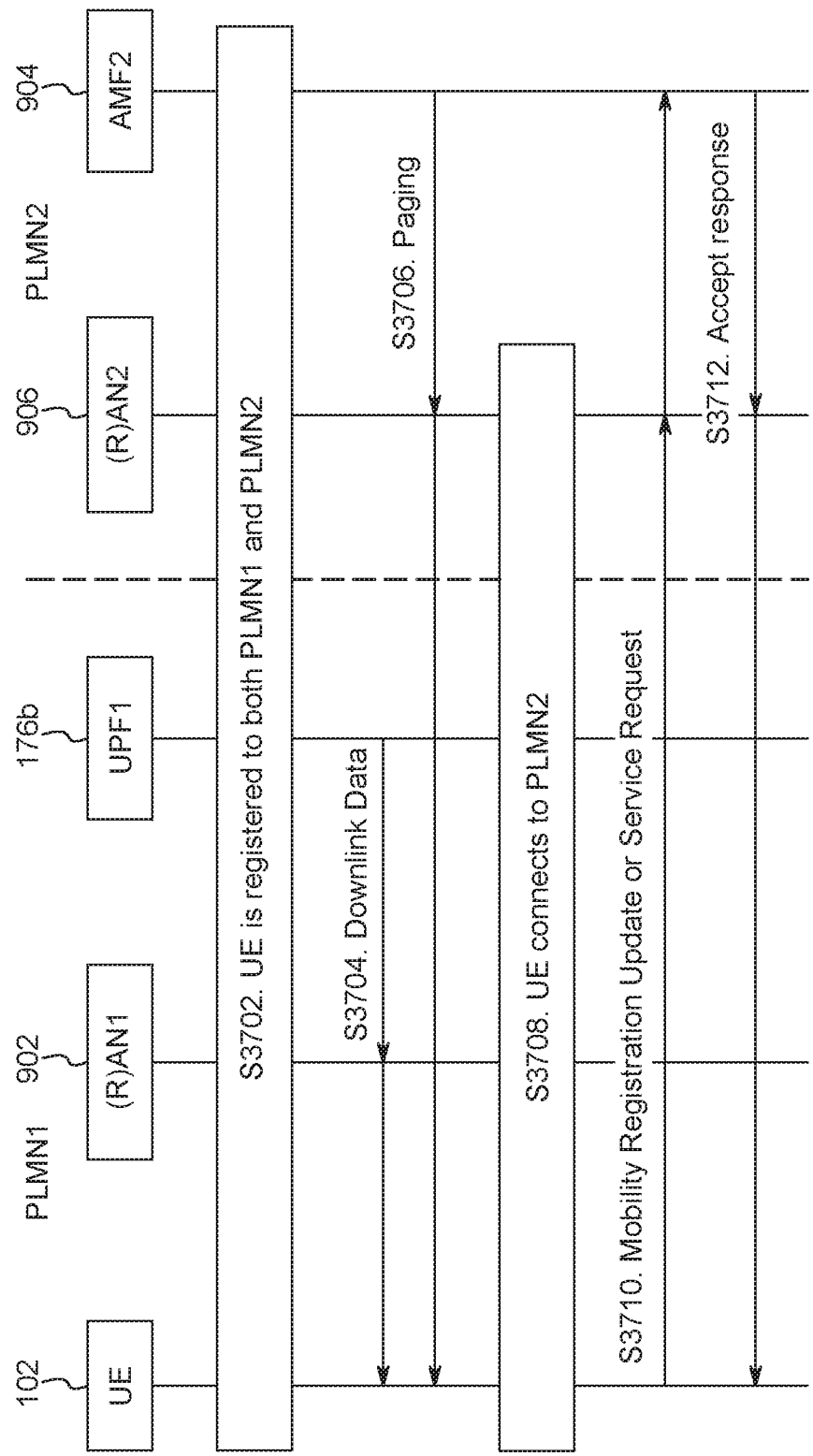
FIG. 37 shows a UE performing a request to stop the core network from paging the UE in accordance with an exemplary embodiment.

This feature may be useful in cases where the UE has dual Rx and single Tx capabilities. The UE may be in the middle of a call on SIM1 and receive a page for SIM2 as shown in FIG. 37. The UE can send a request to the network of SIM2 to inform the network to stop paging the UE. The UE in this case may be actively receiving downlink data on one of the receivers and there may be gaps in uplink transmissions in which the UE can send the request message to the network of SIM2. The feature may also be useful for cases where a UE has single Rx and single Tx capabilities and time multiplexes between the two SIMs on the same PLMN or between the PLMNs of the two SIMs. Note that the UE may communicate with the same or different MNO and the procedure will be the same.

Step S3702: A multi-SIM UE is registered to both PLMN1 and PLMN2. The UE may have dual Rx, single Tx capability or single Rx, single Tx capability and time multiplexes between the PLMN of each SIM. In this case, the UE has dual Rx and single Tx capability.

Step S3704: The UE is currently receiving downlink data on Rx1 and monitoring for paging on Rx2.

Step S3706: PLMN2 receives data for SIM2 and pages the UE. The page may include service prioritization information that indicates what the page is for.

Step S3708: The UE makes a determination to notify PLMN2 that the UE is busy receiving data from PLMN1. The UE may check the service type found in the paging message with the user configured service prioritization list to make this determination. For example, the UE may be in the midst of an important voice call and the service type in the paging message indicates an incoming text message. The user may have configured the service prioritization list to indicate text messages are lower priority. Alternatively, the UE may have presented to the user in a GUI showing an incoming text message is pending for SIM2 and the user has selected to temporarily ignore the text message. As the UE is receiving data on Rx1, there may be gaps in time where the UE is not transmitting any UL data on the single Tx. During these gaps, the UE may connect to PLMN2 so it can perform a request to inform the AMF in PLMN2 to stop paging the UE.

Step S3710: Upon a successful connection to PLMN2, the UE may send a mobility registration update request to the AMF in PLMN2. This request may include an indication to activate the registration suspend timer or it may include the expiration time of the registration suspend timer to indicate the UE would like the AMF to temporarily suspend paging the UE for a specified time period. Alternatively, the indication may be provided in a service request message with a time the CN should stop paging the UE and with updated multi-SIM assistance information. The UE may also provide an indication to have the CN queue any downlink data for the UE while the registration suspend timer is active. Then after the UE reestablish communications with the CN, the UE will be able to retrieve the queued downlink data.

Step S3712: The AMF in PLMN2 returns the status of the request in the accept response. As part of the response, the CN may provide a new value for the expiration time of the registration suspend timer as well as whether the CN may queue any downlink data while the registration suspend timer is running. The response may include a status for the request and the time the CN will stop paging the UE.

The above procedure shows the UE registering to two PLMNs (or MNOs) but it may also be applied to the scenario where the SIMs in a UE all belong to the same MNO. The procedure would operate in a similar manner with the exception that instead of sending the mobility registration update request or service request to another PLMN, the UE will just send the request to the single PLMN.

When the UE sends the request to the PLMN to stop paging the UE, the UE may include multi-SIM assistance information in the request to inform the PLMN how long to stop paging the UE for, what service types to page the UE, what service types to not page the UE, and whether to buffer data for the UE. These information may be grouped together as additional information the UE provides to the PLMN to enable the PLMN to filter pages for the UE when the UE is busy. The multi-SIM assistance information may be organized as a policy the UE provides to the PLMN or a set of indications sent to the PLMN in the service request or during a registration update request.

Core Network Provides Notifications of Missed Pages to UE

Figure 38:
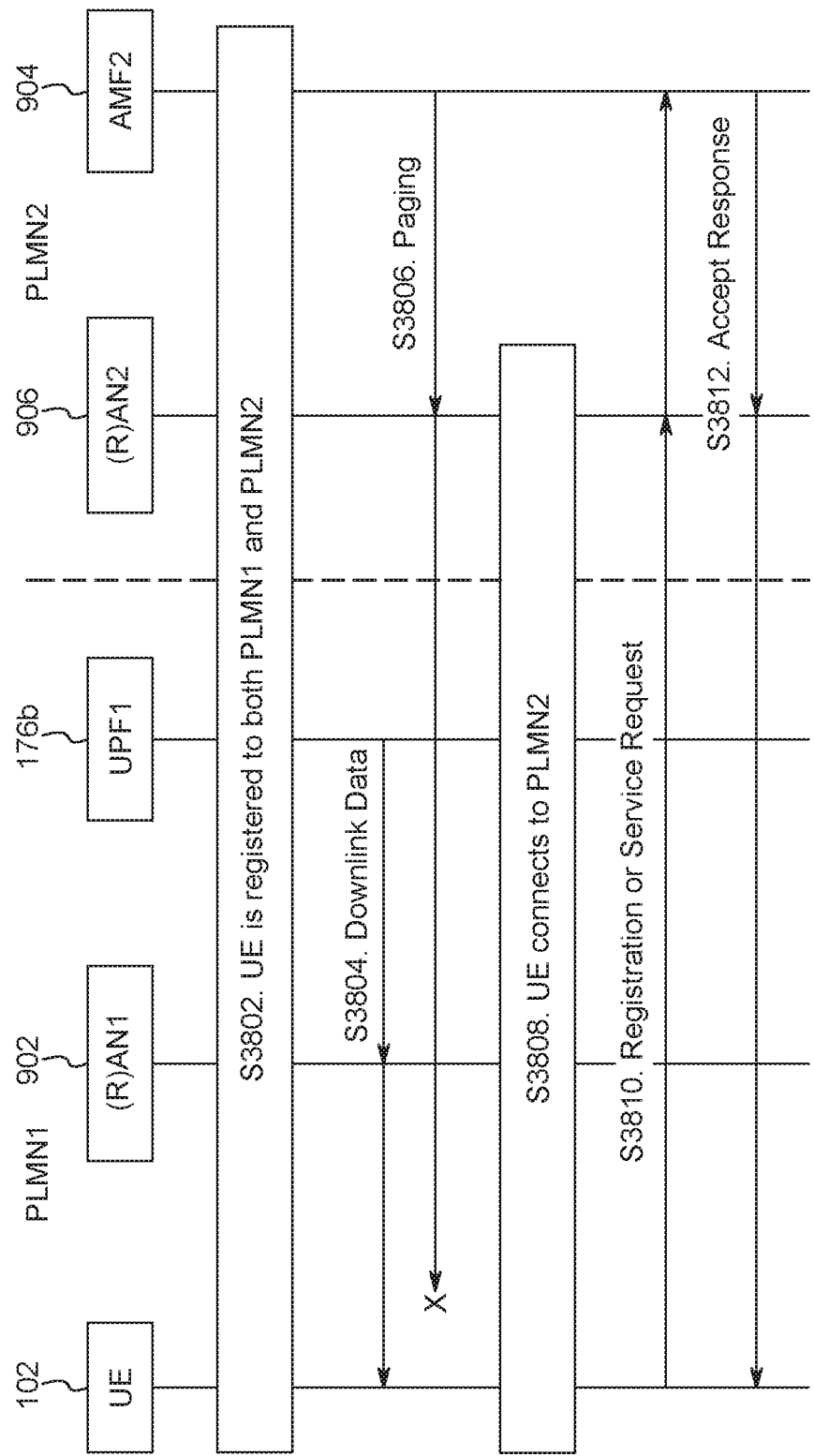
FIG. 38 shows the core network providing a notification to the UE showing missed pages in accordance with an exemplary embodiment.

Whenever the core network has paged the UE and the UE does not respond, the core network may keep track of the times the UE misses a page and notify the UE the next time the UE connects to the CN or through another access, e.g. non-3GPP access. This function may be enabled if the UE has informed the CN that it is a multi-SIM UE during one of the registration procedures or if the UE has enabled one of the parameters described herein related to multi-SIM operations, such as the multi-SIM assistance information. The CN may notify the UE in the response to either a registration request or a service request procedure. The CN may also provide the time and the registration and/or tracking area where the page was sent to when the UE did not respond to the page. As an alternative, if the UE supports connection to multiple access technologies, e.g. over 3GPP access and over non-3GPP access, the CN may send the notification to the UE over the access where the UE may be in CM-CONNECTED state. This information may allow the UE to identify paging collisions and/or issues with the paging process and allow the UE to utilize one of the aforementioned solutions to help rectify the issue. Note that the below procedure may apply to cases where the SIMs belong to the same MNO and for cases where the UEs have dual Rx, single Tx or single Rx, single Tx capabilities. See FIG. 38.

Step S3802: A multi-SIM UE is registered to both PLMN1 and PLMN2. In the case where the two SIMs belong to the same MNO, the UE would register both SIMs to the same PLMN.

Step S3804: The UE is currently receiving downlink data from PLMN1.

Step S3806: PLMN2 receives data for SIM2 and pages the UE. However, the UE does not receive the page or does not respond to the page due to receiving data from PLMN1, e.g. the user is on an important voice call and doesn't want to be interrupted. The user may have received a prompt from the UE via a GUI but has decided to ignore the prompt. Note that the UE may operate with either single Rx, single Tx or dual Rx, single Tx capabilities.

Step S3808: After some time, the UE connects to PLMN2.

Step S3810: The UE may perform either one of the registration procedures or a service request procedure to begin receiving services from PLMN2.

Step S3812: In the accept response, the AMF in PLMN2 may provide information to the UE of any missed page it has saved. The information may include the time of the missed page, tracking area and/or registration area the page was sent to, and possibly additional information about the page such as, for example, the service category and other more granular information such as, for example, the phone number of the callers or text message sender, PDU session ID, and/or application ID, etc. Alternatively, and when a UE is capable of connecting to multiple access networks such as over 3GPP and non-3GPP accesses, the CN may send a notification to the UE over the access network that the UE may be in CM-CONNECTED state. Upon receiving this information, the UE may determine that paging collision(s) had occurred and identify steps the UE can take to avoid such collisions in the future. The UE may then execute one of the above described procedures to request new temporary identifiers whose POs are separated from the current POs.

Another aspect of this solution is that the CN may wait for a configured number of missed pages before notifying the UE of the missed pages. The number of missed pages may be configured by an operator policy, through a command from an operator's operations and management system, or even provided by the UE as multi-SIM assistance information. The UE may provide in the multi-SIM assistance information a threshold of the number of missed pages the CN use to send the UE information about missed pages during one of the registration procedures when it indicates to the CN that the UE is a multi-SIM device. The CN will then begin to track the number of times the UE does not respond to a page and when the threshold is reached, the CN will then notify the UE. In the notification, the CN may provide a list of all the times the UE missed receiving pages, including a timestamp, the tracking or registration areas each page was sent from, and the number of times the CN tried to page the UE. The CN may also include additional information of what the page was for, such as the service categories and prioritization levels such as phone numbers, PDU session IDs, application ID, etc.

Graphical User Interfaces

FIG. 17 shows an example Graphical User Interface (GUI) a UE may display to show the multi-SIM configurations of the UE. The GUI may display a list of multi-SIM policies that shows all the PLMNs the UE is registered to and provide a mechanism for a user to configure the priority associated with each registration. For each displayed SIM entry, an active status is shown with a switch button to allow a user to manually initiate the SIM Switch procedure by pressing the button of the associated SIM entry. The GUI may also allow the user access to information found in Table 2 for the corresponding PLMN by long pressing the associated entry. FIG. 18 shows an example GUI of the information for an individual SIM configuration associated with a PLMN registration. The user may further configure certain parameters for a particular PLMN through this GUI.

Figure 33:
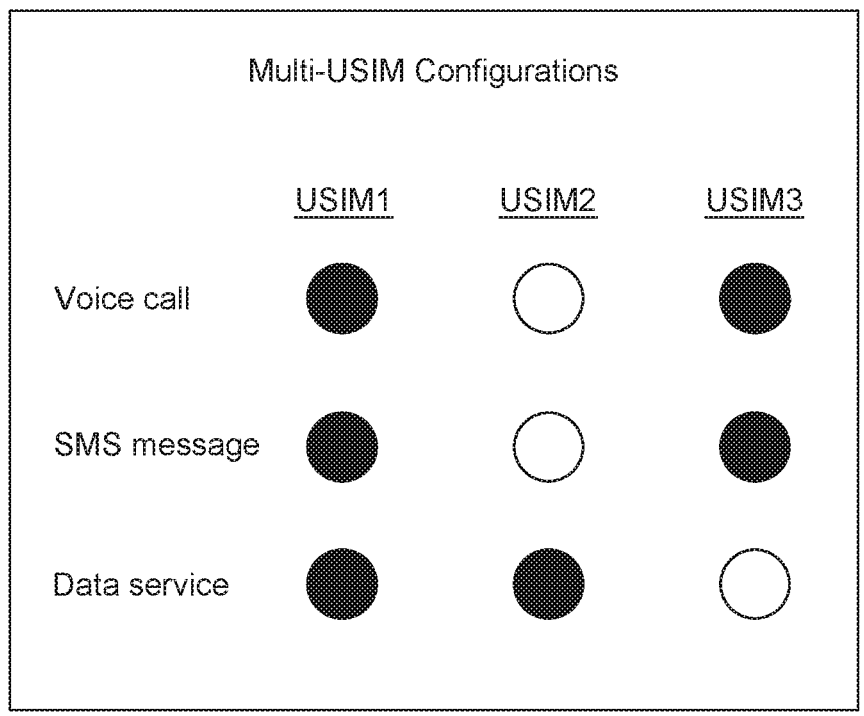
FIG. 33 shows another multi-SIM configuration GUI in accordance with an exemplary embodiment.

FIG. 33 shows another example GUI for a multi-SIM UE in which the UE supports three SIMs. The GUI lists the types of services that each SIM is enabled for. For SIM1, voice, SMS messages, and data service are enabled and may represent the primary SIM. SIM2 is enabled for data service only while SIM3 is enabled for both voice and SMS message services. Both SIM2 and SIM3 may be secondary SIMs that may be used during travel.

In an exemplary embodiment of the electronic device is a UE, such as smartphone. In an exemplary embodiment, the circuitry of the electronic device (e.g., UE) can include at least one or more processor devices (e.g., CPUs). In an exemplary embodiment, the circuitry can also include one or more memories storing computer executable instructions. In an exemplary embodiment, the circuitry can include one or more of the components shown in FIG. 1F.

In an exemplary embodiment, the electronic device (e.g., UE) receives data from the core network.

Respective features of the present disclosure are defined by the following numbered paragraphs:

Paragraph 1. An electronic device comprising:
a receiver configured to receive a first Subscriber Identity Module (SIM);
a receiver configured to receive a second SIM; and
circuitry configured to
receive data from the first SIM;
send a request, to a first public land mobile network (PLMN), to register the electronic device to the first PLMN, wherein the request indicates that the electronic device is a multi-SIM device and the request includes multi-SIM assistance information, and wherein the multi-SIM assistance information informs the first PLMN of the electronic device's preference for multi-SIM operations.

Paragraph 2. The electronic device of paragraph 1, wherein the multi-SIM assistance information includes one or more of: paging criteria, paging occasion separation, a proposed temporary identifier, limit paging area, and number of missed pages before notification.

Paragraph 3. The electronic device of paragraph 2, wherein the paging criteria includes at least one of service type category information or a service prioritization level.

Paragraph 4. The electronic device of paragraph 3, wherein the service type category information includes one or more of voice call, SMS message, other data, control plane signaling, emergency messages, emergency callback, or mobile terminated exception data.

Paragraph 5. The electronic device of paragraph 4, wherein the other data includes internet data, application data, or data associated with a Protocol Data Unit (PDU) session.

Paragraph 6. The electronic device of paragraph 3, wherein the service prioritization level includes a numerical level, a high or low level, a level associated with an emergency, or a single level.

Paragraph 7. The electronic device of paragraph 2, wherein the paging occasion separation, the proposed temporary identifier, the limit paging area, or the number of missed pages before notification enhances the network's paging mechanism for multi-SIM operations.

Paragraph 8. The electronic device of paragraph 2, wherein a user of the device configures preferences for how the device operates for the multi-SIM operations.

Paragraph 9. The electronic device of paragraph 1, wherein the request is sent over a control plane or a user plane.

Paragraph 10. The electronic device of paragraph 1, wherein the electronic device is a User Equipment (UE).

Paragraph 11. The electronic device of paragraph 1, wherein the electronic device is configured to send a second request to a second PLMN and the second request includes an identifier for the second SIM that is to be associated with the second PLMN, wherein the first PLMN forwards the second request to the second PLMN, and the second PLMN authenticates credentials of the second SIM.

Paragraph 12. The electronic device of paragraph 11, wherein the electronic device includes in the second request a time duration, a PDU session identifier, location information, an indication to buffer downlink data, and an indication that the electronic device is reachable over a user plane.

Paragraph 13 The electronic device of paragraph 11, wherein the circuitry is configured to receive a temporary ID that will be used for paging requests from a second PLMN.

Paragraph 14. The electronic device of paragraph 13, wherein the circuitry is configured to update a registration state of the electronic device for the second PLMN.

Paragraph 15. The electronic device of paragraph 13, wherein the second PLMN also updates a registration state of the electronic device for the second PLMN.

Paragraph 16. The electronic device of paragraph 11, wherein the identifier for the second SIM includes a SUPI, an IMSI, a GUTI, a 5G-S-TMSI, or a SUCI.

Paragraph 17. The electronic device of paragraph 13, wherein the temporary ID for the electronic device is used to page the electronic device whenever there is a page for the second SIM while the electronic device is actively registered to the first PLMN.

Paragraph 18. The electronic device of paragraph 1, wherein the request is an initial registration request, a partial registration request, an indirect registration request, a registration update request, an initial attach request, a partial attach request, an indirect attach request, or a tracking area update (TAU) request.

Paragraph 19. A method performed by an electronic device, the method comprising:
receiving data from a first Subscriber Identity Module (SIM); and
sending a request, to a first public land mobile network (PLMN), to register the electronic device to the first PLMN, wherein the request indicates that the electronic device is a multi-SIM device and the request includes multi-SIM assistance information, and wherein the multi-SIM assistance information informs the first PLMN of the device's preference for multi-SIM operations.

Paragraph 20. A non-transitory computer-readable medium including computer-executable instructions, which when executed by an electronic device, cause the electronic device to:
  receive data from a first Subscriber Identity Module (SIM); and
  send a request, to a first public land mobile network (PLMN), to register the electronic device to the first PLMN, wherein the request indicates that the electronic device is a multi-SIM device and the request includes multi-SIM assistance information, and wherein the multi-SIM assistance information informs the first PLMN of the device's preference for multi-SIM operations.

Paragraph 21. An electronic device comprising:
  a receiver configured to receive a first Subscriber Identity Module (SIM);
  a receiver configured to receive a second SIM;
  circuitry configured to receive data from the first SIM,
    wherein a first public land mobile network (PLMN) receives data associated with a temporary ID that is associated with the first SIM, and
    wherein the first PLMN forwards a paging request or a NAS notification to a second PLMN, and the paging request or the NAS notification includes the temporary ID associated with the first SIM; and
  the circuitry is configured to receive the paging request or the NAS notification from the second PLMN, wherein the paging request or the NAS notification was sent to the electronic device on the second PLMN.

Paragraph 22. The electronic device of paragraph 21, wherein the electronic device simultaneously registers with the first PLMN and the second PLMN.

Paragraph 23. The electronic device of paragraph 21, wherein the electronic device has an inactive registration with the first PLMN.

Paragraph 24. The electronic device of paragraph 21, wherein the electronic device has an active registration with the second PLMN.

Paragraph 25. A method performed by an electronic device, the method comprising:
  receiving data from a first Subscriber Identity Module (SIM),
    wherein a first public land mobile network (PLMN) receives data associated with a temporary ID that is associated with the first SIM, and
    wherein the first PLMN forwards a paging request or a NAS notification to a second PLMN, and the paging request or the NAS notification includes the temporary ID associated with the first SIM; and
  receiving the paging request or the NAS notification from the second PLMN, wherein the paging request or the NAS notification was sent to the electronic device on the second PLMN.

Paragraph 26. A non-transitory computer-readable medium including computer-executable instructions, which when executed by an electronic device, cause the electronic device to:
  receive data from a first Subscriber Identity Module (SIM),
    wherein a first public land mobile network (PLMN) receives data associated with a temporary ID that is associated with the first SIM, and
    wherein the first PLMN forwards a paging request or a NAS notification to a second PLMN, and the paging request or the NAS notification includes the temporary ID associated with the first SIM; and
  receive the paging request or the NAS notification from the second PLMN, wherein the paging request or the NAS notification was sent to the electronic device on the second PLMN.

Paragraph 27. An electronic device comprising:
  a receiver configured to receive a first Subscriber Identity Module (SIM);
  a receiver configured to receive a second SIM;
  circuitry configured to
  receive paging information for data associated with a second SIM while connected to a first public land mobile network (PLMN) with the first SIM;
  decide to switch to a second PLMN to retrieve the data based on a temporary ID and a service type prioritization information provided in the paging information;
  inform the first PLMN to suspend registration for the first SIM; and
  establish communication with the second PLMN using the second SIM.

Paragraph 28. The electronic device of paragraph 27, wherein the electronic device is configured to check the service type prioritization against an internal policy and determine the service type for the second PLMN is higher priority than the service type for the first PLMN.

Paragraph 29. The electronic device of paragraph 27, wherein the electronic device is configured to update the registration state for the first SIM to an inactive registration state and wherein the first PLMN also updates a registration state of the electronic device for the first SIM.

Paragraph 30. A method performed by an electronic device, the method comprising:
  receiving paging information for data associated with a second Subscriber Identity Module (SIM) while connected to a first public land mobile network (PLMN) with the first SIM;
  deciding to switch to a second PLMN to retrieve the data based on a temporary ID and a service type prioritization information provided in the paging information;
  informing the first PLMN to suspend registration for the first SIM; and
  establishing communication with the second PLMN using the second SIM.

Paragraph 31. A non-transitory computer-readable medium including computer-executable instructions, which when executed by an electronic device, cause the electronic device to:
  receive paging information for data associated with a second Subscriber Identity Module (SIM) while connected to a first public land mobile network (PLMN) with the first SIM;
  decide to switch to a second PLMN to retrieve the data based on a temporary ID and a service type prioritization information provided in the paging information;
  inform the first PLMN to suspend registration for the first SIM; and
  establish communication with the second PLMN using the second SIM.

Paragraph 32. An electronic device comprising:
  a receiver configured to receive a first Subscriber Identity Module (SIM);
  a receiver configured to receive a second SIM; and
  circuitry configured to
    send a request, to a first public land mobile network (PLMN), to update a registration timer of the second SIM on a second PLMN, wherein the first PLMN forwards the request to the second PLMN, the second PLMN updates a registration state for the second SIM in the second PLMN, and the second PLMN returns a response to the first PLMN; and receive the response, the response forwarded by the first PLMN.

Paragraph 33. The electronic device of paragraph 32, wherein the request is a registration update, a tracking area update, or an inactive registration timer update.

Paragraph 34. The electronic device of paragraph 32, wherein the request includes a temporary identifier associated with the second SIM.

Paragraph 35. The electronic device of paragraph 33, wherein the second PLMN assigns a new temporary identifier for the second SIM.

Paragraph 36. An electronic device comprising:
a receiver configured to receive a first Subscriber Identity Module (SIM);
a receiver configured to receive a second SIM; and
circuitry configured to
after deciding to switch to a second public land mobile network (PLMN), collect cell measurements of the second PLMN while trying to connect to the second PLMN from the first PLMN;
save the cell measurements of the second PLMN after unsuccessful connection to the second PLMN, and receive a cause code; and
connect to the first PLMN and provide the collected measurements of the second PLMN and the cause code to the first PLMN, wherein the first PLMN forwards the collected measurements of the second PLMN and the cause code to the second PLMN.

Paragraph 37. The electronic device of paragraph 36, wherein if the electronic device is successful in connecting to the second PLMN, the electronic device formats the cell measurements into a Minimization for Drive Test report to a RAN node of the second PLMN.

Paragraph 38. The electronic device of paragraph 36, wherein the saved cell measurements indicate signal strength of cells belonging to the second PLMN.

Paragraph 39. The electronic device of paragraph 36, wherein the saved cell measurements include location and time when the measurements were taken.

Paragraph 40. The electronic device of paragraph 36, wherein the saved cell measurements may be buffered by the electronic device and sent to a RAN node upon successful connection at a future time.

Paragraph 41. An electronic device comprising:
a receiver configured to receive a first Subscriber Identity Module (SIM);
a receiver configured to receive a second SIM; and
circuitry configured to
register the electronic device to a first public land mobile network (PLMN),
receive a first temporary identifier from the first PLMN with an associated paging occasion for the first SIM,
register the electronic device to a second public land mobile network (PLMN),
receive a second temporary identifier from the second PLMN with an associated paging occasion for the second SIM,
determine a possibility of paging collisions between the paging occasion for the first SIM and the paging occasion for the second SIM, and
request to obtain a new first temporary identifier, from the first PLMN, that has a paging occasion that is different from the paging occasion for the first SIM, or request to obtain a new second temporary identifier, from the second PLMN, that has a paging occasion that is different from the paging occasion for the second SIM.

Paragraph 42. The electronic device of paragraph 41, wherein the request is one of an initial registration, a mobile registration update, a periodic registration update, an attach, or a tracking area update request.

Paragraph 43. The electronic device of paragraph 41, wherein the request includes multi-SIM assistance information to assist the first PLMN to assign the new first temporary identifier or to assist the second PLMN to assign the new second temporary identifier.

Paragraph 44. The electronic device of paragraph 43, wherein the parameters include one or more of: paging criteria, limit paging area, paging occasion separation, multi-SIM indicator, a temporary identifier, and a multiple paging occasion.

Paragraph 45. A method performed by an electronic device, the method comprising:
receiving data from a first Subscriber Identity Module (SIM);
receiving data from a second SIM;
registering the electronic device to a first public land mobile network (PLMN);
receiving a first temporary identifier from the first PLMN with an associated paging occasion for the first SIM;
registering the electronic device to a second public land mobile network (PLMN);
receiving a second temporary identifier from the second PLMN with an associated paging occasion for the second SIM;
determining a possibility of paging collisions between the paging occasion for the first SIM and the paging occasion for the second SIM; and
requesting to obtain a new first temporary identifier, from the first PLMN, that has a paging occasion that is different from the paging occasion for the first SIM, or requesting to obtain a new second temporary identifier, from the second PLMN, that has a paging occasion that is different from the paging occasion for the second SIM.

Paragraph 46. A non-transitory computer-readable medium including computer-executable instructions, which when executed by an electronic device, cause the electronic device to:
receive data from a first Subscriber Identity Module (SIM);
receive data from a second SIM;
register the electronic device to a first public land mobile network (PLMN);
receive a first temporary identifier from the first PLMN with an associated paging occasion for the first SIM;
register the electronic device to a second public land mobile network (PLMN);
receive a second temporary identifier from the second PLMN with an associated paging occasion for the second SIM;
determine a possibility of paging collisions between the paging occasion for the first SIM and the paging occasion for the second SIM; and
request to obtain a new first temporary identifier, from the first PLMN, that has a paging occasion that is different from the paging occasion for the first SIM, or request to obtain a new second temporary identifier, from the second PLMN, that has a paging occasion that is different from the paging occasion for the second SIM.

Paragraph 47. An electronic device comprising:
a receiver configured to receive a first Subscriber Identity Module (SIM); and
circuitry configured to
register the electronic device to a first public land mobile network (PLMN), wherein the first PLMN starts a registration timer;
send a request to activate a registration suspend timer to a core network, wherein the core network suspends the registration timer and starts the registration suspend timer; and
receive, from the core network, a response that the registration suspend timer is active.

Paragraph 48. The electronic device of paragraph 47, wherein the request is one of an initial registration, a mobile registration update, a periodic registration update, an attach, or a tracking area update request.

Paragraph 49. The electronic device of paragraph 47, further configured to:
provide an expiration value for the registration suspend timer.

Paragraph 50. The electronic device of paragraph 47, further configured to:
request the core network to queue any downlink data for the electronic device while the registration suspend timer is running.

Paragraph 51. The electronic device of paragraph 50, further configured to:
receive an indication from the core network, wherein the indication indicates that the core network will queue the downlink data.

Paragraph 52. A method performed by an electronic device, the method comprising:
receiving data from a first Subscriber Identity Module (SIM);
registering the electronic device to a first public land mobile network (PLMN), wherein the first PLMN starts a registration timer;
sending a request to activate a registration suspend timer to a core network, wherein the core network suspends the registration timer and starts the registration suspend timer; and
receiving, from the core network, a response that the registration suspend timer is active.

Paragraph 53. A non-transitory computer-readable medium including computer-executable instructions, which when executed by an electronic device, cause the electronic device to:
receive data from a first Subscriber Identity Module (SIM);
register the electronic device to a first public land mobile network (PLMN), wherein the first PLMN starts a registration timer;
send a request to activate a registration suspend timer to a core network, wherein the core network suspends the registration timer and starts the registration suspend timer; and
receive, from the core network, a response that the registration suspend timer is active.

Paragraph 54. An electronic device comprising:
a receiver configured to receive a first Subscriber Identity Module (SIM);
a receiver configured to receive a second SIM, wherein the electronic device has registrations for the first SIM and the second SIM; and
circuitry configured to
receive data for the first SIM,
receive a page for the second SIM, and
send a notification about an issue with a paging process to a core network.

Paragraph 55. The electronic device of paragraph 54, wherein the notification is a request sent by the electronic device.

Paragraph 56. The electronic device of paragraph 55, wherein the request is one of a mobile registration update, a periodic registration update, a tracking area update, or a service request.

Paragraph 57. The electronic device of paragraph 54, further configured to:
provide an indication for the core network to stop paging the electronic device.

Paragraph 58. A method performed by an electronic device, the method comprising:
receiving data from a first Subscriber Identity Module (SIM), wherein the electronic device has registrations for the first SIM and a second SIM;
receiving a page for the second SIM; and
sending a notification about an issue with a paging process to a core network.

Paragraph 59. A non-transitory computer-readable medium including computer-executable instructions, which when executed by an electronic device, cause the electronic device to:
receive data from a first Subscriber Identity Module (SIM), wherein the electronic device has registrations for the first SIM and a second SIM;
receive a page for the second SIM; and
send a notification about an issue with a paging process to a core network.

It will be understood that any of the methods and processes described herein may be embodied in the form of computer executable instructions (i.e., program code) stored on a computer-readable storage medium, and when the instructions are executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information, and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

The following [1]-[9] are incorporated herein by reference in their entireties:
[1] 3GPP TS 23.501, System Architecture for the 5G System; Stage 2, V16.0.0 (March 2019).
[2] 3GPP TS 23.502, Procedures for the 5G System; Stage 2, V16.0.0 (March 2019).
[3] 3GPP TS 23.503, Policy and Charging Control Framework for the 5G System; Stage 2, V16.0.0 (March 2019).
[4] 3GPP TS 38.300, NR and NG-RAN Overall Description; Stage 2, V15.4.0 (December 2018).
[5] 3GPP TS 38.304, User Equipment (UE) Procedures in Idle Mode and RRC Inactive State; V15.2.0 (December 2018).
[6] 3GPP TR 22.834, Study on Support for Multi-USIM Devices; V0.1.0 (May 2019).
[7] 3GPP S2-1904722, Introduction of Slice-Specific Authentication and Authorisation (TS 23.501).
[8] 3GPP S2-1904723, Introduction of Slice-Specific Authentication and Authorisation (TS 23.502).
[9] 3GPP TS 23.401, General Packet Radio Service (GPRS) enhancements for Evolved Universal Terrestrial Radio Access Network (E-UTRAN) access; V16.3.0 (June 2019).

What is claimed is:

1. An electronic device configured to receive a first subscriber identity module (SIM) associated with a first network and a second SIM associated with a second network, the electronic device comprising:
a transceiver, memory, and a processor which are configured to:
send a first registration request to the first network to register the electronic device, wherein the first registration request indicates that the electronic device is a multi-SIM device, the first registration request comprises a subscriber identifier that is associated with the first network, and the first registration request comprises a multi-SIM policy, wherein the multi-SIM policy informs the first network of capabilities of the electronic device for multi-SIM operations,
receive a page from the second network and, based on receiving the page from the second network, determine to switch to the second network,
send a second registration request to the first network, wherein the second registration request indicates the determination to switch to the second network, and
transition to a CM-IDLE state and an RRC_IDLE state in the first network.

2. The electronic device of claim 1, wherein the multi-SIM policy comprises one or more of:
an indication that the electronic device is capable of sending service prioritization information wherein service prioritization information may be used by the first network to determine whether to send a paging message to the electronic device,
an indication that the electronic device is capable of receiving service type information in the paging message, or
an indication that the electronic device is capable of providing identifiers that may be used to determine paging occasions.

3. The electronic device of claim 1, wherein the transceiver, memory, and the processor are configured to:
receive, in response to the first registration request, information that configures the electronic device for multi-SIM operations, the information comprising one or more of:
an indication that the first network is capable of receiving service prioritization information wherein service prioritization information may be used by the first network to determine whether to send a paging message to the electronic device,
an indication that the first network is capable of sending service type information in a paging message to the electronic device, or
an indication that the first network supports sending identifiers that may be used to determine paging occasions.

4. The electronic device of claim 1, wherein the second registration request is a registration update request that indicates to the first network that the electronic device will connect to the second network.

5. The electronic device of claim 4, wherein the registration update request comprises service prioritization information to request that a core network of the first network filter paging requests for the electronic device.

6. The electronic device of claim 1, wherein the transceiver, memory, and the processor are configured to receive a paging message from the first network, wherein the paging message comprises service type information that indicates what the paging message is for.

7. The electronic device of claim 6, wherein the service type information comprises one of voice call, SMS message, other data, control plane signaling, emergency messages, emergency callback, or mobile terminated exception data.

8. The electronic device of claim 1, wherein the transceiver, memory, and the processor are configured to:
receive a paging message from the first network; and
in response to the received paging message, send a third request to the first network wherein the third request comprises an indication that the electronic device is busy.

9. The electronic device of claim 8, wherein the third request that indicates that the electronic device is busy comprises service prioritization information to inform a core network of the first network to filter paging requests for the electronic device.

10. The electronic device of claim 1, wherein the transceiver, memory, and the processor are configured to:
send a third request to the first network to update an identifier for calculating paging occasions associated with the first network,
receive a response from the first network, the received response including an updated identifier, and
calculate a paging occasion associated with the first network using the updated identifier.

11. The electronic device of claim 10, wherein the third request to the first network to update the identifier comprises a value used by a network function to determine the updated identifier.

12. The electronic device of claim 1, wherein the electronic device is a user equipment (UE).

13. A method implementer by an electronic device configured to receive a first subscriber identity module (SIM) associated with a first network and a second SIM associated with a second network, the method comprising:
sending a first registration request to the first network to register the electronic device, wherein the first registration request indicates that the electronic device is a multi-SIM device, the first registration request comprises a subscriber identifier that is associated with the first network, and the first registration request comprises a multi-SIM policy, wherein the multi-SIM policy informs the first network of capabilities of the electronic device for multi-SIM operations;
receiving a page from the second network and, based on receiving the page from the second network, determining to switch to the second network;
send a second registration request to the first network, wherein the second registration request indicates the electronic device is switching to the second network; and
transitioning to a CM-IDLE state and an RRC_IDLE state in the first network.

14. The method of claim 13, wherein the multi-SIM policy comprises one or more of:
an indication that the electronic device is capable of sending service prioritization information wherein service prioritization information may be used by the first network to determine whether to send a paging message to the electronic device,
an indication that the electronic device is capable of receiving service type information in the paging message, or
an indication that the electronic device is capable of providing identifiers that may be used to determine paging occasions.

15. The method of claim 13, further comprising:
receiving, in response to the first registration request, information that configures the electronic device for multi-SIM operations, the information comprising one or more of:
an indication that the first network is capable of receiving service prioritization information wherein service prioritization information may be used by the first network to determine whether to send a paging message to the electronic device,
an indication that the first network is capable of sending service type information in a paging message to the electronic device, or
an indication that the first network supports sending identifiers that may be used to determine paging occasions.

16. The method of claim 13, wherein the second registration request is a registration update request that indicates to the first network that the electronic device will connect to the second network.

17. The method of claim 16, wherein the registration update request comprises service prioritization information to request that a core network of the first network filter paging requests for the electronic device.

18. The method of claim 16, further comprising:
receiving a paging message from the first network, wherein the paging message comprises service type information that indicates what the paging message is for.

19. The method of claim 18, wherein the service type information comprises one of voice call, SMS message, other data, control plane signaling, emergency messages, emergency callback, or mobile terminated exception data.

20. The method of claim 13, further comprising:
receiving a paging message from the first network; and
in response to the received paging message, sending a third request to the first network wherein the third request comprises an indication that the electronic device is busy.

21. The method of claim 20, wherein the third request that indicates that the electronic device is busy comprises service prioritization information to inform a core network of the first network to filter paging requests for the electronic device.

22. The method of claim 13, further comprising:
sending a third request to the first network to update an identifier for calculating paging occasions associated with the first network;
receiving a response from the first network, the received response including an updated identifier; and
calculating a paging occasion associated with the first network using the updated identifier.

23. The method of claim 22, wherein the third request to the first network to update the identifier comprises a value used by a network function to determine the updated identifier.

* * * * *